(12) United States Patent  
Enomura

(10) Patent No.: US 8,911,545 B2  
(45) Date of Patent: Dec. 16, 2014

(54) METHOD FOR PRODUCING PIGMENT NANOPARTICLES BY FORCED ULTRATHIN FILM ROTARY REACTION METHOD, PIGMENT NANOPARTICLES, AND INKJET INK USING THE SAME

(75) Inventor: Masakazu Enomura, Izumi (JP)

(73) Assignee: M. Technique Co., Ltd., Osaka (JP)

( * ) Notice: Subject to any disclaimer, the term of this patent is extended or adjusted under 35 U.S.C. 154(b) by 1145 days.

(21) Appl. No.: 12/668,015

(22) PCT Filed: Jul. 4, 2008

(86) PCT No.: PCT/JP2008/062231  
§ 371 (c)(1),  
(2), (4) Date: Jan. 6, 2010

(87) PCT Pub. No.: WO2009/008388  
PCT Pub. Date: Jan. 15, 2009

(65) Prior Publication Data  
US 2010/0326321 A1 Dec. 30, 2010

(30) Foreign Application Priority Data

Jul. 6, 2007 (JP) ................................. 2007-179098  
Jul. 9, 2007 (JP) ................................. 2007-180349  
Aug. 6, 2007 (JP) ................................. 2007-203850  
Mar. 11, 2008 (JP) ................................. 2008-060445

(51) Int. Cl.  
*C04B 14/00* (2006.01)  
*C09D 1/00* (2006.01)  
(Continued)

(52) U.S. Cl.  
CPC ............. *C09B 67/0017* (2013.01); *B01J 19/10* (2013.01); *C09B 67/0022* (2013.01); *B82Y 30/00* (2013.01); *B01J 2219/00137* (2013.01); *C09B 67/0091* (2013.01); *B01F 7/00791* (2013.01); *C09B 67/0005* (2013.01); *C09D 11/322* (2013.01); *B01J 2219/00094* (2013.01); *B01J 19/1887* (2013.01); *B01F 7/00758* (2013.01); *B01J 19/123* (2013.01); *B01J 2219/00141* (2013.01)  
USPC ........................................... 106/400; 106/31.6

(58) Field of Classification Search  
USPC ....................................................... 106/31.6  
See application file for complete search history.

(56) References Cited

U.S. PATENT DOCUMENTS 6,537,364 B2 3/2003 Dietz et al.  
2002/0040665 A1* 4/2002 Dietz et al. ..................... 106/494  
(Continued)

FOREIGN PATENT DOCUMENTS

EP 0776952 A2 6/1997  
EP 1516896 A1 3/2005  
(Continued)

OTHER PUBLICATIONS

Nitschke et al., "Material Investigations and Optical Properties of Phthalocyanine Nanoparticles," J. Phys. Chem. B., 2004, vol. 108, No. 4, pp. 1287-1295.

*Primary Examiner* — Shuangyi Abu Ali  
(74) *Attorney, Agent, or Firm* — Birch, Stewart, Kolasch & Birch, LLP

(57) ABSTRACT

A forced ultrathin film rotary reaction method is used to maintain a minute space of 1 mm or less between two processing surfaces capable of approaching to and separating from each other and being rotating relative to each other, and the minute space is maintained between the two processing surfaces to serve as a flow path of a fluid to be processed thereby forming a forced thin film of the processed fluid and separating the pigment material in the forced thin film.

20 Claims, 32 Drawing Sheets

(51) Int. Cl.

| | | |
|---|---|---|
| *C09D 4/00* | (2006.01) | |
| *C09K 3/00* | (2006.01) | |
| *C09D 5/00* | (2006.01) | |
| *C09D 11/00* | (2014.01) | |
| *B01J 19/10* | (2006.01) | |
| *C09B 67/00* | (2006.01) | |
| *B82Y 30/00* | (2011.01) | |
| *C09B 67/14* | (2006.01) | |
| *C09B 67/46* | (2006.01) | |
| *B01F 7/00* | (2006.01) | |
| *C09B 67/08* | (2006.01) | |
| *C09D 11/322* | (2014.01) | |
| *B01J 19/18* | (2006.01) | |
| *B01J 19/12* | (2006.01) | |

(56) References Cited

U.S. PATENT DOCUMENTS

2004/0191319 A1  9/2004  Yun et al.
2006/0286015 A1  12/2006  Holl

FOREIGN PATENT DOCUMENTS

| | | | | |
|---|---|---|---|---|
| JP | 2006-276271 | A | 10/1916 | |
| JP | 57-42308 | A | 3/1982 | |
| JP | 9-151342 | A | 6/1997 | |
| JP | 11-35399 | A | 2/1999 | |
| JP | 2003-26972 | A | 1/2003 | |
| JP | 2004-49957 | A | 2/2004 | |
| JP | 2004-91560 | A | 3/2004 | |
| JP | 2004-154635 | A | 6/2004 | |
| JP | 2004-174297 | A | 6/2004 | |
| JP | 2005-46651 | A | 2/2005 | |
| JP | 2005-238342 | A | 9/2005 | |
| JP | 2005-313102 | * | 10/2005 | ............... B02C 19/00 |
| JP | 2005-313102 | A | 11/2005 | |
| JP | 2008-1796 | A | 1/2006 | |
| JP | 2006-104448 | A | 4/2006 | |
| JP | 2006-124556 | A | 5/2006 | |
| JP | 2006-193652 | A | 7/2006 | |
| JP | 2006-335970 | A | 12/2006 | |
| JP | 2006-341232 | * | 12/2006 | ................ B01F 7/26 |
| JP | 2006-341232 | A | 12/2006 | |
| JP | 2006-342304 | A | 12/2006 | |
| JP | 2007-39643 | A | 2/2007 | |
| JP | 2007-39643 | A5 | 2/2007 | |
| JP | 2007-54817 | A | 3/2007 | |
| WO | WO 03/033097 | A2 | 4/2003 | |
| WO | WO 2006/132443 | A1 | 12/2006 | |

* cited by examiner

FIG. 2A
FIG. 2B
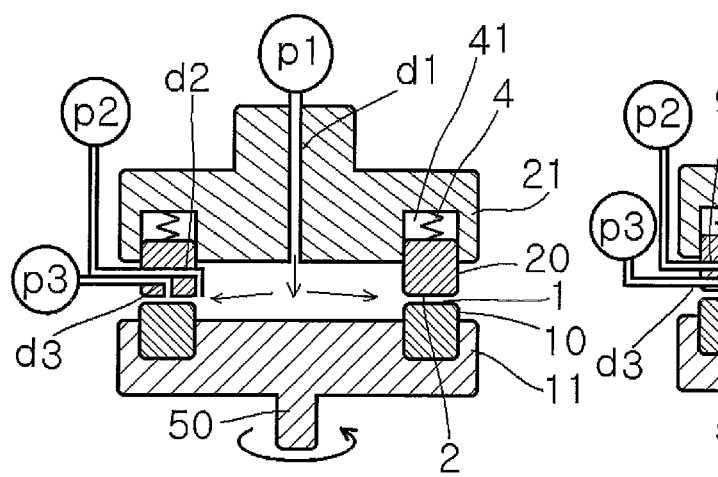
FIG. 2C
FIG. 2D
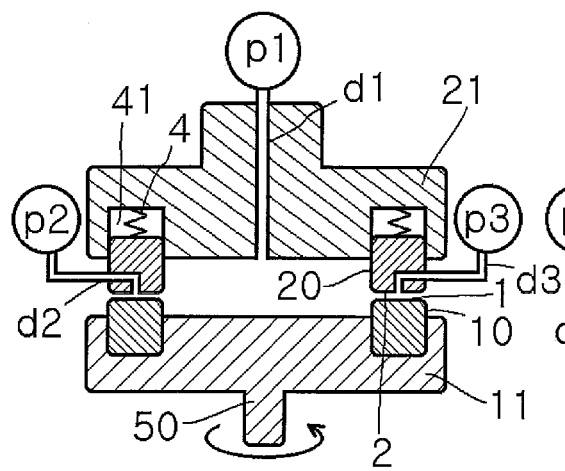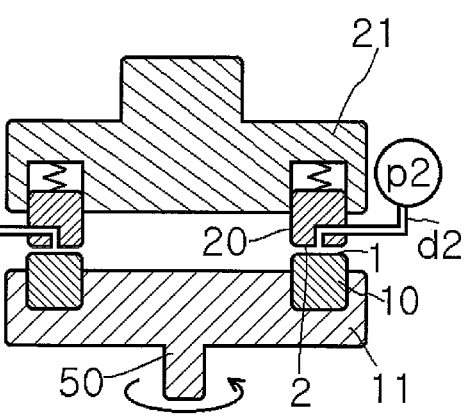

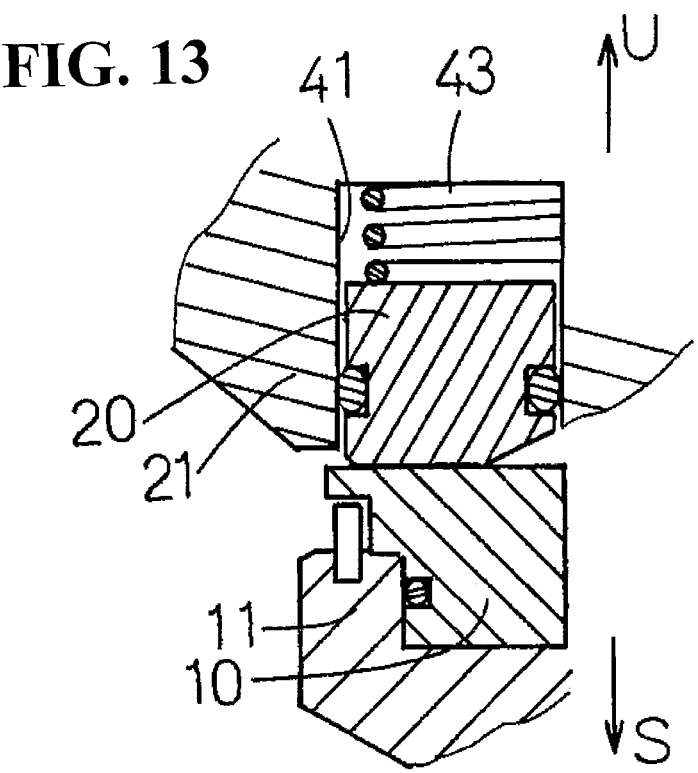

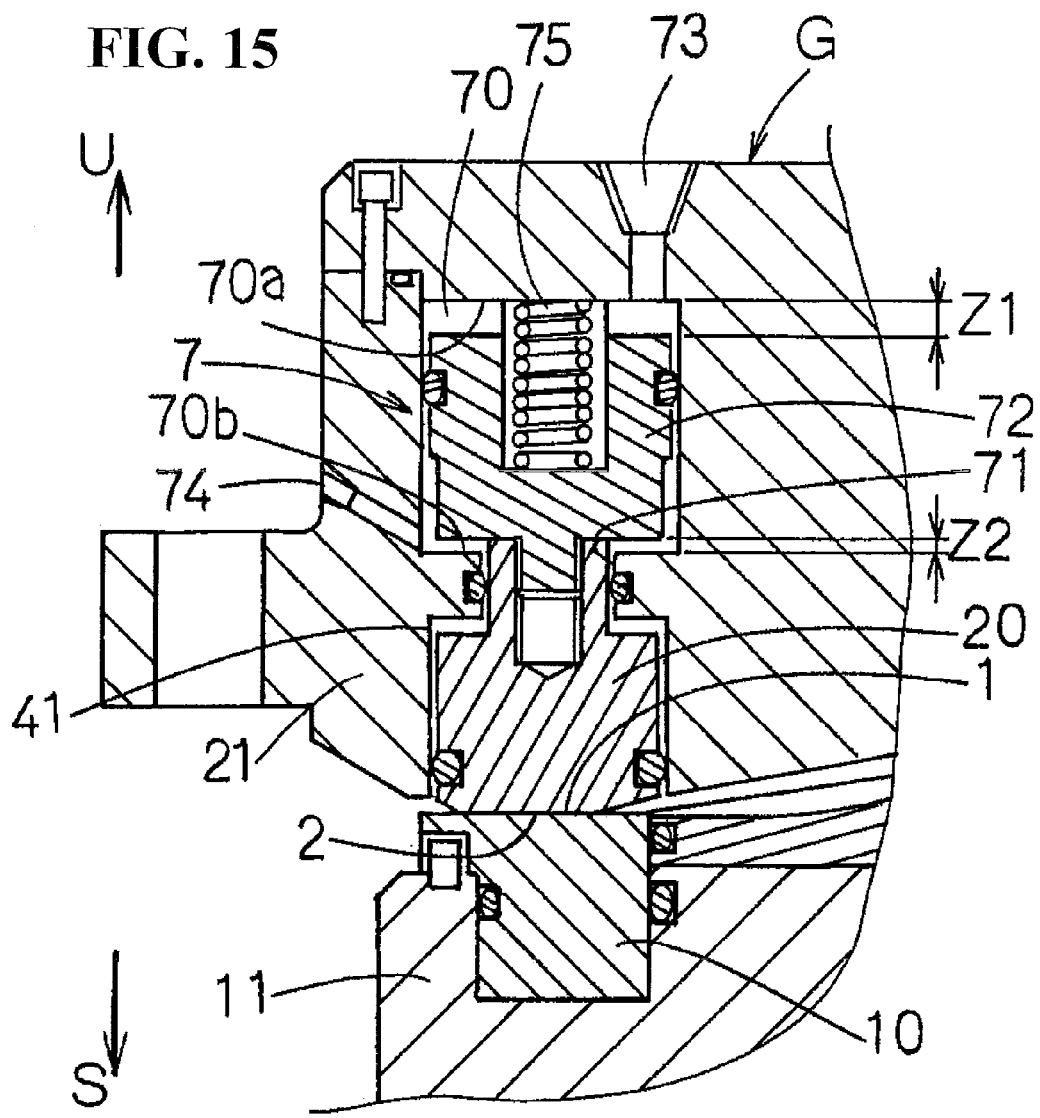

METHOD FOR PRODUCING PIGMENT NANOPARTICLES BY FORCED ULTRATHIN FILM ROTARY REACTION METHOD, PIGMENT NANOPARTICLES, AND INKJET INK USING THE SAME

TECHNICAL FIELD

The present invention relates to a method for producing pigment nanoparticles, and pigment nanoparticles produced by the production method.

BACKGROUND ART

Patent Document 1: JP-A H09-151342
Patent Document 2: JP-A 2006-124556
Patent Document 3: JP-A 2008-1796
Patent Document 4: JP-A 2005-238342
Patent Document 5: JP-A 2003-26972
Patent Document 6: JP-A 2006-104448
Patent Document 7: JP-A 2006-193652
Patent Document 8: JP-A 2006-342304
Patent Document 9: JP-A H11-35399
Patent Document 10: JP-A 2004-91560
Patent Document 11: JP-A 2004-49957
Patent Document 12: JP-A 2006-276271
Patent Document 13: JP-A 2006-335970
Non-Patent Document 1: "Nanotechnology Handbook," first edition, edited by Nanotechnology Handbook Editorial Committee, Ohmsha Ltd., May, 2003, p. 13

The nanotechnology attracts a great deal of attention as a scientific technology raising a new industrial revolution. Conventional materials can exhibit new functions by mere microparticulation, so the nanoparticles become an important theme in the industrial world, and the advance of nanotechnology is naturally inseparable from microparticles, particularly nanoparticles.

Pigments are utilized in a very wide range of fields such as coating materials, printing inks, toner, inkjet inks and color filters, because of their vivid color tones and high colorability. Among these uses, inkjet pigments and color filter pigments are regarded as being important particularly in fields requiring practically highly functional materials.

Because a conventional substance can exhibit new functions by converting the substance into microparticles, the conversion of the substance into nanoparticles is an important theme in the whole industrial world, and the interest in the technology of conversion to nanoparticles is extremely increasing for advance of the nanotechnology (Non-Patent Document 1).

A variety of new functions attained by conversion to nanoparticles are known, and particularly pigment nanoparticles obtained by converting pigments into nanoparticles are known to attain coloration and color development equivalent to those of dyes.

As the color material of an inkjet ink, dyes have been mainly used from the viewpoint of storage stability for a long time, discharge stability from inkjet nozzles, excellent chroma and transparency. However, dyes are problematic in respect of light resistance and water resistance.

As compared with dye inks, pigment-dispersed inks using a pigment as their color material are known to significantly improve light resistance and water resistance and are useful as a material for producing inks for inkjet printers in a bubble jet (registered trademark) system, a thermal jet system and a piezo system and for producing writing utensils such as an aqueous ballpoint pen, a fountain pen, an aqueous marking pen and an aqueous marker, but uniform microparticulation of the pigment into fine nanoparticles capable of permeation into pore spaces in the surface of paper is difficult, so there is a problem that the pigment is inferior in adhesion to paper and in color rendering properties. Moreover, when the conventional pigment-based recording liquid is used in recording on transparent manuscripts represented by an OHP film, pigment particles are scattered to cause problems such as deterioration in transparency and dull coloration. The particle size of such pigment particles as the color material is known to exert a significant influence on performance, so there is a demand for a technology for stably producing monodisperse pigment nanoparticles (Patent Document 1). In production of color filters, the inkjet system is used in some cases.

With progress toward high resolution and high contrast in LCD monitors, organic EL monitors and digital cameras, it is desired that color filters used therein be thin-layer and have higher contrast and higher transmittance. Pigments are used in these color filters, and the particle size of the pigments used significantly influences on the thickness, contrast and transmittance of the resulting filter, so there has been a demand for a technology for stably producing monodisperse pigment nanoparticles (Patent Document 3).

The pigment particles used therein are obtained often by a step of pulverizing bulk pigment materials mechanically with a dispersing machine such as a ball mill or a bead mill, but such a pulverization step is problematic in that the average particle size of pigment particles obtained after the step is generally about 100 nm (0.1 μm) and the particle size distribution is relatively broad (about 80 nm to 180 nm) (Patent Document 2).

Moreover, microparticles produced by the pulverization method have active sites generated on their fracture surfaces as a result of pulverization, so that the pulverized microparticles are re-aggregated to form large particles and to increase the viscosity of the dispersion system as a whole, and therefore, there are many problems of the pulverization method itself.

There is a method, such as laser ablation shown in Patent Document 4, of radiating a femtosecond laser to solid particles, but because the laser ablation method uses a very strong laser beam, the possibility of decomposition at the molecular level is undeniable, and the amount of production at present is about 0.1 mg/h, which has not reached an industrial practical level.

As a production method other than the pulverization method, there is a growth method. Known is a method wherein a solution having an organic pigment dissolved therein is contacted gradually with an aqueous medium to separate the pigment (called co-precipitation method or re-precipitation method), which includes allowing a dispersant to be coexistent in either solution to prepare stable microparticles (Patent Document 5). In this method, particles of submicrons to several ten nanometers can be relatively easily produced, but are not suitable as the color material used in an inkjet ink or the like because the size of the particles can vary or amorphous particles other than spherical particles are easily formed due to scale-up.

A method of forming pigment nanoparticles, known as a microchemical process, is known wherein a micro-reactor or a micro-mixer is combined with a step of producing a pigment dispersion, such as a pigment precipitation reaction such as co-precipitation, or pigment synthesis and crystallization (Patent Documents 6, 7, 8, 12, and 13). When these methods use a reaction involving precipitation or crystallization, a flow path may, with high possibility, be clogged with products or with foams or byproducts generated by the reaction, or the reaction will proceed basically through only diffusion of molecules, so that these methods are not applicable to every reaction. The microchemical process uses a scale-up method of increasing the number of reactors arranged in parallel, but there is a problem that because the manufacturing ability of a reactor is low, large scale up is not practical, and it is difficult for the respective reactors to have equal performance, thus failing to provide uniform products. When the reaction solution is highly viscous or the reaction causes an increase in viscosity, a very high pressure is necessary for passage of the solution through a minute flow path, so there is a problem that a usable pump is limited, and leakage of the solution from an apparatus cannot be solved due to high pressure.

As another growth method, a gaseous phase method using plasma in high vacuum with an apparatus as shown in Patent Document 9 is used in some cases.

In the gaseous phase method, however, the amount of nanoparticles formed at a time is small, an apparatus for an electron beam, plasma, laser or induction heating is necessary for evaporation of raw materials, and there is also a problem in production costs, thus making the gaseous phase method less suitable for mass production. There is also a problem that nanoparticles obtained by the gaseous phase method are fine particles of a pure substance and thus easily aggregated to vary the size of the particles.

Meanwhile, a method of crystallizing a pigment by dissolving the pigment in a fluid in a supercritical or subcritical state and then rapidly cooling the solution is known as a recently reported method (Patent Document 10). This method is carried out at a very high temperature and a high pressure, thus requiring an apparatus capable of realizing an extremely high temperature and pressure. Accordingly, for problems in safety and costs, the method is not practically suitable, particularly not suitable for mass production, and there is also a problem that under such conditions, organic matters such as pigments are easily decomposed.

As a general problem of the apparatus for realizing the methods described above, there is a problem that the cleaning of the apparatus is essential, but the apparatus is poor in cleaning performance because its object material is a pigment. In addition, when contamination with foreign substances and countermeasures against bacteria are also taken into consideration, the apparatus and the production method have not yet reached the practical level for actually obtaining pigment nanoparticles.

Nanoparticles not subjected to pulverization as compared with the nanoparticles produced by pulverization do not have, on the surface of the pigment, a surface roughened by pulverization, and therefore, such pigment nanoparticles have a low speed of aggregation, and as a consequence, the particles are hardly sedimented and are excellent in dispersion stability and also in storage stability. However, there is no production method wherein pigment nanoparticles not having roughened surfaces on the pigment particles can be mass-produced stably and industrially, so there is a demand for establishment of such a production method.

In recent years, the above-mentioned "microchemical process technology" utilizing a micro-reactor or a micro-mixer, that is, a technology wherein a reaction flow path having a minute sectional area is used in a chemical reaction, attracts considerable attention because a chemical reaction can be efficiently conducted. The "microchemical process technology" is a chemical analysis or a method for producing a substance wherein a flow path of several to several hundred μm in width is formed on a solid substrate generally by a microfabrication technology or the like, and a chemical or physicochemical reaction occurring in the microscopic flow path is utilized. However, when the micro-reactor or the micro-mixer is to be realized as an actual manufacturing technology, there are many problems such as necessity for a very high-pressure pump for passing a reaction solution and reactants through the flow path of several μm in width and clogging of the microscopic flow path with products to make the reactor unusable, and in reality, a reactor having a flow path of several hundred μm to several mm in width is required, so it must be said that a technology unworthy to be called a "microchemical process technology" is prevailing under present circumstances.

DISCLOSURE OF INVENTION

An object of the present invention is to provide a reaction method using stirring and instantly uniform mixing in a microscopic flow path, which is carried out on the basis of a microchemical process technology with a completely new concept that has solved tasks and problems of the conventional technology called "microchemical process technology," specifically by the principle of the apparatus shown in Patent Document 11 filed by the present applicant. In this apparatus utilizing the principle of mechanical seal, a microscopic distance between processing surfaces being capable of approaching to and separating from each other and being displaced relative to each other to form a forced thin film of a processed fluid to be supplied is realized by the balance between the supply pressure of the fluid supplied between the rotating processing surfaces and the pressure exerted between the rotating processing surfaces. Methods prior to the method based on the above principle are those that involve mechanically regulating the distance between the processing surfaces and cannot absorb heat generated by rotation and its accompanying deformation or run-out, thus making substantially impossible to reduce the minute space between the processing surfaces to 10 μm or less. That is, instant chemical/physicochemical reactions in a microscopic flow path can be realized by utilizing the principle of the apparatus in Patent Document 11 above, and as a result of the present inventor's extensive study, instant stirring/mixing/reaction was made possible surprisingly in a 0.1 to 10 μm microscopic flow path. And ideal reacting site and conditions that can be essentially referred to as "microchemical process technology" can be created by the present invention. Another object of the present invention is to provide a production method in which pigment particles excellent in re-dispersibility can be mass-produced stably by using the production method described above. More specifically, it is an object of the present invention to produce pigment nanoparticles by a method of carrying out a reaction in a thin film fluid formed between processing surfaces arranged to be opposite to each other so as to be able to approach to and separate from each other, at least one of which rotates relative to the other.

For the objects described above, an aspect of the invention defined in claim 1 in this application provides a method for producing pigment nanoparticles, which comprises separating pigment substances in use of a forced ultrathin film rotary reaction method.

An aspect of the invention defined in claim 2 in this application provides a method for producing pigment nanoparticles, which comprises maintaining a minute space of 1 mm or less between two processing surfaces being capable of approaching to and separating from each other and rotating relative to each other, allowing the minute space maintained between the two processing surfaces to serve as a flow path of a fluid to be processed thereby forming a forced thin film of the processed fluid and separating pigment substances in the forced thin film.

An aspect of the invention defined in claim 3 in this application provides a method for producing pigment nanoparticles, which comprises feeding a fluid to be processed between processing surfaces being capable of approaching to and separating from each other and being displaced relatively, maintaining a distance between the processing surfaces to be a minute space by the balance in pressure between a force in the approaching direction and a force in the separating direction including a supply pressure of the fluid and a pressure exerted between the rotating processing surfaces, allowing the minute space maintained between the two processing surfaces to serve as a flow path of the fluid to be processed thereby forming a forced thin film of the processed fluid, and separating pigment substances in the forced thin film.

An aspect of the invention defined in claim 4 in this application provides the method for producing pigment nanoparticles according to claim 1, wherein the forced ultrathin film rotary reaction method comprises a fluid pressure imparting mechanism for imparting predetermined pressure to a fluid to be processed, at least two processing members of a first processing member and a second processing member capable of approaching to and separating from the first processing member, and a rotation drive mechanism for rotating the first processing member and the second processing member relative to each other, wherein each of the processing members is provided with at least two processing surfaces of a first processing surface and a second processing surface disposed in a position they are faced with each other, wherein each of the processing surfaces constitutes part of a sealed flow path through which the fluid under the predetermined pressure is passed, wherein two or more fluids to be processed, at least one of which contains a reactant, are uniformly mixed and positively reacted between the processing surfaces, wherein, of the first and second processing members, at least the second processing member is provided with a pressure-receiving surface, and at least part of the pressure-receiving surface is comprised of the second processing surface, wherein the pressure-receiving surface receives pressure applied to the fluids by the fluid pressure imparting mechanism thereby generating a force to move in the direction of separating the second processing surface from the first processing surface, wherein the fluid under the predetermined pressure is passed between the first and second processing surfaces being capable of approaching to and separating from each other and rotating relative to each other, whereby the processed fluid forms a fluid film of predetermined thickness while passing between both the processing surfaces; and the forced ultrathin film rotary reaction method further comprises another introduction path independent of the flow path through which the fluid to be processed under the predetermined pressure is passed, and at least one opening that leads to the introduction path and is arranged in at least either the first processing surface or the second processing surface, wherein at least one processed fluid sent from the introduction path is introduced into between the processing surfaces, whereby the reactant contained in at least anyone the aforementioned processed fluids, and a fluid other than said processed fluid enable a state of desired reaction by mixing under uniform stirring in the fluid film.

An aspect of the invention defined in claim 5 in this application provides the method for producing pigment nanoparticles according to any one of claims 1 to 4, wherein the reaction used in the forced ultrathin film rotary reaction method is an acid pasting method in which a pigment acidic solution prepared by dissolving pigment substances in a strong acid such as sulfuric acid, nitric acid or hydrochloric acid is mixed with a water-containing solution thereby giving pigment particles.

An aspect of the invention defined in claim 6 in this application provides the method for producing pigment nanoparticles according to any one of claims 1 to 4, wherein the reaction used in the forced ultrathin film rotary reaction method is a re-precipitation method in which a pigment solution prepared by dissolving pigment substances in an organic solvent is introduced into a poor solvent which is poor to the pigment but is compatible with the organic solvent used in preparation of the solution thereby separating pigment particles.

An aspect of the invention defined in claim 7 in this application provides the method for producing pigment nanoparticles according to any one of claims 1 to 4, wherein the reaction used in the forced ultrathin film rotary reaction method is a pH regulating method in which a pigment solution having at least one kind of pigment substance dissolved either in an acidic or alkaline pH regulating solution or in a mixed solution of the pH regulating solution and an organic solvent is mixed with a pigment-separating solution which changes the pH of the pigment solution and which does not show solubility for the pigment contained in the pigment solution or has lower solubility for the pigment than that of the solvent contained in the pigment solution thereby separating pigment particles.

An aspect of the invention defined in claim 8 in this application provides the method for producing pigment nanoparticles according to any one of claims 1 to 7, wherein at least one of the reactant-containing processed fluids contains a dispersant such as a block copolymer, a high-molecular polymer or a surfactant.

An aspect of the invention defined in claim 9 in this application provides the method for producing pigment nanoparticles according to any one of claims 1 to 8, wherein the space between the processing surfaces is cooled or heated to attain desired reaction conditions.

An aspect of the invention defined in claim 10 in this application provides the method for producing pigment nanoparticles according to any one of claims 1 to 9, wherein the forced ultrathin film rotary reaction method is conducted in a container capable of securing a depressurized or vacuum state, to form a depressurized or vacuum state of the secondary side at which the fluid after processing is discharged thereby removing a solvent or a gas generated during the reaction and a gas discharged from the processing members.

An aspect of the invention defined in claim 11 in this application provides the method for producing pigment nanoparticles according to any one of claims 1 to 10, wherein the volume-average particle size, in particle size distribution, of the obtained pigment nanoparticles is 1 nm to 200 nm.

An aspect of the invention defined in claim 12 in this application provides pigment nanoparticles obtained by the method for producing pigment nanoparticles according to anyone of claims 1 to 11.

An aspect of the invention defined in claim 13 in this application provides an inkjet ink using the pigment nanoparticles according to claim 12.

The following effects can be obtained by allowing the respective fluids to join together in a thin-film fluid formed between the processing surfaces arranged to be opposite so as to able to approach to and separate from each other, at lest one of which rotates relative to the other thereby separating pigment nanoparticles in the thin-film fluid by the forced ultrathin film rotary reaction method.

In the above production method, stirring conditions in the minute flow path between the processing surfaces can be changed freely so that the fluid in the minute reaction flow path between the processing surfaces can be instantaneously stirred and mixed to promote the reaction. In addition, the Reynolds number of the fluid in the minute flow path can be freely changed so that pigment nanoparticles which are monodisperse and excellent in re-dispersibility, having an objective particle size, particle shape and crystal form, can be prepared. Because of the self-dischargeability of the pigment monoparticles, the flow path is not clogged with the product, and high pressure is not necessary for flowing the reaction solution, even in the reaction accompanied by separation. Accordingly, pigment nanoparticles can be stably prepared. Moreover, the pigment nanoparticles are characterized by being excellent in safety, being free of contamination with impurities derived from a production apparatus and a method such as those represented by a bead mill method, and being superior in an ability to be cleaned off. Depending on a desired amount of the product, the method can be scaled up by increasing the size of the reactor to provide a method for producing pigment nanoparticles with high productivity.

A mechanical grinding force and shear stress in the reaction, if required depending on operating conditions, can also be coped with.

In the minute flow path between the relatively displaced processing surfaces opposite to each other in the forced ultrathin film rotary reaction method, the distance between the processing surfaces can be strictly fixed thereby giving desired reaction states, and the reaction can be carried out in the minute reaction flow path having a fixed flow path width, thus making the reaction ideal not only from the viewpoint of the rapid mixing and reaction due to molecular diffusion in the minute flow path but also from the viewpoint of concentration gradient as a parameter in chemical reaction, thereby achieving uniform heat generation accompanying the neutralization reaction by acid-alkali and re-crystallization of the pigment, so that the crystal form and particle size of the pigment can be regulated efficiently with higher accuracy.

BRIEF DESCRIPTION OF DRAWINGS

[FIG. 1]

[FIG. 2]
FIG. 2(A) to FIG. 2(D) each show a schematic vertical sectional view showing the concept of still another embodiment of the apparatus shown in FIG. 1.

[FIG. 3]

[FIG. 12]

[FIG. 13]
FIG. 13 is a schematic vertical sectional view showing an important part of another embodiment of a surface-approaching pressure imparting mechanism 4 in the apparatus shown in FIG. 12(A).

FIG. 14 is a schematic vertical sectional view showing an important part of another embodiment of the apparatus shown in FIG. 12(A), which is provided with a temperature regulating jacket.

[FIG. 15]
FIG. 15 is a schematic vertical sectional view showing an important part of still another embodiment of the surface-approaching pressure imparting mechanism 4 in the apparatus shown in FIG. 12(A).

FIG. 17 is a schematic vertical sectional view showing an important part of still another embodiment of the apparatus shown in FIG. 12(A).

[FIG. 18]

[FIG. 19]

[FIG. 20]

[FIG. 21]

[FIG. 22]

[FIG. 23]

[FIG. 24]

FIG. 25 is a schematic vertical sectional view showing outline of the apparatus of the present invention.

[FIG. 27]

[FIG. 28]

[FIG. 29]

FIG. 29 is a diagram for explaining a pressure-receiving surface arranged in the processing member.

FIG. 30 is an electron micrograph of pigment nanoparticles.

FIG. 31 is an electron micrograph of pigment nanoparticles.

FIG. 32 is an electron micrograph of pigment nanoparticles.

BEST MODE FOR CARRYING OUT THE INVENTION

Figure 30:
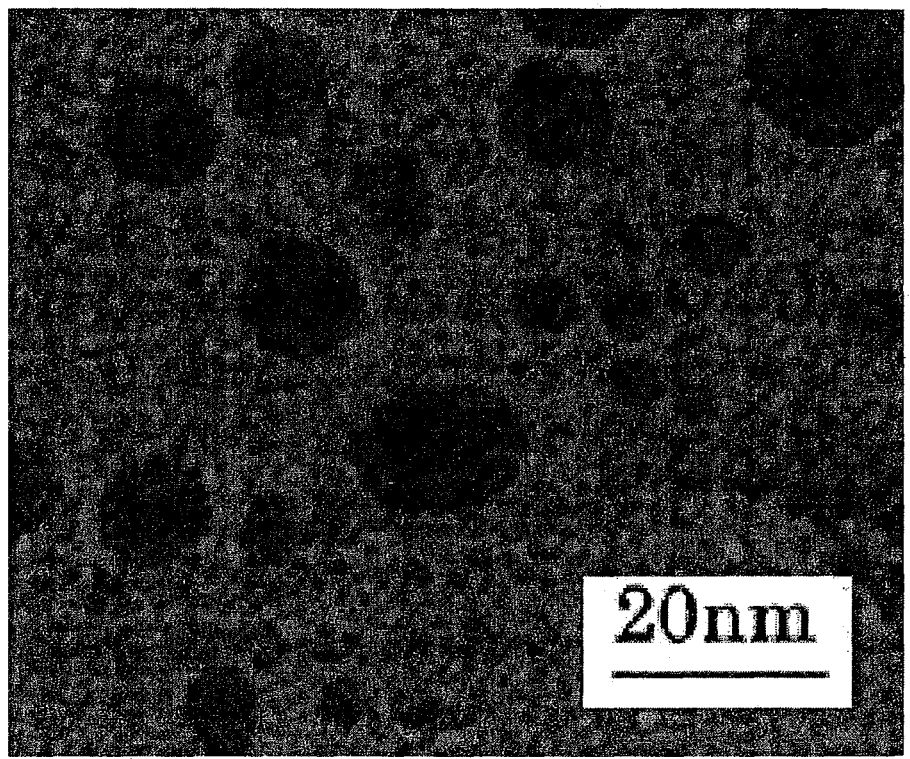
[FIG. 30]

The present invention makes use of an apparatus having the same principle as that described in JP-A 2004-49957 (Patent Document 11) filed by the present applicant, to carry out separation, precipitation or crystallization with the forced ultrathin film rotary reaction method to produce pigment nanoparticles, thereby obtaining pigment nanoparticles excellent in re-dispersibility having an average particle size, in particle distribution, of 200 nm or less, preferably 1 nm to 100 nm, more preferably 5 nm to 50 nm, as shown in FIG. 30, for example.

Hereinafter, the fluid processing apparatus suitable for carrying out this method is described.

Figure 1A:
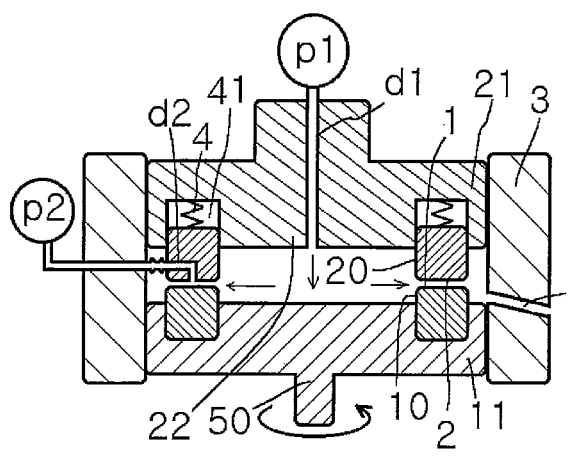
FIG. 1(A) is a schematic vertical sectional view showing the concept of the apparatus used for carrying out the present invention.

As shown in FIG. 1(A), this apparatus includes opposing first and second processing members 10 and 20, at least one of which rotates to the other. The opposing surfaces of both the processing members 10 and 20 serve as processing surfaces to process a fluid to be processed therebetween. The first processing member 1 includes a first processing surface 1, and the second processing member 20 includes a second processing surface 2.

Both the processing surfaces 1 and 2 are connected to a flow path of the fluid to constitute a part of the flow path of the fluid.

Specifically, this apparatus constitutes flow paths of at least two fluids to be processed and joins the flow paths together.

That is, this apparatus is connected to a flow path of a first fluid to form a part of the flow path of the first fluid and simultaneously forms a part of a flow path of a second fluid other than the first fluid. This apparatus joins both the flow paths together thereby mixing and reacting both the fluids between the processing surfaces 1 and 2. In the embodiment shown in FIG. 1(A), each of the flow paths is hermetically closed and made liquid-tight (when the processed fluid is a liquid) or air-tight (when the processed fluid is a gas).

Specifically, this apparatus as shown in FIG. 1(A) includes the first processing member 10, the second processing member 20, a first holder 11 for holding the first processing member 10, a second holder 21 for holding the second processing member 20, a surface-approaching pressure imparting mechanism 4, a rotation drive member, a first introduction part d1, a second introduction part d2, a fluid pressure imparting mechanism p1, a second fluid supply part p2, and a case 3.

Illustration of the rotation drive member is omitted.

At least one of the first processing member 10 and the second processing member 20 is able to approach to and separate from each other, and the processing surfaces 1 and 2 are able to approach to and separate from each other.

In this embodiment, the second processing member 20 approaches to and separates from the first processing member 10. On the contrary, the first processing member 10 may approach to and separate from the second processing member 20, or both the processing members 10 and 20 may approach to and separate from each other.

The second processing member 20 is disposed over the first processing member 10, and the lower surface of the second processing member 20 serves as the second processing surface 2, and the upper surface of the first processing member 10 serves as the first processing surface 1.

As shown in FIG. 1(A), the first processing member 10 and the second processing member 20 in this embodiment are circular bodies, that is, rings. Hereinafter, the first processing member 10 is referred to as a first ring 10, and the second processing member 20 as a second ring 20.

Both the rings 10 and 20 in this embodiment are metallic members having, at one end, a mirror-polished surface, respectively, and their mirror-polished surfaces are referred to as the first processing surface 1 and the second processing surface 2, respectively. That is, the upper surface of the first ring 10 is mirror-polished as the first processing surface 1, and the lower surface of the second ring is mirror-polished as the second processing surface 2.

At least one of the holders can rotate relative to the other holder by the rotation drive member. In FIG. 1(A), numerical 50 indicates a rotary shaft of the rotation drive member. The rotation drive member may use an electric motor. By the rotation drive member, the processing surface of one ring can rotate relative to the processing surface of the other ring.

In this embodiment, the first holder 11 receives drive power on the rotary shaft 50 from the rotation drive member and rotates relative to the second holder 21, whereby the first ring 10 integrated with the first holder 10 rotates relative to the second ring 20. Inside the first ring 10, the rotary shaft 50 is disposed in the first holder 11 so as to be concentric, in a plane, with the center of the circular first ring 10.

The first ring 10 rotates centering on the shaft center of the ring 10. The shaft center (not shown) is a virtual line referring to the central line of the ring 10.

In this embodiment as described above, the first holder 11 holds the first ring 10 such that the first processing surface 1 of the first ring 10 is directed upward, and the second holder 21 holds the second ring 20 such that the second processing surface 2 of the second ring 20 is directed downward.

Specifically, the first and second holders 11 and 21 include a ring-accepting concave part, respectively. In this embodiment, the first ring 11 is fitted in the ring-accepting part of the first holder 11, and the first ring 10 is fixed in the ring-accepting part so as not to rise from, and set in, the ring-accepting part of the first holder 11.

That is, the first processing surface 1 is exposed from the first holder 11 and faces the second holder 21.

Examples of the material for the first ring 10 include metal, ceramics, sintered metal, abrasion-resistant steel, metal subjected to hardening treatment, and rigid materials subjected to lining, coating or plating. The first processing member 10 is preferably formed of a lightweight material for rotation. A material for the second ring 20 may be the same as that for the first ring 10.

The ring-accepting part 41 arranged in the second holder 21 accepts the processing member 2 of the second ring 20 such that the processing member can rise and set.

The ring-accepting part 41 of the second holder 21 is a concave portion for mainly accepting that side of the second ring 20 opposite to the processing surface 2, and this concave portion is a groove which has been formed into a circle when viewed in a plane.

The ring-accepting part 41 is formed to be larger in size than the second ring 20 so as to accept the second ring 20 with sufficient clearance between itself and the second ring 20.

By this clearance, the second ring 20 in the ring-accepting part 41 can be displaced not only in the axial direction of the circular ring-accepting part 41 but also in a direction perpendicular to the axial direction. In other words, the second ring 20 can, by this clearance, be displaced relative to the ring-accepting part 41 to make the central line of the ring 20 unparallel to the axial direction of the ring-accepting part 41.

Hereinafter, that portion of the second holder 21 which is surrounded by the second ring 20 is referred to as a central portion 22.

In other words, the second ring 20 is displaceably accepted within the ring-accepting part 41 not only in the thrust direction of the ring-accepting part 41, that is, in the direction in which the ring 20 rises from and sets in the part 41, but also in the decentering direction of the ring 20 from the center of the ring-accepting part 41. Further, the second ring 20 is accepted in the ring-accepting part 41 such that the ring 20 can be displaced (i.e. run-out) to vary the width between itself upon rising or setting and the ring-accepting part 41, at each position in the circumferential direction of the ring 20.

The second ring 20, while maintaining the degree of its move in the above three directions, that is, the axial direction, decentering direction and run-out direction of the second ring 20 relative to the ring-accepting part 41, is held on the second holder 21 so as not to follow the rotation of the first ring 10. For this purpose, suitable unevenness (not shown) for regulating rotation in the circumferential direction of the ring-accepting part 41 may be arranged both in the ring-accepting part 41 and in the second ring 20. However, the unevenness should not deteriorate displacement in the degree of its move in the three directions.

The surface-approaching pressure imparting mechanism 4 supplies the processing members with force exerted in the direction of approaching the first processing surface 1 and the second processing surface 2 each other. In this embodiment, the surface-approaching pressure imparting mechanism 4 is disposed in the second holder 21 and biases the second ring 20 toward the first ring 10.

The surface-approaching pressure imparting mechanism 4 uniformly biases each position in the circumferential direction of the second ring 20, that is, each position of the processing surface 2, toward the first ring 10. A specific structure of the surface-approaching pressure imparting mechanism 4 will be described later.

As shown in FIG. 1(A), the case 3 is arranged outside the outer circumferential surfaces of both the rings 10 and 20, and accepts a product formed between the processing surfaces 1 and 2 and discharged to the outside of both the rings 10 and 20. As shown in FIG. 1(A), the case 3 is a liquid-tight container for accepting the first holder 10 and the second holder 20. However, the second holder 20 may be that which as a part of the case, is integrally formed with the case 3.

As described above, the second holder 21 whether formed as a part of the case 3 or formed separately from the case 3 is not movable so as to influence the distance between both the rings 10 and 20, that is, the distance between the processing surfaces 1 and 2. In other words, the second holder 21 does not influence the distance between the processing surfaces 1 and 2.

The case 3 is provided with an outlet 32 for discharging a product to the outside of the case 3.

The first introduction part d1 supplies a first fluid to the space between the processing surfaces 1 and 2.

The fluid pressure imparting mechanism p1 is connected directly or indirectly to the first introduction part d1 to impart fluid pressure to the first processed fluid. A compressor or a pump can be used in the fluid pressure imparting mechanism p1.

In this embodiment, the first introduction part d1 is a fluid path arranged inside the central portion 22 of the second holder 21, and one end of the first introduction part d1 is open at the central position of a circle, when viewed in a plane, of the second ring 20 on the second holder 21. The other end of the first introduction part d1 is connected to the fluid pressure imparting mechanism p1 outside the second holder 20, that is, outside the case 3.

The second introduction part d2 supplies a second fluid to be reacted with the first fluid to the space between the processing surfaces 1 and 2. In this embodiment, the second introduction part is a fluid passage arranged inside the second ring 20, and one end of the second introduction part is open at the side of the second processing surface 2, and a second fluid-feeding part p2 is connected to the other end.

A compressor or a pump can be used in the second fluid-feeding part p2.

The first processed fluid pressurized with the fluid pressure imparting mechanism p1 is introduced from the first introduction part d1 to the space between the rings 10 and 20 and will pass through the space between the first processing surface 1 and the second processing surface 2 to the outside of the rings 10 and 20.

At this time, the second ring 20 receiving the supply pressure of the first fluid stands against the bias of the surface-approaching pressure imparting mechanism 4, thereby receding from the first ring 10 and making a minute space between the processing surfaces. The space between both the processing surfaces 1 and 2 by approach and separation of the surfaces 1 and 2 will be described in detail later.

A second fluid is supplied from the second introduction part d2 to the space between the processing surfaces 1 and 2, flows into the first fluid, and is subjected to a reaction promoted by rotation of the processing surface. Then, a reaction product formed by the reaction of both the fluids is discharged from the space between the processing surfaces 1 and 2 to the outside of the rings 10 and 20. The reaction product discharged to the outside of the rings 10 and 20 is discharged finally through the outlet of the case to the outside of the case.

The mixing and reaction of the processed fluid are effected between the first processing surface 1 and the second processing surface 2 by rotation, relative to the second processing member 20, of the first processing member 10 with the drive member 5.

Between the first and second processing surfaces 1 and 2, a region downstream from an opening m2 of the second introduction part d2 serves as a reaction chamber where the first and second processed fluids are reacted with each other. Specifically, as shown in FIG. 11(C) illustrating a bottom face of the second ring 20, a region H shown by oblique lines, outside the second opening m2 of the second introduction part in the radial direction r1 of the second ring 20, serves as the processing chamber, that is, the reaction chamber. Accordingly, this reaction chamber is located downstream from the openings m1 and m2 of the first introduction part d1 and the second introduction part d2 between the processing surfaces 1 and 2.

The first fluid introduced from the first opening m1 through a space inside the ring into the space between the processing surfaces 1 and 2, and the second fluid introduced from the second opening m2 into the space between the processing surfaces 1 and 2, are mixed with each other in the region H serving as the reaction chamber, and both the processed fluids are reacted with each other. The fluid will, upon receiving supply pressure from the fluid pressure imparting mechanism p1, move through the minute space between the processing surfaces 1 and 2 to the outside of the rings, but because of rotation of the first ring 10, the fluid mixed in the reaction region H does not move linearly from the inside to the outside of the rings in the radial direction, but moves from the inside to the outside of the ring spirally around the rotary shaft of the ring when the processing surfaces are viewed in a plane. In the region H where the fluids are thus mixed and reacted, the fluids can move spirally from inside to outside to secure a zone necessary for sufficient reaction in the minute space between the processing surfaces 1 and 2, thereby promoting their uniform reaction.

The product formed by the reaction becomes a uniform reaction product in the minute space between the first processing surface 1 and the second processing surface 2 and appears as microparticles particularly in the case of crystallization or separation.

By the balance among at least the supply pressure applied by the fluid pressure imparting mechanism p1, the bias of the surface-approaching pressure imparting mechanism 4, and the centrifugal force resulting from rotation of the ring, the distance between the processing surfaces 1 and 2 can be balanced to attain a preferable minute space, and further the processed fluid receiving the supply pressure applied by the fluid pressure imparting mechanism p1 and the centrifugal force by rotation of the ring moves spirally in the minute space between the processing surfaces 1 and 2, so that their reaction is promoted.

The reaction is forcedly effected by the supply pressure applied by the fluid pressure imparting mechanism p1 and the rotation of the ring. That is, the reaction occurs under forced uniform mixing between the processing surfaces 1 and 2 arranged opposite to each other so as to be able to approach to and separate from each other, at least one of which rotates relative to the other.

Accordingly, the crystallization and separation of the product formed by the reaction can be regulated by relatively easily controllable methods such as regulation of supply pressure applied by the fluid pressure imparting mechanism p1 and regulation of the rotating speed of the ring, that is, the number of rotations of the ring.

As described above, this processing apparatus is excellent in that the space between the processing surfaces 1 and 2, which can exert influence on the size of a product, and the distance in which the processed fluid moves in the reaction region H, which can exert influence on production of a uniform product, can be regulated by the supply pressure and the centrifugal force.

The reaction processing gives not only deposit of the product but also liquids.

The rotary shaft 50 is not limited to the vertically arranged one and may be arranged in the horizontal direction or arranged at a slant. This is because during processing, the reaction occurs in such a minute space between the processing surfaces 1 and 2 that the influence of gravity can be substantially eliminated.

In FIG. 1(A), the first introduction part d1 extends vertically and coincides with the shaft center of the second ring 20 in the second holder 21. However, the first introduction part d1 is not limited to the one having a center coinciding with the shaft center of the second ring 20 and may be arranged in other positions in the central portion 22 of the second holder 21 as long as the first fluid can be supplied into the space surrounded by the rings 10 and 20, and the first introduction part d1 may extend obliquely as well as vertically.

Figure 12A:
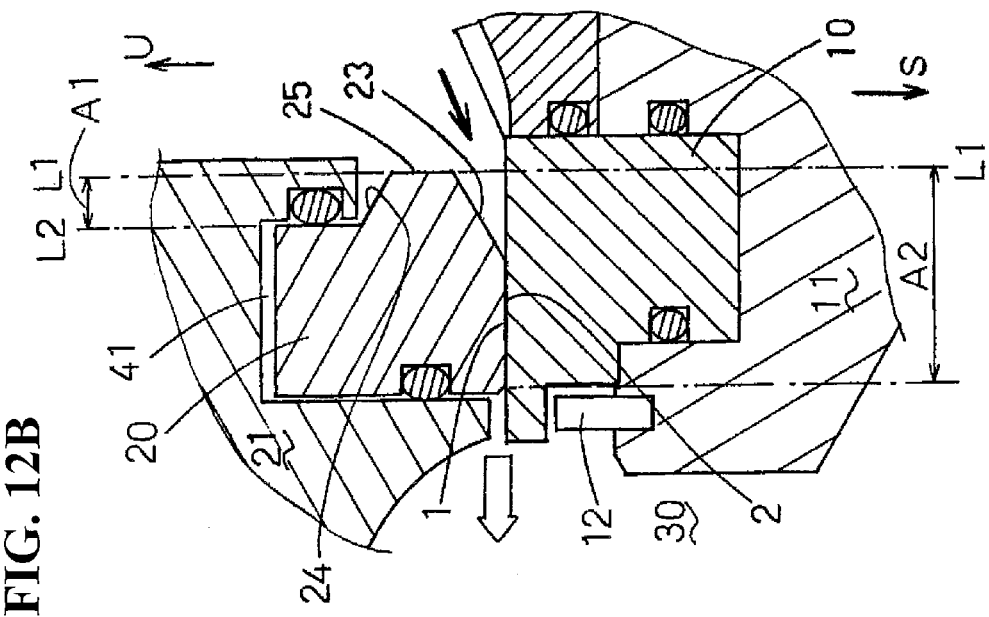
FIG. 12(A) is a schematic vertical sectional view showing an important part of another embodiment of a pressure-receiving surface in the apparatus shown in FIG. 1(A)

A more preferable embodiment of the apparatus is shown in FIG. 12(A). As shown in this figure, the second processing member 20 has the second processing surface 2 and a pressure-receiving surface 23 which is positioned inside, and situated next to, the second processing surface 2. Hereinafter, the pressure-receiving surface 23 is also referred to as a separation-regulating surface 23. As shown in the figure, the separation regulating surface 23 is an inclined surface.

As described above, the ring-accepting part 41 is formed in the bottom (i.e. a lower part) of the second holder 21, and the second processing member 20 is accepted in the ring-accepting part 41. The second processing member 20 is held by the second holder 21 so as not to be rotated with a baffle (not shown). The second processing surface 2 is exposed from the second holder 21.

In this embodiment, a material to be processed is introduced inside the first processing member 10 and the second processing member 20 between the processing surfaces 1 and 2, and the processed material is discharged to the outside of the first processing member 10 and the second processing member 20.

The surface-approaching pressure imparting mechanism 4 presses by pressure the second processing surface 2 against the first processing surface 1 to make them contacted with or close to each other, and generates a fluid film of predetermined thickness by the balance between the surface-approaching pressure and the force, e.g. fluid pressure, of separating the processing surfaces 1 and 2 from each other. In other words, the distance between the processing surfaces 1 and 2 is kept in a predetermined minute space by the balance between the forces.

Specifically, the surface-approaching pressure imparting mechanism 4 in this embodiment is comprised of the ring-accepting part 41, a spring-accepting part 42 arranged in the depth of the ring-accepting part 41, that is, in the deepest part of the ring-accepting part 41, a spring 43, and an air introduction part 44.

However, the surface-approaching pressure imparting mechanism 4 may be the one including at least one member selected from the ring-accepting part 41, the spring-accepting part 42, the spring 43, and the air introduction part 44.

The ring-accepting part 41 has the second processing member 20 fit into it with play to enable the second processing member 20 to be displaced vertically deeply or shallowly, that is, vertically in the ring-accepting part 41.

One end of the spring 43 is abutted against the depth of the spring-accepting part 42, and the other end of the spring 43 is abutted against the front (i.e., the upper part) of the second processing member 20 in the ring-accepting part 41. In FIG. 1, only one spring 43 is shown, but a plurality of springs 44 are preferably used to press various parts of the second processing member 20. This is because as the number of springs 43 increases, pressing pressure can be given more uniformly to the second processing member 20. Accordingly, several to a few dozen springs 43 comprising a multi-spring type preferably attach to the second holder 21.

In this embodiment, air can be introduced through the air introduction part 44 into the ring-accepting part 41. By such introduction of air, air pressure together with pressure by the spring 43 can be given as pressing pressure from the space, as a pressurizing chamber, between the ring-accepting part 41 and the second processing member 20 to the second processing member 20. Accordingly, adjusting the pressure of air introduced through the air introduction part 44 can regulate the surface-approaching pressure of the second processing surface 2 toward the first processing surface 1 during operation. A mechanism of generating pressing pressure with another fluid pressure such as oil pressure can be utilized in place of the air introduction part 44 utilizing air pressure.

The surface-approaching pressure imparting mechanism 4 not only supplies and regulates a part of the pressing pressure, that is, the surface-approaching pressure, but also serves as a displacement regulating mechanism and a buffer mechanism.

Specifically, the surface-approaching pressure imparting mechanism 4 as a displacement regulating mechanism can maintain initial pressing pressure by regulating air pressure against the change in the axial direction caused by elongation or abrasion at the start of or in the operation. As described above, the surface-approaching pressure imparting mechanism 4 uses a floating mechanism of maintaining the second processing member 20 so as to be displaced, thereby also functioning as a buffer mechanism for micro-vibration or rotation alignment.

Now, the state of the thus constituted processing apparatus during use is described with reference to FIG. 1(A).

At the outset, a first fluid to be processed is pressurized with the fluid pressure imparting mechanism p1 and introduced through the first introduction part d1 into the internal space of the sealed case. On the other hand, the first processing member 10 is rotated with the rotation of the rotary shaft 50 by the rotation drive member. The first processing surface 1 and the second processing surface 2 are thereby rotated relatively with a minute space kept therebetween.

The first processed fluid is formed into a fluid film between the processing surfaces 1 and 2 with a minute space kept therebetween, and a second fluid to be processed which is introduced through the second introduction part d2 flows into the fluid film between the processing surfaces 1 and 2 to comprise a part of the fluid film. By this, the first and second processed fluids are mixed with each other, and a uniform reaction of both of the fluids being reacted with each other is promoted to form a reaction product. When the reaction is accompanied by separation, relatively uniform and fine particles can be formed. Even when the reaction is not accompanied by separation, a uniform reaction can be realized. The separated reaction product may be further finely pulverized by shearing between the first processing surface 1 and the second processing surface 2 with the rotation of the first processing surface 1. The first processing surface 1 and the second processing surface 2 are regulated to form a minute space of 1 µm to 1 mm, particularly 1 µl to 10 µm thereby realizing a uniform reaction and enabling production of superfine particles of several nm in diameter.

The product is discharged from the processing surfaces 1 and 2 through an outlet 33 of the case 3 to the outside of the case. The discharged product is atomized in a vacuum or depressurized atmosphere with a well-known decompression device and converted into liquid in the atmosphere to collide with each other, then what trickled down in the liquid is able to be collected as degassed liquid.

In this embodiment, the processing apparatus is provided with a case, but may be carried out without a case. For example, a decompression tank for degassing, that is, a vacuum tank, is arranged, and the processing apparatus may be arranged in this tank. In this case, the outlet mentioned above is naturally not arranged in the processing apparatus.

As described above, the first processing surface 1 and the second processing surface 2 can be regulated to form a minute space in the order of µm which cannot be formed by arranging mechanical clearance. Now, this mechanism is described.

The first processing surface 1 and the second processing surface 2 are capable of approaching to and separating from each other, and simultaneously rotate relative to each other. In this example, the first processing surface 1 rotates, and the second processing surface 2 slides in the axial direction thereby approaching to and separating from the first processing surface.

In this example, therefore, the position of the second processing surface 2 in the axial direction is arranged accurately in the order of µm by the balance between forces, that is, the balance between the surface-approaching pressure and the separating pressure, thereby establishing a minute space between the processing surfaces 1 and 2.

As shown in FIG. 12(A), the surface-approaching pressure includes the pressure by air pressure (positive pressure) from the air introduction part 44 by the surface-approaching pressure imparting mechanism 4, the pressing pressure with the spring 43, and the like.

Figure 14:
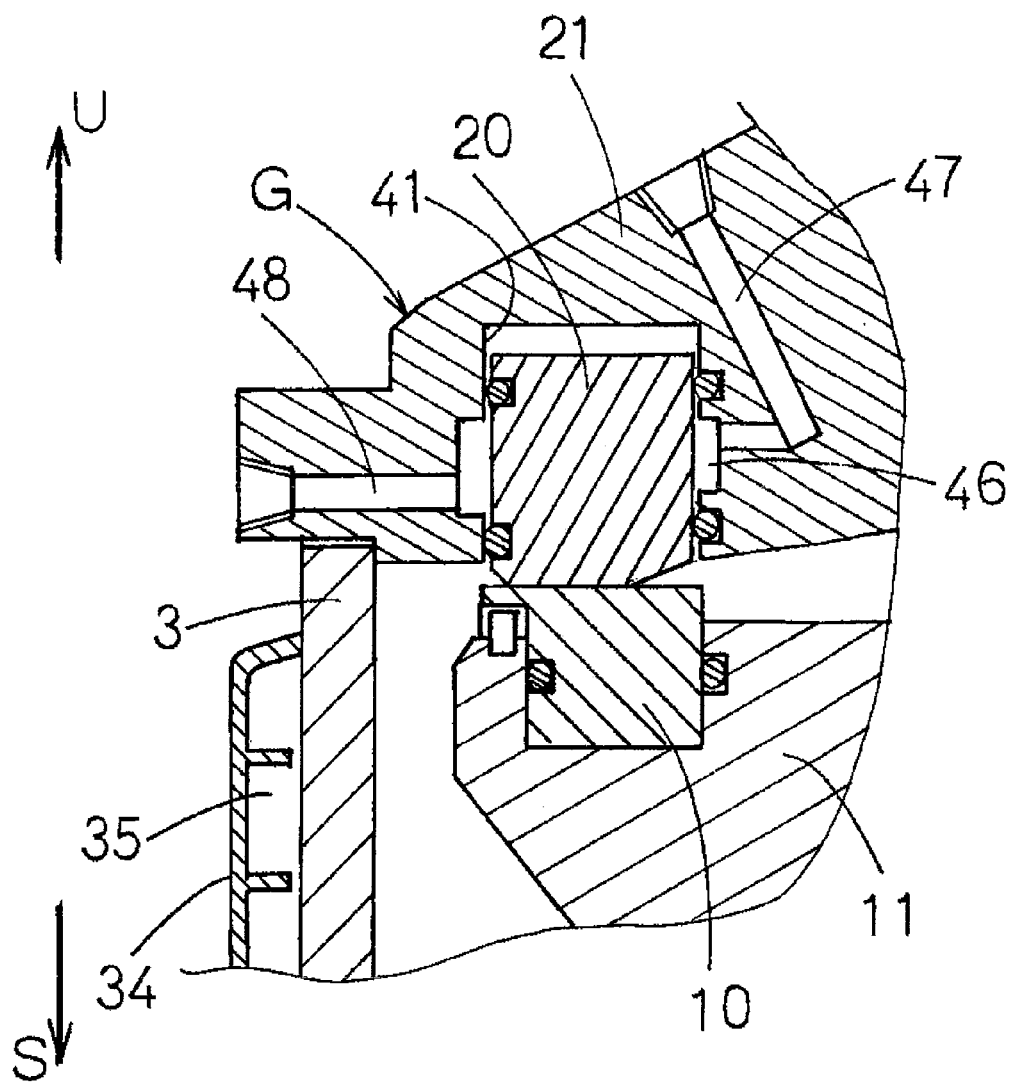
[FIG. 14]

The embodiments shown in FIG. 13 to FIG. 15 are shown by omitting the second introduction part d2 to simplify the drawings. In this respect, these drawings may be assumed to show sections at a position not provided with the second introduction part d2. In the figures, U and S show upward and downward directions respectively.

On the other hand, the separating force include the fluid pressure acting on the pressure-receiving surface at the separating side, that is, on the second processing surface 2 and the separation regulating surface 23, the centrifugal force resulting from rotation of the first processing member 1, and the negative pressure when negative pressure is applied to the air introduction part 44.

When the apparatus is washed, the negative pressure applied to the air introduction part 44 can be increased to significantly separate the processing surfaces 1 and 2 from each other, thereby facilitating washing.

By the balance among these forces, the second processing surface 2 while being remote by a predetermined minute space from the first processing surface 1 is stabilized, thereby realizing establishment with accuracy in the order of.

The separating force is described in more detail.

With respect to fluid pressure, the second processing member 20 in a closed flow path receives feeding pressure of a processed fluid, that is, fluid pressure, from the fluid pressure imparting mechanism p. In this case, the surfaces opposite to the first processing surface in the flow path, that is, the second processing surface 2 and the separation regulating surface 23, act as pressure-receiving surfaces at the separating side, and the fluid pressure is applied to the pressure-receiving surfaces to generate a separating force due to the fluid pressure.

With respect to centrifugal force, the first processing member 10 is rotated at high speed, centrifugal force is applied to the fluid, and a part of this centrifugal force acts as separating force in the direction in which the processing surfaces 1 and 2 are separated from each other.

When negative pressure is applied from the air introduction part 44 to the second processing member 20, the negative pressure acts as separating force.

In the foregoing description of the present invention, the force of separating the first and second processing surfaces 1 and 2 from each other has been described as a separating force, and the above-mentioned force is not excluded from the separating force.

By forming a balanced state of the separating force and the surface-approaching pressure applied by the surface-approaching pressure imparting mechanism 4 via the processed fluid between the processing surfaces 1 and 2 in the flow path of the closed processed fluid, a uniform reaction is realized between the processing surfaces 1 and 2, and simultaneously a fluid film suitable for crystallization and separation of microscopic reaction products is formed as described above. In this manner, this apparatus can form a forced fluid film between the processing surfaces 1 and 2 via which a minute space not achievable with a conventional mechanical apparatus can be kept between the processing surfaces 1 and 2, and microparticles can be formed highly accurately as the reaction product.

In other words, the thickness of the fluid film between the processing surfaces 1 and 2 is regulated as desired by regulating the separating force and surface-approaching pressure, thereby realizing a necessary uniform reaction to form and process microscopic products. Accordingly, when the thickness of the fluid film is to be decreased, the surface-approaching pressure or separating force may be regulated such that the surface-approaching pressure is made relatively higher than the separating force. When the thickness of the fluid film is to be increased, the separating force or surface-approaching pressure may be regulated such that the separating force is made relatively higher than the surface-approaching pressure.

When the surface-approaching pressure is increased, air pressure, that is, positive pressure is applied from the air introduction part 44 by the surface-approaching pressure imparting mechanism 4, or the spring 43 is changed to the one having higher pressing pressure, or the number of springs may be increased.

When the separating force is to be increased, the feeding pressure of the fluid pressure imparting mechanism p1 is increased, or the area of the second processing surface 2 or the separation regulating surface 23 is increased, or in addition, the rotation of the second processing member 20 is regulated to increase centrifugal force or reduce pressure from the air introduction part 44. Alternatively, negative pressure may be applied. The spring 43 shown is a pressing spring that generates pressing pressure in an extending direction, but may be a pulling spring that generates a force in a compressing direction to constitute a part or the whole of the surface-approaching pressure imparting mechanism 4.

When the separating force is to be decreased, the feeding pressure of the fluid pressure imparting mechanism p1 is reduced, or the area of the second processing surface 2 or the separation regulating surface 23 is reduced, or in addition, the rotation of the second processing member 20 is regulated to decrease centrifugal force or increase pressure from the air introduction part 44. Alternatively, negative pressure may be reduced.

Further, properties of a processed fluid, such as viscosity, can be added as a factor for increasing or decreasing the surface-approaching pressure and separating force, and regulation of such properties of a processed fluid can be performed as regulation of the above factor.

In the separating force, the fluid pressure exerted on the pressure-receiving surface at the separating side, that is, the second processing surface 2 and the separation regulating surface 23 is understood as a force constituting an opening force in mechanical seal.

In the mechanical seal, the second processing member 20 corresponds to a compression ring, and when fluid pressure is applied to the second processing member 20, the force of separating the second processing member 20 from the first processing member 10 is regarded as opening force.

More specifically, when the pressure-receiving surfaces at a separating side, that is, the second processing surface 2 and the separation regulating surface 23 only are arranged in the second processing member 20 as shown in the first embodiment, all feeding pressure constitutes the opening force. When a pressure-receiving surface is also arranged at the backside of the second processing member 20, specifically in the case of FIG. 12(B) and FIG. 17 described later, the difference between the feeding pressure acting as a separating force and the feeding pressure acting as surface-approaching pressure is the opening force.

Now, other embodiments of the second processing member 20 are described with reference to FIG. 12(B).

Figure 12B:
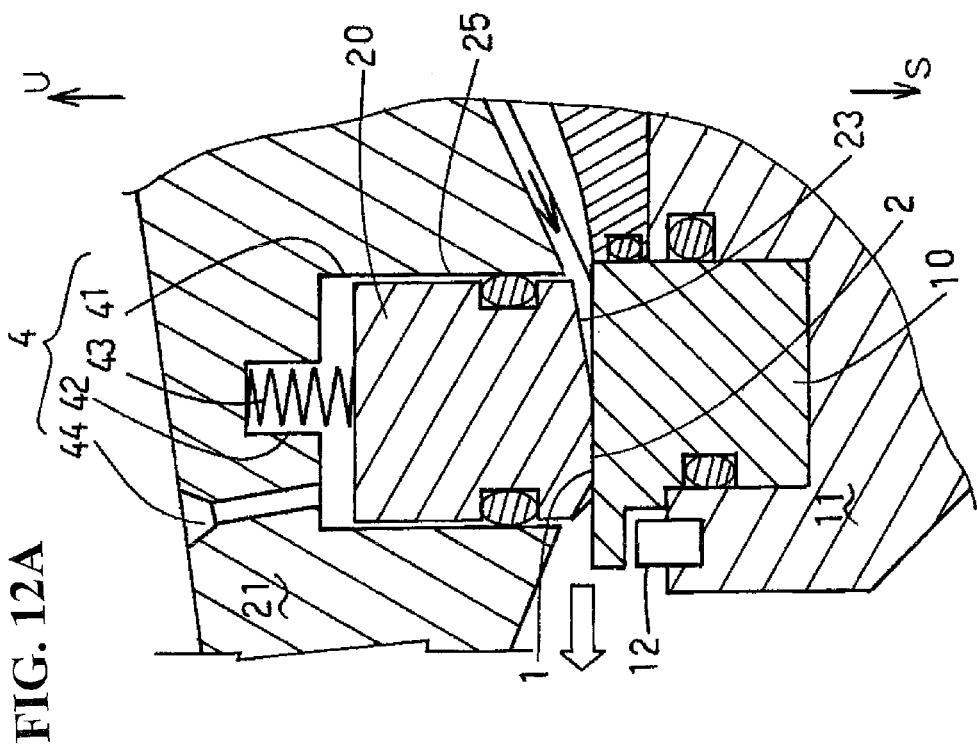
FIG. 12(B) is a schematic vertical sectional view showing an important part of still another embodiment of the apparatus.

As shown in FIG. 12(B), an approach regulating surface 24 facing upward, that is, at the other side of the second processing surface 2, is disposed at the inner periphery of the second processing member 20 exposed from the ring-accepting part 41.

That is, the surface-approaching pressure imparting mechanism 4 in this embodiment is comprised of a ring-accepting part 41, an air introduction part 44, and the approach regulating surface 24. However, the surface-approaching pressure imparting mechanism 4 may be one including at least one member selected from the ring-accepting part 41, the spring-accepting part 42, the spring 43, the air introduction part 44, and the approach regulating surface 24.

The approach regulating surface 24 receives predetermined pressure applied to a processed fluid to generate a force of approaching the second processing surface 2 to the first processing surface 1, thereby functioning in feeding surface-approaching pressure as a part of the surface-approaching pressure imparting mechanism 4. On the other hand, the second processing surface 2 and the separation regulating surface 23 receive predetermined pressure applied to a processed fluid to generate a force of separating the second processing surface 2 from the first processing surface 1, thereby functioning in feeding a part of the separating force.

The approach regulating surface 24, the second processing surface 2 and the separation regulating surface 23 are pressure-receiving surfaces receiving feeding pressure of the processed fluid, and depending on its direction, exhibits different actions, that is, generation of the surface-approaching pressure and generation of separating force.

The ratio (area ratio A1/A2) of a projected area A1 of the approach regulating surface 24 projected on a virtual plane perpendicular to the direction of approaching and separating the processing surfaces, that is, in the direction of rising and setting of the second ring 20, to a total area A2 of the projected area of the second processing surface 2 and the separating side pressure-receiving surface 23 of the second processing member 20 projected on the virtual plane is called balance ratio K which is important for regulation of the opening force.

Both the top of the approach regulating surface 24 and the top of the separating side pressure-receiving surface 23 are defined by inner periphery 25 of the circular second regulating part 20, that is, by top line L1. Accordingly, the balance ratio is regulated for deciding the place where base line L2 of the approach regulating surface 24 is to be placed.

That is, in this embodiment, when the feeding pressure of the processed fluid is utilized as opening force, the total projected area of the second processing surface 2 and the separation regulating surface 23 is made larger than the projected area of the approach regulating surface 24, thereby generating an opening force in accordance with the area ratio.

The opening force can be regulated by the pressure of the processed fluid, that is, the fluid pressure, by changing the balance line, that is, by changing the area A1 of the approach regulating surface 24.

Sliding surface actual surface pressure P, that is, the fluid pressure out of the surface-approaching pressure, is calculated according to the following equation:

$$P = P1 \times (K-k) + Ps$$

wherein P1 represents the pressure of a processed fluid, that is, fluid pressure; K represents the balance ratio; k represents an opening force coefficient; and Ps represents a spring and back pressure.

By regulating this balance line to regulate the sliding surface actual surface pressure P, the space between the processing surfaces 1 and 2 is formed as a desired minute space, thereby forming a fluid film of a processed fluid to make the product minute and effecting uniform reaction processing.

Usually, as the thickness of a fluid film between the processing surfaces 1 and 2 is decreased, the product can be made finer. On the other hand, as the thickness of the fluid film is increased, processing becomes rough and the throughput per unit time is increased. By regulating the sliding surface actual surface pressure P on the sliding surface, the space between the processing surfaces 1 and 2 can be regulated to realize the desired uniform reaction and to obtain the minute product. Hereinafter, the sliding surface actual surface pressure P is referred to as surface pressure P.

From this relation, it is concluded that when the product is to be made coarse, the balance ratio may be decreased, the surface pressure P may be decreased, the space may be increased and the thickness of the film may be increased. On the other hand, when the product is to be made finer, the balance ratio may be increased, the surface pressure P may be increased, the space may be decreased and the thickness of the film may be decreased.

As a part of the surface-approaching pressure imparting mechanism 4, the approach regulating surface 24 is formed, and at the position of the balance line, the surface-approaching pressure may be regulated, that is, the space between the processing surfaces may be regulated.

As described above, the space is regulated in consideration of the pressing pressure of the spring 43 and the air pressure of the air introduction part 44. Regulation of the fluid pressure, that is, the feeding pressure of the processed fluid, and regulation of the rotation of the first processing member 10 for regulating centrifugal force, that is, the rotation of the first holder 11, are also important factors to regulate the space.

As described above, this apparatus is constituted such that for the second processing member 20 and the first processing member 10 that rotates relative to the second processing member 20, a predetermined fluid film is formed between the processing surfaces by pressure balance among the feeding pressure of the processed fluid, the rotation centrifugal force, and the surface-approaching pressure. At least one of the rings is formed in a floating structure by which alignment such as run-out is absorbed to eliminate the risk of abrasion and the like.

The embodiment shown in FIG. 1(A) also applies to the embodiment in FIG. 12(B) except that the regulating surface is arranged.

Figure 17:
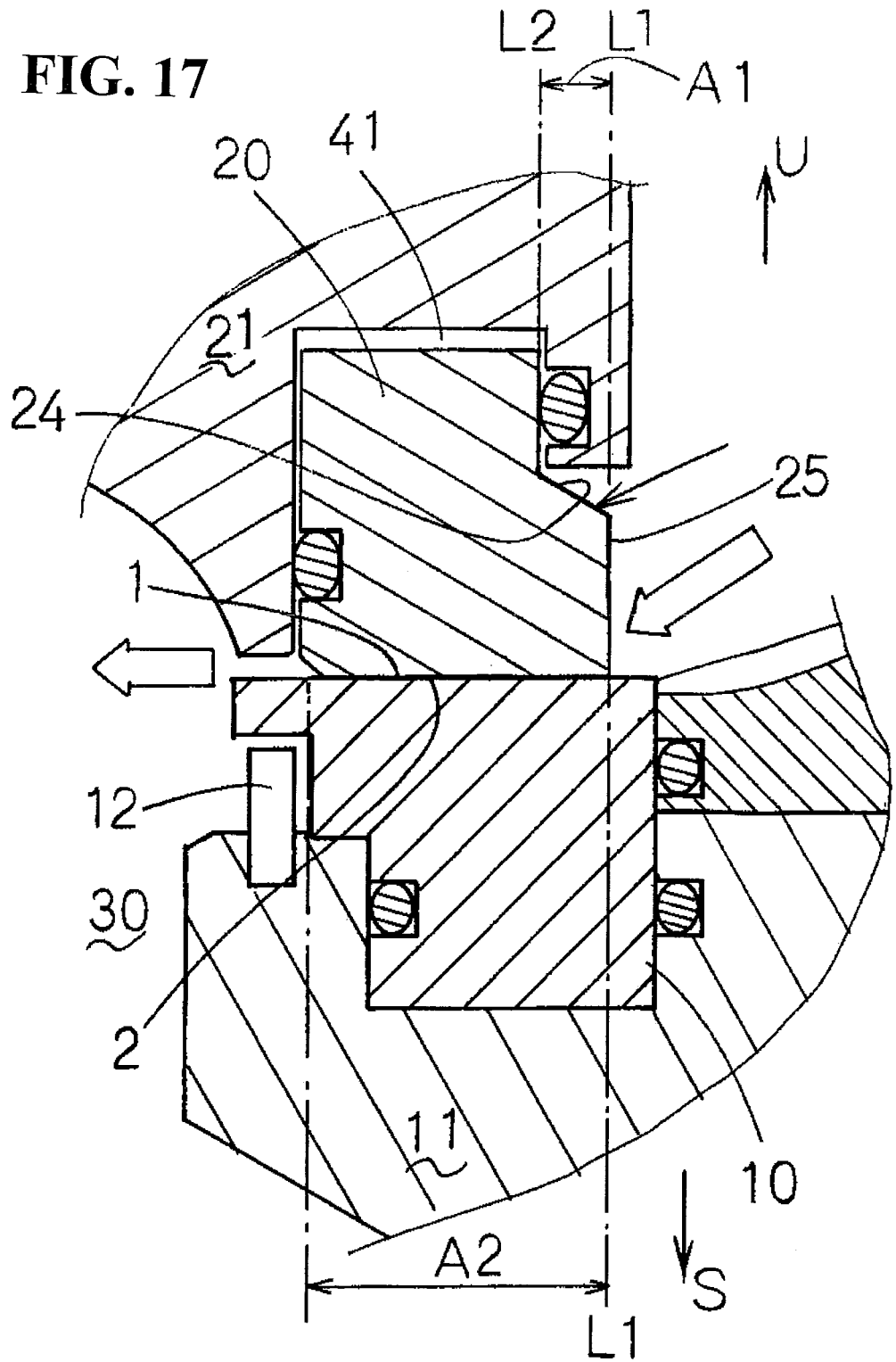
[FIG. 17]

The embodiment shown in FIG. 12(B) can be carried out without arranging the pressure-receiving surface 23 on the separating side, as shown in FIG. 17.

When the approach regulating surface 24 is arranged as shown in the embodiment shown in FIG. 12(B) and FIG. 17, the area A1 of the approach regulating surface 24 is made larger than the area A2, whereby all of the predetermined pressure exerted on the processed fluid functions as surface-approaching pressure, without generating an opening force. This arrangement is also possible, and in this case, both the processing surfaces 1 and 2 can be balanced by increasing other separating force.

With the area ratio described above, the force acting in the direction of separating the second processing surface 2 from the first processing surface 1 is fixed as the resultant force exerted by the fluid.

In this embodiment, as described above, the number of springs 43 is preferably larger in order to impart uniform stress on the sliding surface, that is, the processing surface. However, the spring 43 may be a single coil-type spring as shown in FIG. 13. As shown in the figure, this spring is a single coil spring having a center concentric with the circular second processing member 20.

The space between the second processing member 20 and the second holder 21 is sealed air-tightly with methods well known in the art.

As shown in FIG. 14, the second holder 21 is provided with a temperature regulation jacket 46 capable of regulating the temperature of the second processing member 20 by cooling or heating. Numerical 3 in FIG. 14 is the above-mentioned case, and the case 3 is also provided with a jacket 35 for the same purpose of temperature regulation.

The temperature regulation jacket 46 for the second holder 21 is a water-circulating space formed at a side of the ring-accepting part 41 and communicates with paths 47 and 48 leading to the outside of the second holder 21. One of the paths 47 and 48 introduces a cooling or heating medium into the temperature regulation jacket 46, and the other discharges the medium.

The temperature regulation jacket 35 for the case 3 is a path for passing heating water or cooling water, which is arranged between the outer periphery of the case 3 and a covering part 34 for covering the outer periphery of the case 3.

In this embodiment, the second holder 21 and the case 3 are provided with the temperature regulation jacket, but the first holder 11 can also be provided with such a jacket.

As a part of the surface-approaching pressure imparting mechanism 4, a cylinder mechanism 7 shown in FIG. 15 may be arranged besides the members described above.

The cylinder mechanism 7 includes a cylinder space 70 arranged in the second holder 21, a communicating part 71 that communicates the cylinder space 70 with the ring-accepting part 41, a piston 72 that is accepted in the cylinder space 70 and connected via the communication part 71 to the second processing member 20, a first nozzle 73 that communicates to the upper part of the cylinder space 70, a second nozzle 74 in a lower part of the cylinder space 70, and a pressing body 75 such as spring between the upper part of the cylinder space 70 and the piston 72.

The piston 72 can slide vertically in the cylinder space 70, and the second processing member 20 can slide vertically with sliding of the piston 72, to change the gap between the first processing surface 1 and the second processing surface 2.

Although not shown in the figure, specifically, a pressure source such as a compressor is connected to the first nozzle 73, and air pressure, that is, positive pressure is applied from the first nozzle 73 to the upper part of the piston 72 in the cylinder space 70, thereby sliding the piston 72 downward, to allow the second processing member 20 to narrow the gap between the first and second processing surfaces 1 and 2. Although not shown in the figure, a pressure source such as a compressor is connected to the second nozzle 74, and air pressure, that is, positive pressure is applied from the second nozzle 74 to the lower part of the piston 72 in the cylinder space 70, thereby sliding the piston 72 upward, to allow the second processing member 20 to widen the gap between the first and second processing surfaces 1 and 2, that is, to enable it to move in the direction of opening the gap. In this manner, the surface-approaching pressure can be regulated by air pressure with the nozzles 73 and 74.

Even if there is a space between the upper part of the second processing member 20 in the ring-accepting part 41 and the uppermost part of the ring-accepting part 41, the piston 7 is arranged so as to abut against an uppermost part 70a of the cylinder space 70, whereby the uppermost part 70a of the cylinder space 70 defines the upper limit of the width of the gap between the processing surfaces 1 and 2. That is, the piston 7 and the uppermost part 70a of the cylinder space 70 function as a separation preventing part for preventing the separation of the processing surfaces 1 and 2 from each other, in other words, function in regulating the maximum opening of the gap between both the processing surfaces 1 and 2.

Even if the processing surfaces 1 and 2 do not abut on each other, the piston 7 is arranged so as to abut against a lowermost part 70b of the cylinder space 70, whereby the lowermost part 70b of the cylinder space 70 defines the lower limit of the width of the gap between the processing surfaces 1 and 2. That is, the piston 7 and the lowermost part 70b of the cylinder space 70 function as an approaching preventing part for preventing the approaching of the processing surfaces 1 and 2 each other, in other words, function in regulating the minimum opening of the gap between both the processing surfaces 1 and 2.

In this manner, the maximum and minimum openings of the gap are regulated, while a distance z1 between the piston 7 and the uppermost part 70a of the cylinder space 70, in other words, a distance z2 between the piston 7 and the lowermost part 70b of the cylinder space 70, is regulated with air pressure by the nozzles 73 and 74.

The nozzles 73 and 74 may be connected to a different pressure source respectively, and further may be connected to a single pressure source alternatively or switched the connections to the sources.

The pressure source may be a source applying positive or negative pressure. When a negative pressure source such as a vacuum is connected to the nozzles 73 and 74, the action described above goes to the contrary.

In place of the other surface-approaching pressure imparting mechanism 4 or as a part of the surface-approaching pressure imparting mechanism 4, such cylinder mechanism 7 is provided to set the pressure of the pressure source connected to the nozzle 73 and 74, and the distances z1 and z2 according to the viscosity and properties of the fluid to be processed in a fashion to bring the thickness value of fluid film of the fluid to a desired level under a shear force to realize a uniform reaction for forming fine particles. Particularly, such cylinder mechanism 7 can be used to increase the reliability of cleaning and sterilization by forcing the sliding part open and close during cleaning and steam sterilization.

Figure 16A:
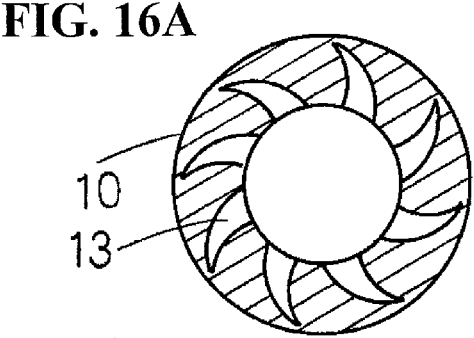
FIG. 16(A) is a schematic transverse sectional view showing an important part of still another embodiment of the apparatus shown in FIG. 12(A), FIG. 16(B), FIG. 16(C) and FIG. 16(E) to FIG. 16(G) are schematic transverse sectional views each showing an important part of still another embodiment of the apparatus.
Figure 16E:
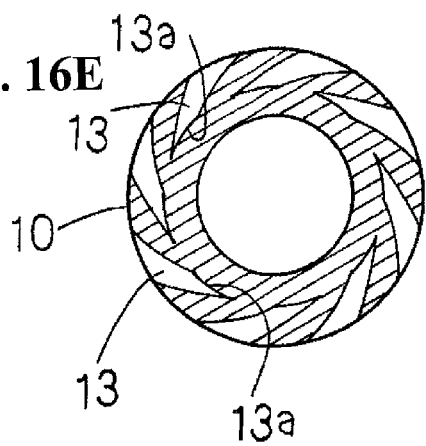
[FIG. 16]
FIG. 16(D) is a partially cut schematic vertical sectional view showing an important part of still another embodiment of the apparatus.
Figure 16B:
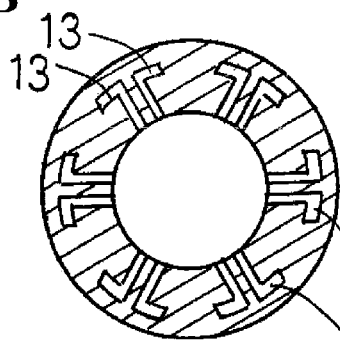
Figure 16F:
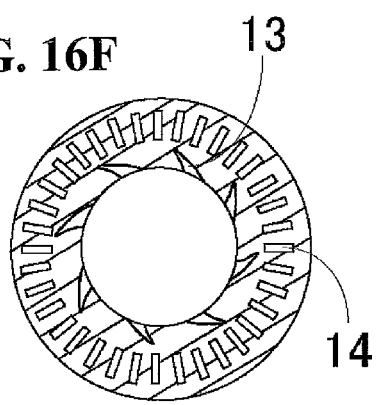
Figure 16C:
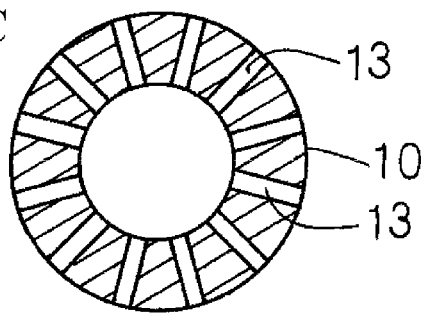

As shown in FIG. 16(A) to FIG. 16(C), the first processing surface 1 of the first processing member 10 may be provided with groove-like depressions 13 . . . 13 extending in the radial direction, that is, in the direction from the center to the outside of the first processing member 10. In this case, as shown in FIG. 16(A), the depressions 13 . . . 13 can be curved or spirally elongated on the first processing surface 1, and as shown in FIG. 16(B), the individual depression 13 may be bent at a right angle, or as shown in FIG. 16(C), the depressions 13 . . . 13 may extend straight radially.

Figure 16G:
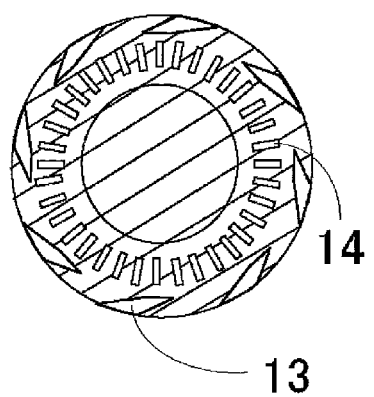
Figure 16D:
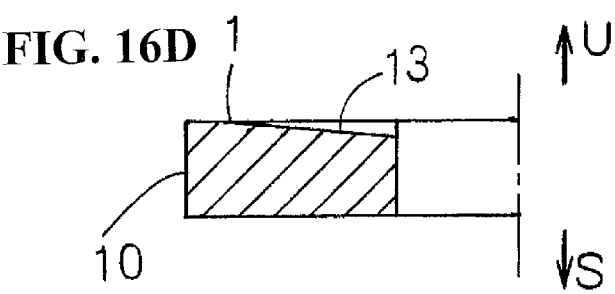

As shown in FIG. 16(D), the depressions 13 in FIG. 16(A) to FIG. 16(C) preferably deepen gradually in the direction toward the center of the first processing surface 1. The groove-like depressions 13 may continue in sequence or intermittence.

Formation of such depression 13 may correspond to the increase of delivery of the processed fluid or to the decrease of calorific value, while having effects of cavitation control and fluid bearing.

In the embodiments shown in FIG. 16, the depressions 13 are formed on the first processing surface 1, but may be formed on the second processing surface 2 or may be formed on both the first and second processing surfaces 1 and 2.

When the depressions 13 or tapered sections are not provided on the processing surface or are arranged unevenly on a part of the processing surface, the influence exerted by the surface roughness of the processing surfaces 1 and 2 on the processed fluid is greater than that by the above depressions 13. In this case, the surface roughness should be reduced, that is, the surface should be fine-textured, as the particle size of the processed fluid are to be decreased. Particularly, regarding the surface roughness of the processing surface, the mirror surface, that is, a surface subjected to mirror polishing is advantageous in realizing uniform reaction for the purpose of uniform reaction, and in realizing crystallization and separation of fine monodisperse reaction products for the purpose of obtaining microparticles.

In the embodiments shown in FIG. 13 to FIG. 17, structures other than those particularly shown are the same as in the embodiments shown in FIG. 1(A) or FIG. 11(C).

In the embodiments described above, the case is closed. Alternatively, the first processing member 10 and the second processing member 20 may be closed inside but may be open outside. That is, the flow path is sealed until the processed fluid has passed through the space between the first processing surface 1 and the second processing surface 2, to allow the processed fluid to receive the feeding pressure, but after the passing, the flow path may be opened so that the processed fluid after processing does not receive feeding pressure.

The fluid pressure imparting mechanism p1 preferably uses a compressor as a pressure device described above, but if predetermined pressure can always be applied to the processed fluid, another means may be used. For example, the own weight of the processed fluid can be used to apply certain pressure constantly to the processed fluid.

In summary, the processing apparatus in each embodiment described above is characterized in that predetermined pressure is applied to a fluid to be processed, at least two processing surfaces, that is, a first processing surface 1 and a second processing surface 2 capable of approaching to and separating from each other are connected to a sealed flow path through which the processed fluid receiving the predetermined pressure flows, a surface-approaching pressure of approaching the processing surfaces 1 and 2 each other is applied to rotate the first processing surface 1 and the second processing surface 2 relative to each other, thereby allowing a fluid film used for seal in mechanical seal to be generated out of the processed fluid, and the fluid film is leaked out consciously (without using the fluid film as seal) from between the first processing surface 1 and the second processing surface 2, contrary to mechanical seal, whereby reaction processing is realized between the processed fluid formed into a film between the surfaces 1 and 2, and the product is recovered.

By this epoch-making method, the space between the processing surfaces 1 and 2 can be regulated in the range of 1 μm to 1 mm, particularly 1 μm to 10 μm.

In the embodiment described above, a flow path for a sealed fluid is constituted in the apparatus, and the processed fluid is pressurized with the fluid pressure imparting mechanism p arranged at the side of the introduction part (for the first processing fluid) in the processing apparatus.

Alternatively, the flow path for the processed fluid may be opened without pressurization with the fluid pressure imparting mechanism p.

One embodiment of the processing apparatus is shown in FIG. 18 to FIG. 20. The processing apparatus illustrated in this embodiment is an apparatus including a degassing mechanism, that is, a mechanism of removing a liquid from the formed processed product thereby finally securing objective solids (crystals) only.

Figure 18A:
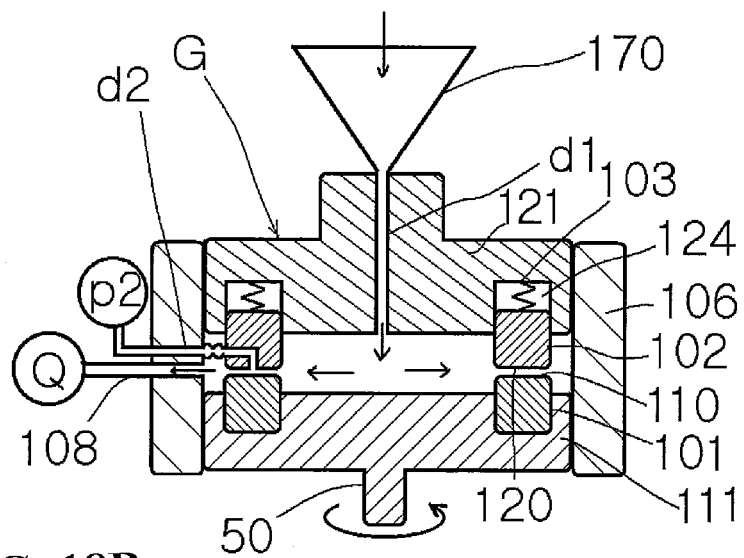
FIG. 18(A) is a schematic vertical sectional view showing the concept of still another embodiment of the apparatus used for carrying out the present invention.
Figure 18B:
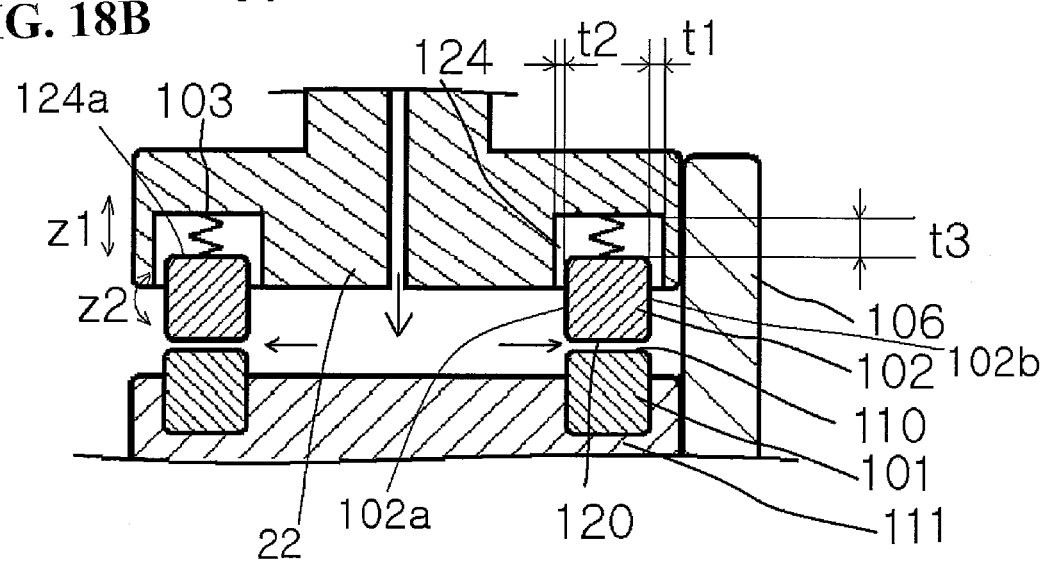
FIG. 18(B) is a partially cut explanatory view showing an important part of the apparatus.

FIG. 18(A) is a schematic vertical sectional view of the processing apparatus, and FIG. 18(B) is its partially cut enlarged sectional view. FIG. 19 is a plane view of the first processing member 1 arranged in the processing apparatus in FIG. 18. FIG. 20 is a partially cut schematic vertical sectional view showing an important part of the first and second processing members 1 and 2 in the processing apparatus.

As described above, the apparatus shown in FIG. 18 to FIG. 20 is the one into which a fluid as the object of processing, that is, a processed fluid, or a fluid carrying the object of processing, is to be introduced at atmospheric pressure.

In FIG. 18(B) and FIG. 20, the second introduction part d2 is omitted for simplicity of the drawing (these drawings can be regarded as showing a section at the position where the second introduction part d2 is not arranged).

As shown in FIG. 18(A), this processing apparatus includes a reaction apparatus G and a decompression pump Q. This reaction apparatus G includes a first processing member 101 as a rotating member, a first holder 111 for holding the processing member 101, a second processing member 102 that is a member fixed to the case, a second holder 121 having the second processing member 102 fixed thereto, a bias mechanism 103, a dynamical pressure generating mechanism 104 (FIG. 19(A)), a drive part which rotates the first processing member 101 with the first holder 111, a housing 106, a first introduction part d1 which supplies (introduces) a first processed fluid, and a discharge part 108 that discharges the fluid to the decompression pump Q. The drive part is not shown.

The first processing member 101 and the second processing member 102 are cylindrical bodies that are hollow in the center. The processing members 101 and 102 are members wherein the bottoms of the processing members 101 and 102 in a cylindrical form are processing surfaces 110 and 120 respectively.

Figure 19A:
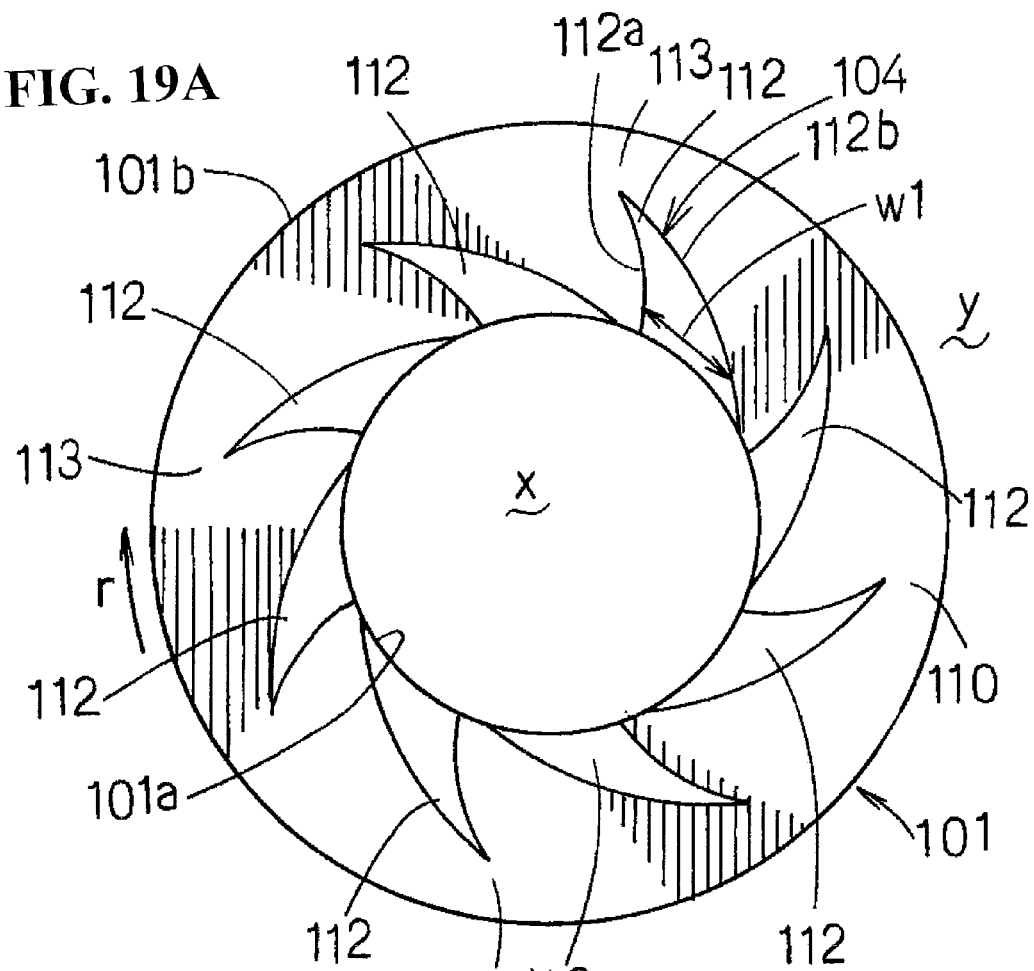
FIG. 19(A) is a plane view of a first processing member 1 in the apparatus shown in FIG. 12.

The processing surfaces 110 and 120 have a mirror-polished flat part. In this embodiment, the processing surface 120 of the second processing member 102 is a flat surface subjected as a whole to mirror polishing. The processing surface 110 of the first processing member 101 is a flat surface as a whole like the second processing member 102, but has a plurality of grooves 112 . . . 112 in the flat surface as shown in FIG. 19(A). The grooves 112 . . . 112 while centering on the first processing member 101 in a cylindrical form extend radially toward the outer periphery of the cylinder.

The processing surfaces 110 and 120 of the first and second processing members 101 and 102 are mirror-polished such that the surface roughness Ra comes to be in the range of 0.01 μm to 1.0 μm. By this mirror polishing, Ra is regulated preferably in the range of 0.03 μm to 0.3 μm.

The material for the processing members 101 and 102 is one which is rigid and capable of mirror polishing. The rigidity of the processing members 101 and 102 is preferably at least 1500 or more in terms of Vickers hardness. A material having a low linear expansion coefficient or high thermal conductance is preferably used. This is because when the difference in coefficient of expansion between a part which generates heat upon processing and other parts is high, distortion is generated and securement of suitable clearance is influenced.

As the material for the processing members 101 and 102, it is preferable to use particularly SIC, that is, silicon carbide, SIC having a Vickers hardness of 2000 to 2500, SIC having a Vickers hardness of 3000 to 4000 coated thereon with DLC (diamond-like carbon), WC, that is, tungsten carbide having a Vickers hardness of 1800, WC coated thereon with DLC, and boron ceramics represented by $ZrB_2$, BTC and $B_4C$ having a Vickers hardness of 4000 to 5000.

The housing 106 shown in FIG. 18, the bottom of which is not shown though, is a cylinder with a bottom, and the upper part thereof is covered with the second holder 121. The second holder 121 has the second processing member 102 fixed to the lower surface thereof, and the introduction part d1 is arranged in the upper part thereof. The introduction part d1 is provided with a hopper 170 for introducing a fluid or a processed material from the outside.

Although not shown in the figure, the drive part includes a power source such as a motor and a shaft 50 that rotates by receiving power from the power source.

As shown in FIG. 18(A), the shaft 50 is arranged in the housing 106 and extends vertically. Then, the first holder 111 is arranged on the top of the shaft 50. The first holder 111 is to hold the first processing member 101 and is arranged on the shaft 50 as described above, thereby allowing the processing surface 110 of the first processing member 101 to correspond to the processing surface 120 of the second processing member 102.

The first holder 111 is a cylindrical body, and the first processing member 101 is fixed on the center of the upper surface. The first processing member 101 is fixed so as to be integrated with the first holder 111, and does not change its position relative to the first holder 111.

On the other hand, a receiving depression 124 for receiving the second processing member 102 is formed on the center of the upper surface of the second holder 121.

The receiving depression 124 has a circular cross-section. The second processing member 102 is accepted in the cylindrical receiving depression 124 so as to be concentric with the receiving depression 124.

The structure of the receiving depression 124 is similar to that in the embodiment as shown in FIG. 1(A) (the first processing member 101 corresponds to the first ring 10, the first holder 111 to the first holder 11, the second processing member 102 to the second ring 20, and the second holder 121 to the second holder 21).

Then, the second holder 121 is provided with the bias mechanism 103. The bias mechanism 103 preferably uses an elastic body such as spring. The bias mechanism 103 corresponds to the surface-approaching pressure imparting mechanism 4 in FIG. 1(A) and has the same structure. That is, the bias mechanism 103 presses that side (bottom) of the second processing member 102 which is opposite to the processing surface 120 and biases each position of the second processing member 102 uniformly downward to the first processing member 101.

On the other hand, the inner diameter of the receiving depression 124 is made larger than the outer diameter of the second processing member 102, so that when arranged concentrically as described above, a gap t1 is arranged between outer periphery 102b of the second processing member 102 and inner periphery of the receiving depression 124, as shown in FIG. 18(B).

Similarly, a gap t2 is arranged between inner periphery 102a of the second processing member 102 and outer periphery of the central portion 22 of the receiving depression 124, as shown in FIG. 18(B).

The gaps t1 and t2 are those for absorbing vibration and eccentric behavior and are set to be in a size to secure operational dimensions or more and to enable sealing. For example, when the diameter of the first processing member 101 is 100 mm to 400 mm, the gaps t1 and t2 are preferably 0.05 mm to 0.3 mm, respectively.

The first holder 111 is fixed integrally with the shaft 50 and rotated with the shaft 50. The second processing member 102 is not rotated relative to the second holder 121 by a baffle (not shown). However, for securing 0.1 micron to 10 micron clearance necessary for processing, that is, the minute gap t between the processing surfaces 110 and 120 as shown in FIG. 20 (B), a gap t3 is arranged between the bottom of the receiving depression 124, that is, the top part, and the surface facing a top part 124a of the second processing member 102, that is, the upper part. The gap t3 is established in consideration of the clearance and the vibration and elongation of the shaft 150.

As described above, by the provision of the gaps t1 to t3, the first processing member 101 can move not only in the direction of approaching to and separating from the second processing member 102, but also relative to the center and direction of the processing surface 110, that is, relative to the directions z1 and z2.

That is, in this embodiment, the bias mechanism 103 and the gaps t1 to t3 constitute a floating mechanism, and by this floating mechanism, the center and inclination of at least the second processing member 102 are made variable in the small range of several μm to several mm. The run-out and expansion of the rotary shaft and the surface vibration and vibration of the first processing member 101 are absorbed.

The groove 112 on the polishing surface 110 of the first processing member 101 is described in more detail. The rear end of the groove 112 reaches the inner periphery 101a of the first processing member 101, and its top is elongated toward outside y of the first processing member 101, that is, toward the outer periphery. As shown in FIG. 19(A), the sectional area of the groove 112 is gradually decreased in the direction from the center x of the circular first processing member 101 to the outside y of the first processing member 101, that is, toward the outer periphery.

Figure 19B:
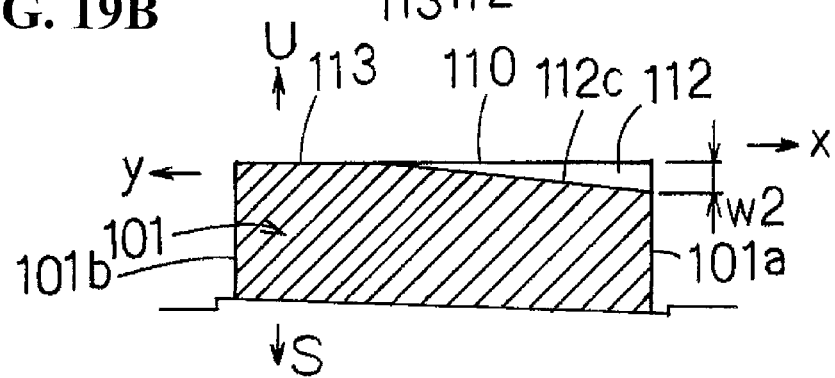
FIG. 19(B) is a schematic vertical sectional view showing an important part thereof.

The distance w1 of left and right sides 112a and 112b of the groove 112 is decreased in the direction from the center x of the first processing member 101 to the outside y of the first processing member 101, that is, toward the outer periphery. As shown in FIG. 19(B), the depth w2 of the groove 112 is decreased in the direction from the center x of the first processing member 101 to the outside y of the first processing member 101, that is, toward the outer periphery. That is, the bottom 112c of the groove 112 is decreased in depth in the direction from the center x of the first processing member 101 to the outside y of the first processing member 101, that is, toward the outer periphery.

As described above, the groove 112 is gradually decreased both in width and depth toward the outside y, that is, toward the outer periphery, and its sectional area is gradually decreased toward the outside y. Then, the top of the groove 112, that is, the y side, is a dead end. That is, the top of the groove 112, that is, the y side does not reach the outer periphery 101b of the first processing member 101, and an outer flat surface 113 is interposed between the top of the groove 112 and the outer periphery 101b. The outer flat surface 113 is a part of the processing surface 110.

In the embodiment shown in FIG. 19, the left and right sides 112a and 112b and the bottom 112c of the groove 112 constitute a flow path limiting part. This flow path limiting part, the flat part around the groove 112 of the first processing member 101, and the flat part of the second processing member 102 constitute the dynamical pressure generating mechanism 104.

However, only one of the width and depth of the groove 112 may be constituted as described above to decrease the sectional area.

While the first processing member 101 rotates, the dynamical pressure generating mechanism 104 generates a force in the direction of separating the processing members 101 and 102 from each other to secure a desired minute space between the processing members 101 and 102 by a fluid passing through the space between the processing members 101 and 102. By generation of such dynamical pressure, a 0.1 μm to 10 μm minute space can be generated between the processing surfaces 110 and 120. A minute space like that can be regulated and selected depending on the object of processing, but is preferably 1 μm to 6 μm, more preferably 1 μm to 2 μm. This apparatus can realize a uniform reaction and form microparticles by the minute space, which are not achieved in the prior art.

The grooves 112 . . . 112 may extend straight from the center x to the outside y. In this embodiment, however, as shown in FIG. 19(A), the grooves 112 are curved to extend such that with respect to rotation direction r of the first processing member 101, the center x of the groove 112 is positioned in front of the outside y of the groove 112.

In this manner, the grooves 112 . . . 112 are curved to extend so that the separation force by the dynamical pressure generating mechanism 104 can be effectively generated.

Then, the working of this apparatus is described.

A first processed fluid R which has been introduced from a hopper 17 and has passed through the first introduction part d1, passes through the hollow part of the circular second processing member 102, and the fluid that has received the centrifugal force resulting from rotation of the first processing member 101 enters the space between the processing members 101 and 102, and uniform reaction and generation of microparticles are effected and processed between the processing surface 110 of the rotating first processing member 101 and the processing surface 120 of the second processing member 102, then exits from the processing members 101 and 102 and is then discharged from the discharge part 108 to the side of the decompression pump Q. Hereinafter, the first processed fluid R is referred to simply as a fluid R, if necessary.

Figure 20A:
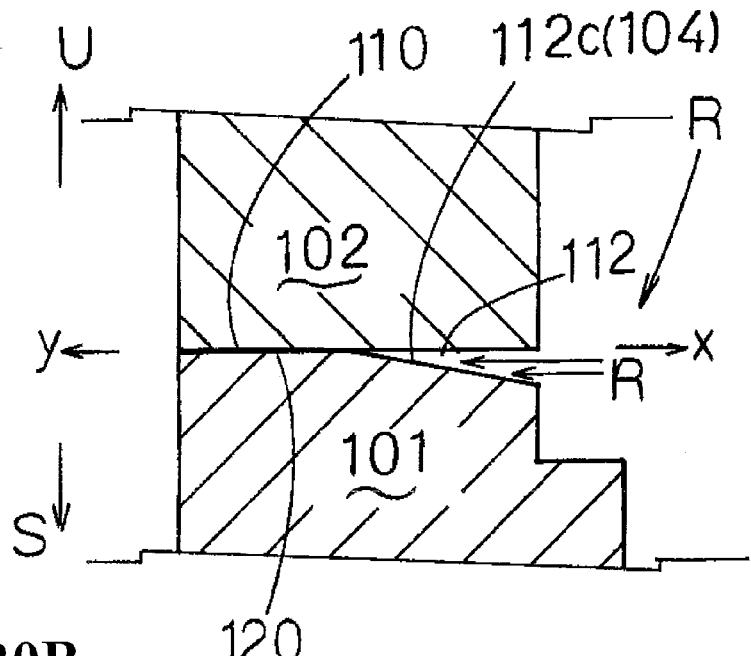
FIG. 20(A) is a schematic vertical sectional view showing an important part of first and second processing members 1 and 2 in the apparatus shown in FIG. 12.
Figure 20B:
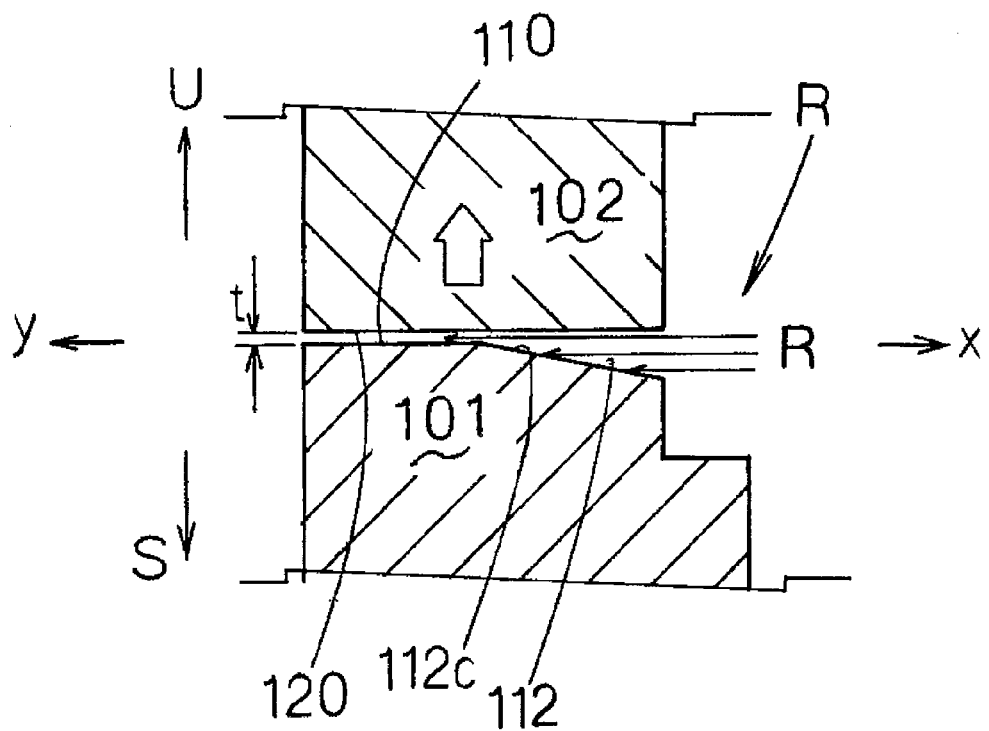
FIG. 20(B) is a schematic vertical sectional view showing an important part of the first and second processing members 1 and 2 with a minute gap.

In the foregoing description, the fluid R that has entered the hollow part of the circular second processing member 102 first enters the groove 112 of the rotating first processing member 101 as shown in FIG. 20(A). On the other hand, the processing surfaces 110 and 120 that are mirror-polished flat parts are kept airtight even by passing a gas such as air or nitrogen. Accordingly, even if the centrifugal force by rotation is received, the fluid cannot enter through the groove 112 into the space between the processing surfaces 110 and 120 that are pushed against each other by the bias mechanism 103. However, the fluid R gradually runs against both the sides 112a and 112b and the bottom 112c of the groove 112 formed as a flow path limiting part to generate dynamical pressure acting in the direction of separating the processing surfaces 110 and 120 from each other. As shown in FIG. 20(B), the fluid R can thereby exude from the groove 112 to the flat surface, to secure a minute gap t, that is, clearance, between the processing surfaces 110 and 120. Then, a uniform reaction and generation of microparticles are effected and processed between the mirror-polished flat surfaces. The groove 112 has been curved so that the centrifugal force is applied more accurately to the fluid to make generation of dynamical pressure more effectively.

In this manner, the processing apparatus can secure a minute and uniform gap, that is, clearance, between the mirror surfaces, that is, the processing surfaces 110 and 120, by the balance between the dynamical pressure and the bias force by the bias mechanism 103. By the structure described above, the minute gap can be as superfine as 1 μm or less.

By utilizing the floating mechanism, the automatic regulation of alignment between the processing surfaces 110 and 120 becomes possible, and the clearance in each position between the processing surfaces 110 and 120 can be prevented from varying against physical deformation of each part by rotation or generated heat, and the minute gap in each position can be maintained.

In the embodiment described above, the floating mechanism is a mechanism arranged for the second holder 121 only. Alternatively, the floating mechanism can be arranged in the first holder 111 instead of, or together with, the second holder 121.

Other embodiments of the groove 112 are shown in FIG. 21 to FIG. 23.

Figure 21A:
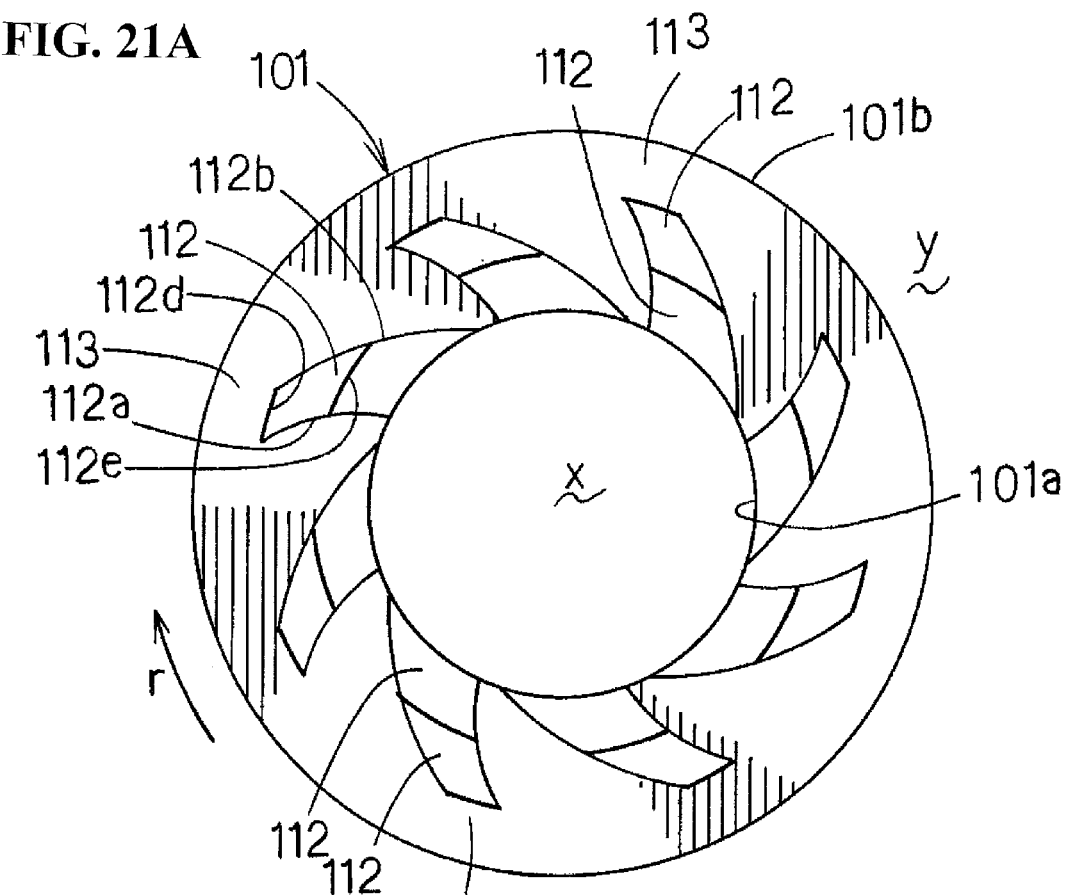
FIG. 21(A) is a plane view of another embodiment of the first processing member 1.
Figure 21B:
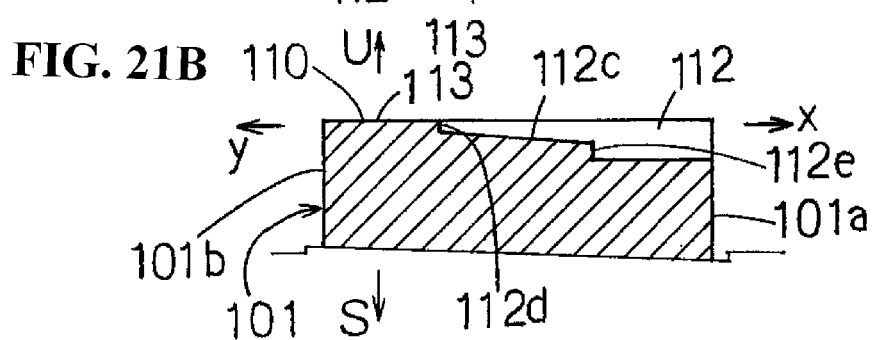
FIG. 21(B) is a schematic vertical sectional view showing an important part thereof.

As shown in FIG. 21(A) and FIG. 21(B), the groove 112 can be provided at the top with flat wall surface 112d as a part of the flow path limiting part. In the embodiment shown in FIG. 14, a step 112e is arranged between the first wall surface 112d and the inner periphery 101a in the bottom 112c, and the step 112e also constitutes a part of the flow path limiting part.

Figure 22A:
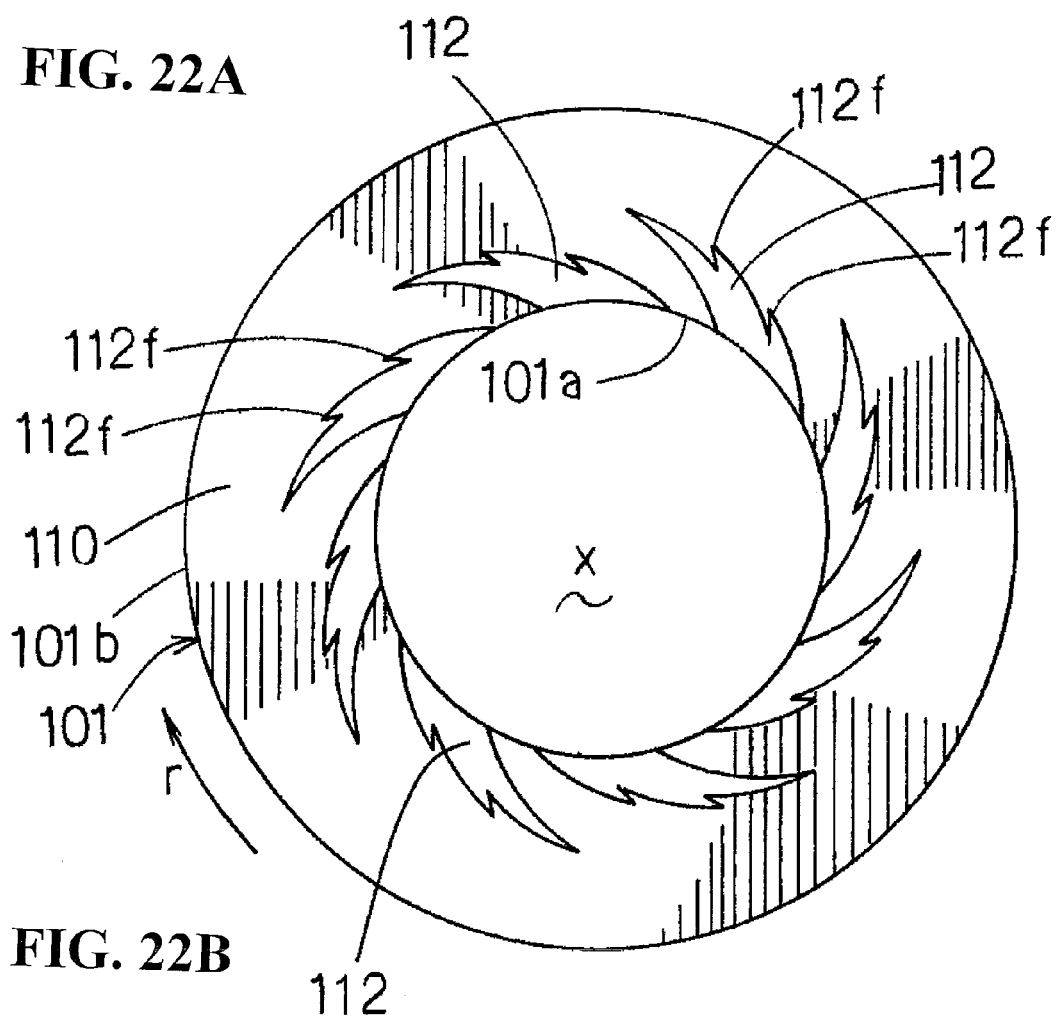
FIG. 22(A) is a plane view of still another embodiment of the first processing member 1.
Figure 22B:
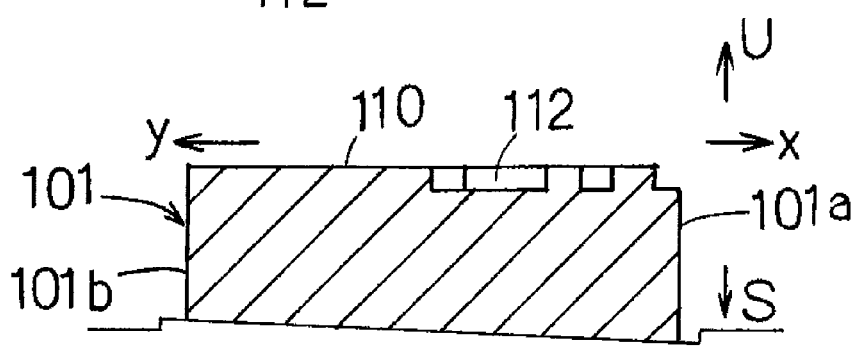
FIG. 22(B) is a schematic vertical sectional view showing an important part thereof.

As shown in FIG. 22(A) and FIG. 22(B), the groove 112 includes a plurality of branches 112f . . . 112f, and each branch 112f narrows its width thereby being provided with a flow path limiting part.

With respect to the embodiments in FIG. 14 and FIG. 15, structures other than those particularly shown are similar to those of embodiments as shown in FIG. 1(A), FIG. 11(C), and FIG. 18 to FIG. 20.

Figure 23A:
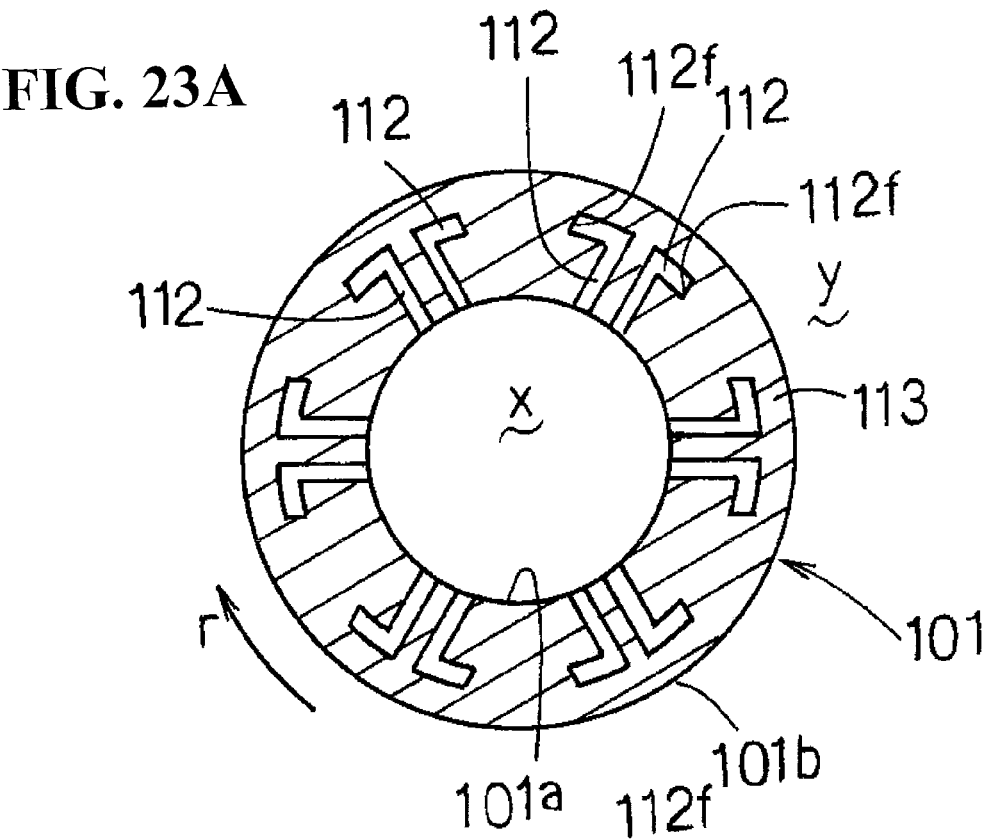
FIG. 23(A) is a plane view of still another embodiment of the first processing member 1.
Figure 23B:
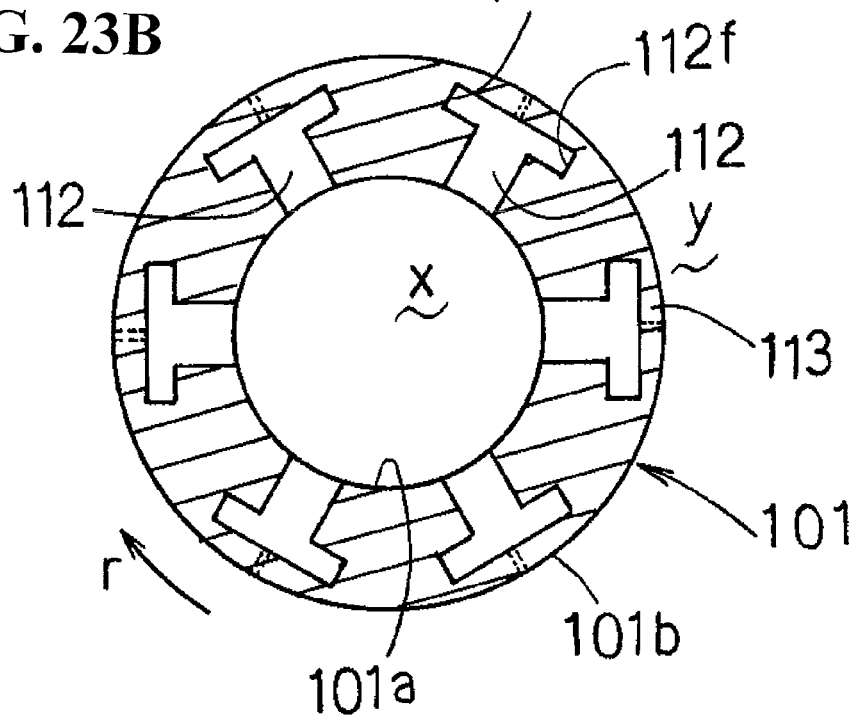
FIG. 23(B) is a plane view of still another embodiment of the first processing member 1.

In the embodiments described above, at least either the width or depth of the groove 112 is gradually decreased in size in the direction from inside to outside the first processing member 101, thereby constituting a flow path limiting part. Alternatively, as shown in FIG. 23(A) or FIG. 23(B), the groove 112 can be provided with a termination surface 112f without changing the width and depth of the groove 112, and the termination surface 112f of the groove 112 can serve as a flow path limiting part. As shown in the embodiments in FIG. 19, FIG. 21 and FIG. 22, the width and depth of the groove 112 can be changed as described above thereby slanting the bottom and both sides of the groove 112, so that the slanted surface serves as a pressure-receiving part toward the fluid to generate dynamical pressure. In the embodiment shown in FIG. 23(A) and FIG. 23(B), on the other hand, the termination surface of the groove 112 serves as a pressure-receiving part toward the fluid to generate dynamical pressure.

In the embodiment shown in FIG. 23(A) and FIG. 23(B), at least one of the width and depth of the groove 112 may also be gradually decreased in size.

The structure of the groove 112 is not limited to the one shown in FIG. 19 and FIG. 21 to FIG. 23 and can be provided with a flow path limiting part having other shapes.

For example, in the embodiments shown in FIG. 19 and FIG. 21 to FIG. 23, the groove 112 does not penetrate to the outer side of the first processing member 101. That is, there is an outer flat surface 113 between the outer periphery of the first processing member 101 and the groove 112. However, the structure of the groove 112 is not limited to such embodiment, and the groove 112 may reach the outer periphery of the first processing member 101 as long as the dynamical pressure can be generated.

For example, in the case of the first processing member 101 shown in FIG. 23(B), as shown in the dotted line, a part having a smaller sectional area than other sites of the groove 112 can be formed on the outer flat surface 113.

The groove 112 may be formed so as to be gradually decreased in size in the direction from inside to outside as described above, and the part (terminal) of the groove 112 that had reached the outer periphery of the first processing member 101 may have the minimum sectional area (not shown). However, the groove 112 preferably does not penetrate to the outer periphery of the first processing member 101 as shown in FIG. 19 and FIG. 21 to FIG. 23, in order to effectively generate dynamical pressure.

Now, the embodiments shown in FIG. 18 to FIG. 23 are summarized.

This processing apparatus is a processing apparatus wherein a rotating member having a flat processing surface and a fixed member having a flat processing surface are opposite to each other so as to be concentric with each other, and while the rotating member is rotated, a material to be reacted is fed through an opening of the fixed member and subjected to a reaction between the opposite flat processing surfaces of both members, wherein the rotating member is provided with a pressurizing mechanism by which pressure is generated to maintain clearance without mechanically regulating clearance and enables 1 mm to 6 mm microscopic clearance not attainable by mechanical regulation of clearance, thereby significantly improving an ability to pulverize formed particles and an ability to uniformize the reaction.

That is, this processing apparatus have a rotating member and a fixed member each having a flat processing surface in the outer periphery thereof and has a sealing mechanism in a plane on the flat processing surface, thereby providing a high speed rotation processing apparatus generating hydrostatic force, hydrodynamic force, or aerostatic-aerodynamic force. The force generates a minute space between the sealed surfaces, and provides a reaction processing apparatus with a function of non-contact and mechanically safe and high-level pulverization and uniformizing of reactions. One factor for forming this minute space is due to the rotation speed of the rotating member, and the other factor is due to a pressure difference between the introduction side and discharge side of a processed material (fluid). When a pressure imparting mechanism is not arranged in the introduction side, that is, when the processed material (fluid) is introduced at atmospheric pressure, there is no pressure difference, and thus the sealed surfaces should be separated by only the rotation speed of the rotating member. This is known as hydrodynamic or aerodynamic force.

Figure 24A:
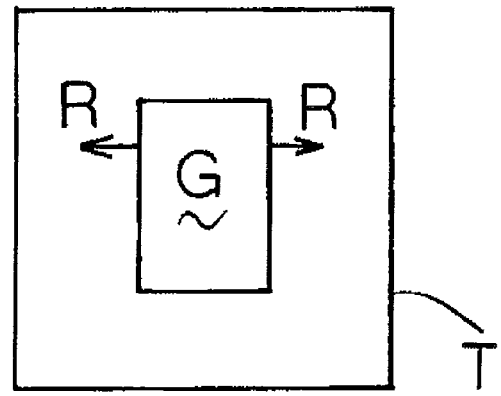
FIG. 24(A), FIG. 24(B) and FIG. 24(C) are diagrams showing embodiments other than those described above with respect to the method of separating a processed material after processing.
Figure 24B:
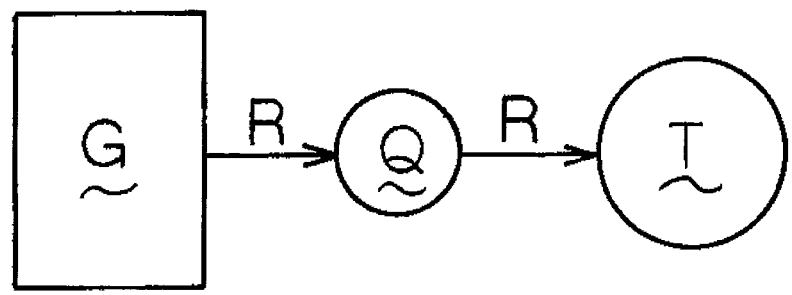

FIG. 18(A) shows the apparatus wherein a decompression pump Q is connected to the discharge part of the reaction apparatus G, but as described above, the reaction apparatus G may be arranged in a decompression tank T without arranging the housing 106 and the decomposition pump Q, as shown in FIG. 24(A).

In this case, the tank T is decompressed in a vacuum or in an almost vacuum, whereby the processed product formed in the reaction apparatus G is sprayed in a mist form in the tank T, and the processed material colliding with, and running down along, the inner wall of the tank T can be recovered, or a gas (vapor) separated from the processed material and filled in an upper part of the tank T, unlike the processed material running down along the wall, can be recovered to obtain the objective product after processing.

When the decompression pump Q is used, an airtight tank T is connected via the decompression pump Q to the processing apparatus G, whereby the processed material after processing can be formed into mist to separate and extract the objective product.

Figure 24C:
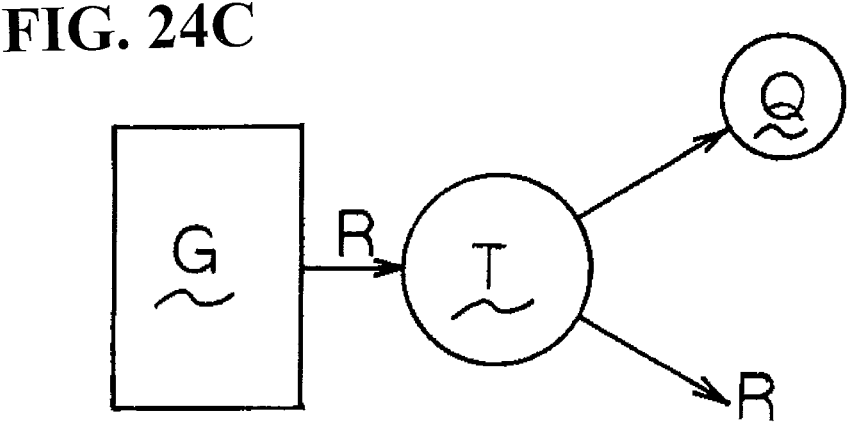

As shown in FIG. 24(C), the decompression pump Q is connected directly to the processing apparatus G, and the decompression pump Q and a discharge part for fluid R, different from the decompression pump Q, are connected to the tank T, whereby the objective product can be separated. In this case, a gasified portion is sucked by the decompression pump Q, while the fluid R (liquid portion) is discharged from the discharge part separately from the gasified portion.

In the embodiments described above, the first and second processed fluids are introduced via the second holders 21 and 121 and the second rings 20 and 102 respectively and mixed and reacted with each other.

Now, other embodiments with respect to introduction of the fluids to be processed into the apparatus are described.

Figure 1B:
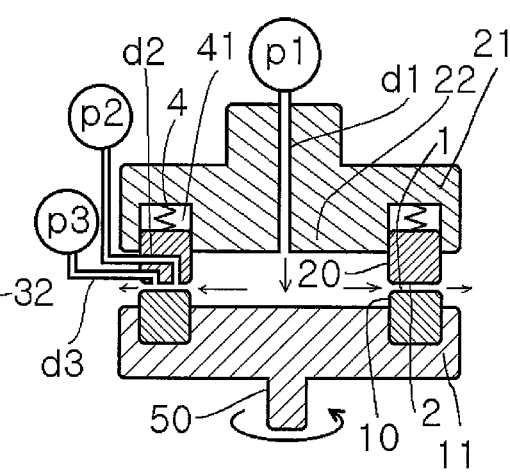
FIG. 1(B) is a schematic vertical sectional view showing the concept of another embodiment of the apparatus.

As shown in FIG. 1(B), the processing apparatus shown in FIG. 1(A) is provided with a third introduction part d3 to introduce a third fluid to be processed into the space between the processing surfaces 1 and 2, and the third fluid is mixed and reacted with the first processed fluid as well as the second processed fluid.

By the third introduction part d3, the third fluid to be mixed with the first processed fluid is fed to the space between the processing surfaces 1 and 2. In this embodiment, the third introduction part d3 is a fluid flow path arranged in the second ring 20 and is open at one end to the second processing surface 2 and has a third fluid feed part p3 connected to the other end.

In the third fluid feed part p3, a compressor or another pump can be used.

The opening of the third introduction part d3 in the second processing surface 2 is positioned outside, and more far from, the rotation center of the first processing surface 1 than the opening of the second introduction part d2. That is, in the second processing surface 2, the opening of the third introduction part d3 is located downstream from the opening of the second introduction part d2. A gap is arranged between the opening of the third introduction part d3 and the opening of the second introduction part d2 in the radial direction of the second ring 20.

With respect to structures other than the third introduction part d3, the apparatus shown in FIG. 1(B) is similar to that in the embodiment as in FIG. 1(A). In FIG. 1(B) and further in FIG. 1(C), FIG. 1(D) and FIG. 2 to FIG. 11 described later, the case 3 is omitted to simplify the drawings. In FIG. 9(B), FIG. 9(C), FIG. 10, FIG. 11(A) and FIG. 11(B), a part of the case 3 is shown.

Figure 1C:
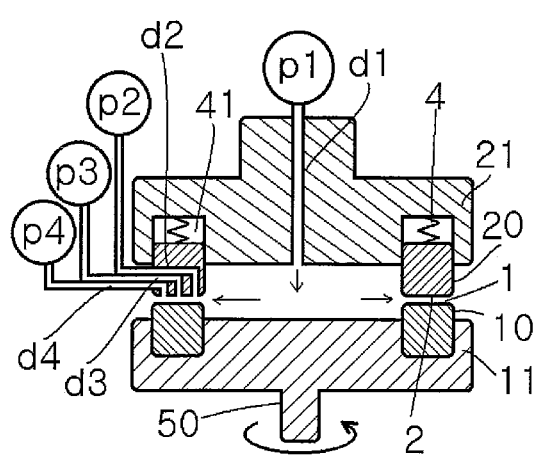
FIG. 1(C) is a schematic vertical sectional view showing the concept of still another embodiment of the apparatus.

As shown in FIG. 1(C), the processing apparatus shown in FIG. 1(B) is provided with a fourth introduction part d4 to introduce a fourth fluid to be processed into the space between the processing surfaces 1 and 2, and the fourth fluid is mixed and reacted with the first processed fluid as well as the second and third processed fluids.

By the fourth introduction part d4, the fourth fluid to be mixed with the first processed fluid is fed to the space between the processing surfaces 1 and 2. In this embodiment, the fourth introduction part d4 is a fluid flow path arranged in the second ring 20, is open at one end to the second processing surface 2, and has a fourth fluid feed part p4 connected to the other end.

In the fourth fluid feed part p4, a compressor or another pump can be used.

The opening of the fourth introduction part d4 in the second processing surface 2 is positioned outside, and more far from, the rotation center of the first processing surface 1 than the opening of the third introduction part d3. That is, in the second processing surface 2, the opening of the fourth introduction part d4 is located downstream from the opening of the third introduction part d3.

With respect to structures other than the fourth introduction part d4, the apparatus shown in FIG. 1(C) is similar to that in the embodiment as in FIG. 1(B).

Five or more introduction parts further including a fifth introduction part, a sixth introduction part and the like can be arranged to mix and react five or more fluids to be processed with one another (not shown).

Figure 1D:
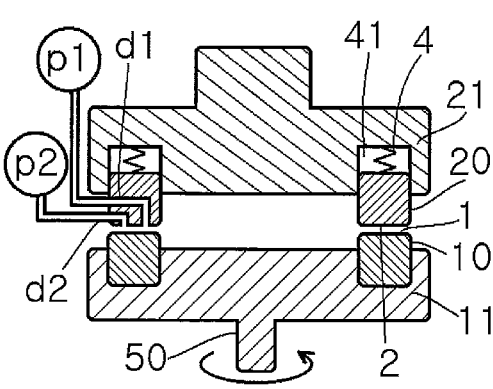
FIG. 1(D) is a schematic vertical sectional view showing the concept of still another embodiment of the apparatus.

As shown in FIG. 1(D), the first introduction part d1 arranged in the second holder 21 in the apparatus in FIG. 1(A) can, similar to the second introduction part d2, be arranged in the second processing surface 2 in place of the second holder 21. In this case, the opening of the first introduction part d1 is located at the upstream side from the second introduction part d2, that is, it is positioned nearer to the rotation center than the second introduction part d2 in the second processing surface 2.

In the apparatus shown in FIG. 1(D), the opening of the second introduction part d2 and the opening of the third introduction part d3 both are arranged in the second processing surface 2 of the second ring 20. However, arrangement of the opening of the introduction part is not limited to such arrangement relative to the processing surface. Particularly as shown in FIG. 2(A), the opening of the second introduction part d2 can be arranged in a position adjacent to the second processing surface 2 in the inner periphery of the second ring 20. In the apparatus shown in FIG. 2(A), the opening of the third introduction part d3 is arranged in the second processing surface 2 similarly to the apparatus shown in FIG. 1(B), but the opening of the second introduction part d2 can be arranged inside the second processing surface 2 and adjacent to the second processing surface 2, whereby the second processed fluid can be immediately introduced onto the processing surfaces.

In this manner, the opening of the first introduction part d1 is arranged in the second holder 21, and the opening of the second introduction part d2 is arranged inside the second processing surface 2 and adjacent to the second processing surface 2 (in this case, arrangement of the third introduction part d3 is not essential), so that particularly in reaction of a plurality of processed fluids, the processed fluid introduced from the first introduction part d1 and the processed fluid introduced from the second introduction part d2 are introduced, without being reacted with each other, into the space between the processing surfaces 1 and 2, and then both the fluids can be reacted first between the processing surfaces 1 and 2. Accordingly, the structure described above is suitable for obtaining a particularly reactive processed fluid.

The term "adjacent" is not limited to the arrangement where the opening of the second introduction part d2 is contacted with the inner side of the second ring 20 as shown in FIG. 2(A). The distance between the second ring 20 and the opening of the second introduction part d2 may be such a degree that a plurality of processed fluids are not completely mixed and reacted with one another prior to introduction into the space between the processing surfaces 1 and 2. For example, the opening of the second introduction part d2 may be arranged in a position near the second ring 20 of the second holder 21. Alternatively, the opening of the second introduction part d2 may be arranged on the side of the first ring 10 or the first holder 11.

In the apparatus shown in FIG. 1(B), a gap is arranged between the opening of the third introduction part d3 and the opening of the second introduction part d2 in the radial direction of the second ring 20, but as shown in FIG. 2(A), the second and third processed fluids can be introduced into the space between the processing surfaces 1 and 2, without providing such gap, thereby immediately joining both the fluids together. The apparatus shown in FIG. 2(A) can be selected depending on the object of processing.

In the apparatus shown in FIG. 1(D), a gap is also arranged between the opening of the first introduction part d1 and the opening of the second introduction part d2 in the radial direction of the second ring 20, but the first and second processed fluids can be introduced into the space between the processing surfaces 1 and 2, without providing such gap, thereby immediately joining both the fluids together. Such arrangement of the opening can be selected depending on the object of processing.

Figure 3A:
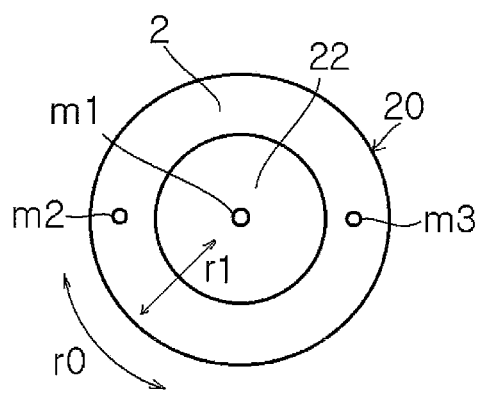
FIG. 3(A) is a schematic bottom view showing an important part of the apparatus shown in FIG. 2(C)

In the embodiment shown in FIG. 1(B) and FIG. 1(C), the opening of the third introduction part d3 is arranged in the second processing surface 2 downstream from the opening of the second introduction part d2, in other words, outside the opening of the second introduction part d2 in the radial direction of the second ring 20. Alternatively, as shown in FIG. 2(C) and FIG. 3(A), the opening of the third introduction part d3 and the opening of the second introduction part d2 can be arranged in the second processing surface 2 in positions different in a circumferential direction r0 of the second ring 20. In FIG. 3, numeral m1 is the opening (first opening) of the first introduction part d1, numeral m2 is the opening (second opening) of the second introduction part d2, numeral m3 is the opening (third opening) of the third introduction part d3, and numeral r1 is the radical direction of the ring.

When the first introduction part d1 is arranged in the second ring 20, as shown in FIG. 2(D), the opening of the first introduction part d1 and the opening of the second introduction part d2 can be arranged in the second processing surface 2 in positions different in the circumferential direction of the second ring 20.

Figure 3B:
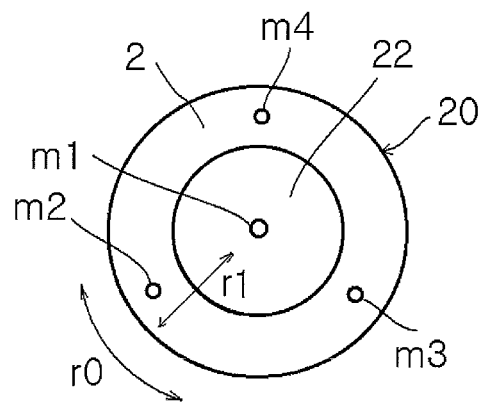
FIG. 3(B) is a schematic bottom view showing an important part of another embodiment of the apparatus.
Figure 3C:
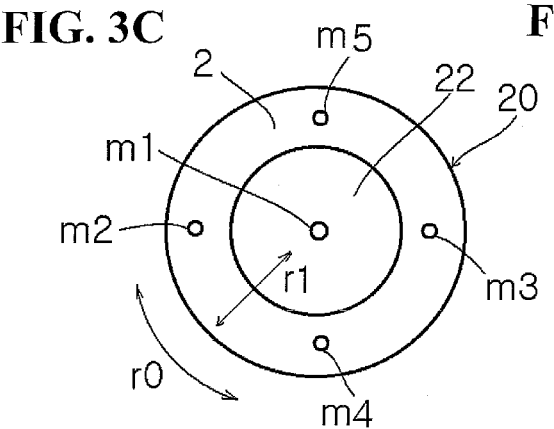
FIG. 3(C) is a schematic bottom view showing an important part of still another embodiment of the apparatus.

In the apparatus shown in FIG. 2(B), the openings of two introduction parts are arranged in the second processing surface 2 of the second ring 20 in positions different in the circumferential direction r0, but as shown in FIG. 3(B), the openings of three introduction parts can be arranged in positions different in the circumferential direction r0 of the ring, or as shown in FIG. 3(C), the openings of four introduction parts can be arranged in positions different in the circumferential direction r0 of the ring. In FIG. 3(B) and FIG. 3(C), numeral m4 is the opening of the fourth introduction part, and in FIG. 3(C), numeral m5 is the opening of the fifth introduction part. Five or more openings of introduction parts may be arranged in positions different in the circumferential direction r0 of the ring (not shown).

In the apparatuses shown in FIG. 2(B), FIG. 2(D) and in FIG. 3(A) to FIG. 3(C), the second to fifth introduction parts can introduce different fluids, that is, the second, third, fourth and fifth fluids. On the other hand, the second to fifth openings m2 to m5 can introduce the same fluid, that is, the second fluid into the space between the processing surfaces. In this case, the second to fifth introduction parts are connected to the inside of the ring and can be connected to one fluid feed part, that is, the second fluid feed part p2 (not shown).

A plurality of openings of introduction parts arranged in positions different in the circumferential direction r0 of the ring can be combined with a plurality of openings of introduction parts arranged in positions different in the radial direction r1 of the ring.

Figure 3D:
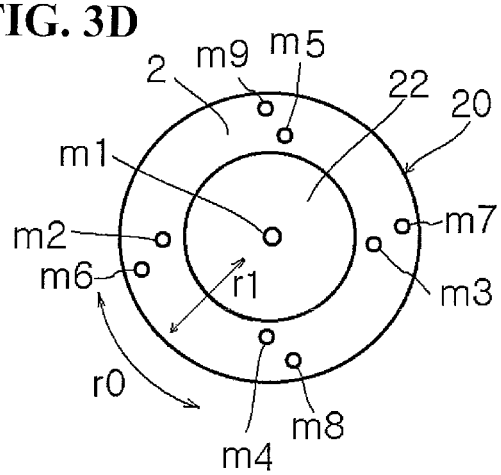
FIG. 3(D) is a schematic bottom view showing the concept of still another embodiment of the apparatus.

For example, as shown in FIG. 3(D), the openings m2 to m9 of eight introduction parts are arranged in the second processing surface 2, wherein four openings m2 to m5 of them are arranged in positions different in the circumferential direction r0 of the ring and identical in the radial direction r1 of the ring, and the other four openings m5 to m8 are arranged in positions different in the circumferential direction r0 of the ring and identical in the radial direction r1 of the ring. Then, the other openings m5 to m8 are arranged outside the radial direction r of the four openings m2 to m5. The outside openings and inside openings may be arranged in positions identical in the circumferential direction r0 of the ring, but in consideration of rotation of the ring, may be arranged in positions different in the circumferential direction r0 of the ring as shown in FIG. 3(D). In this case too, the openings are not limited to the arrangement and number shown in FIG. 3(D).

Figure 3E:
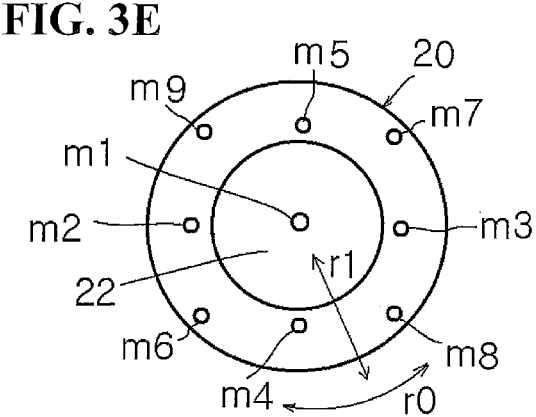
FIG. 3(E) is a schematic bottom view showing the concept of still another embodiment of the apparatus.
Figure 3F:
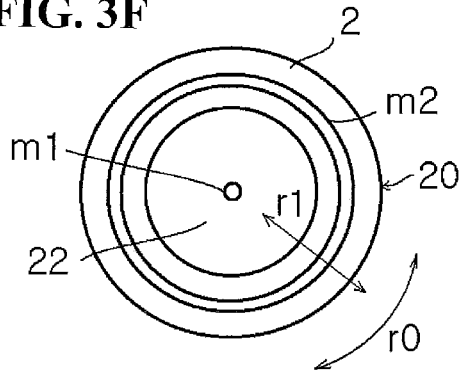
FIG. 3(F) is a schematic bottom view showing the concept of still another embodiment of the apparatus.

For example, as shown in FIG. 3(E), the outside opening in the radial direction can be arranged in the apex of a polygon, that is, in the apex of a rectangle in this case, and the inside opening in the radial direction can be positioned on one side of the rectangle. As a matter of course, other arrangements can also be used.

When the openings other than the first opening m1 feed the second processed fluid into the space between the processing surfaces, each of the openings may be arranged as continuous openings in the circumferential direction r0 as shown in FIG. 3 (F), instead of being arranged discretely in the circumferential direction r0 of the processing surface.

Figure 4A:
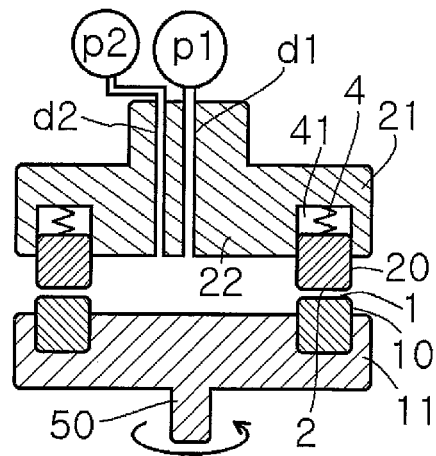
[FIG. 4]
FIG. 4(A) to FIG. 4(D) each show a schematic vertical sectional view showing the concept of still another embodiment of the apparatus shown in FIG. 1.
Figure 4B:
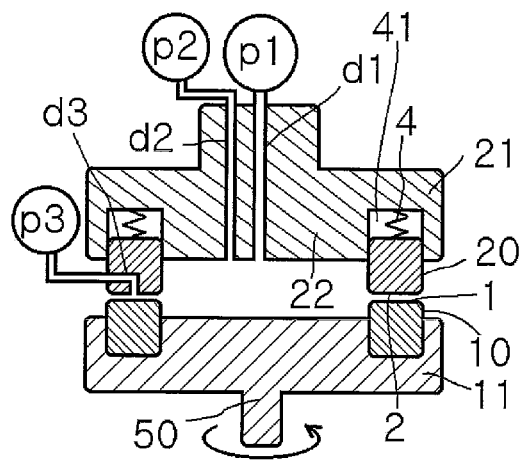
Figure 4C:
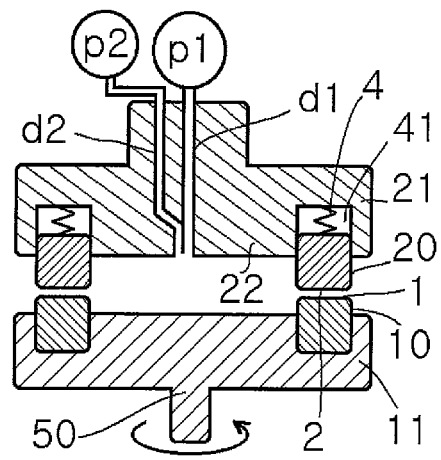
Figure 4D:
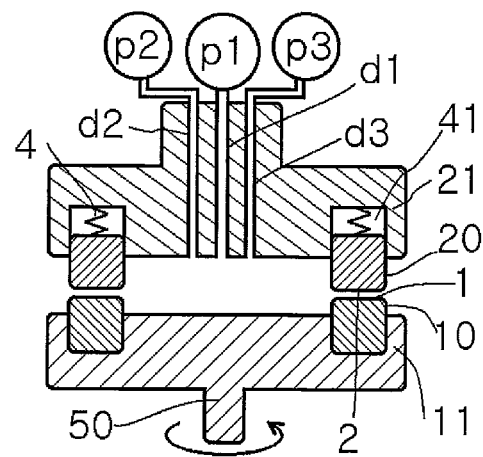

As shown in FIG. 4(A), depending on the object of processing, the second introduction part d2 arranged in the second ring 20 in the apparatus shown in FIG. 1(A) can be, similar to the first introduction part d1, arranged in the central portion 22 of the second holder 21. In this case, the opening of the second introduction part d2 is positioned with a gap outside the opening of the first introduction part d1 positioned in the center of the second ring 20. As shown in FIG. 4(B), in the apparatus shown in FIG. 4(A), the third introduction part d3 can be arranged in the second ring 20. As shown in FIG. 4(C), in the apparatus shown in FIG. 3(A), the second and third processed fluids can be introduced into the space inside the second ring 20 without arranging a gap between the opening of the first introduction part d1 and the opening of the second introduction part d2, so that both the fluids can immediately join together. As shown in FIG. 4(D), depending on the object of processing, in the apparatus shown in FIG. 3(A), the third introduction part d3 can be, similar to the second introduction part d2, arranged in the second holder 21. Four or more introduction parts may be arranged in the second holder 21 (not shown).

Figure 5A:
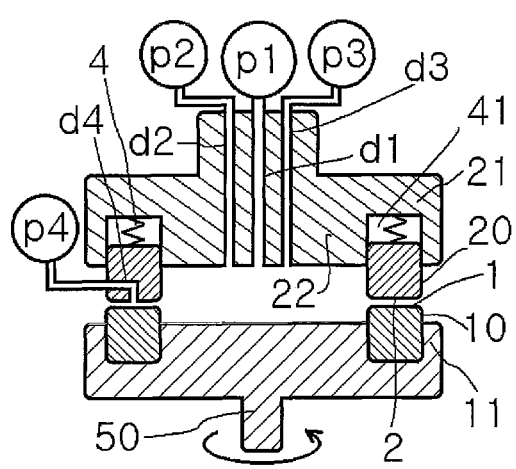
[FIG. 5]
FIG. 5(A) to FIG. 5(D) each show a schematic vertical sectional view showing the concept of still another embodiment of the apparatus shown in FIG. 1.

As shown in FIG. 5(A), depending on the object of processing, in the apparatus shown in FIG. 4(D), the fourth introduction part d4 can be arranged in the second ring 20, so that the fourth processed fluid may be introduced into the space between the processing surfaces 1 and 2.

Figure 5B:
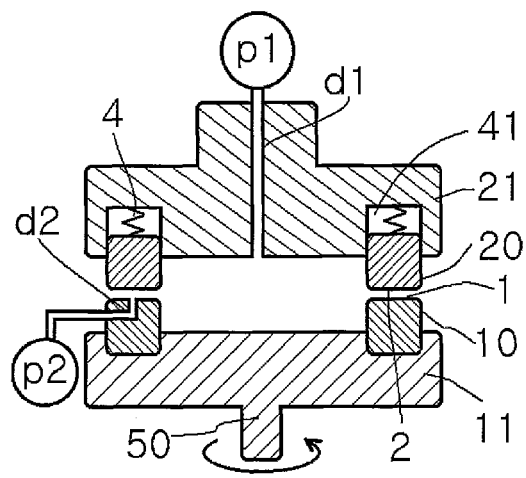

As shown in FIG. 5(B), in the apparatus shown in FIG. 1(A), the second introduction part d2 can be arranged in the first ring 10, and the opening of the second introduction part d2 can be arranged in the first processing surface 1.

Figure 5C:
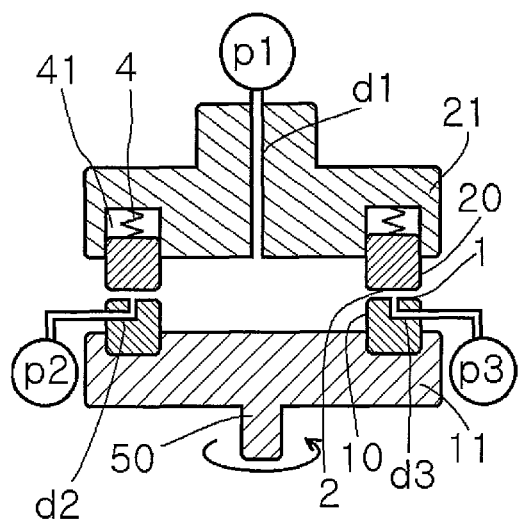

As shown in FIG. 5(C), in the apparatus shown in FIG. 5(B), the third introduction part d3 can be arranged in the first ring 10, and the opening of the third introduction part d3 and the opening of the second introduction part d2 can be arranged in the first processing surface 1 in positions different in the circumferential direction of the first ring 10.

Figure 5D:
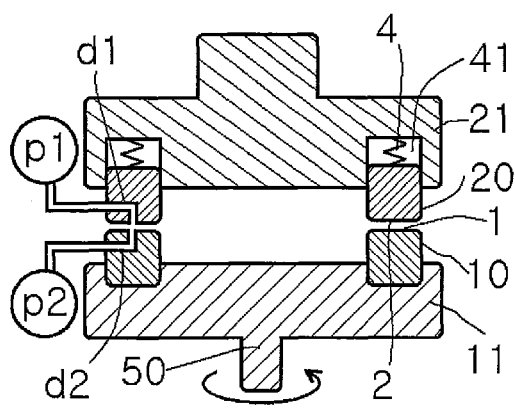

As shown in FIG. 5(D), in the apparatus shown in FIG. 5(B), the first introduction part d1 can be arranged in the second ring 20 instead of arranging the first introduction part d1 in the second holder 21, and the opening of the first introduction part d1 can be arranged in the second processing surface 2. In this case, the openings of the first and second introduction parts d1 and d2 are arranged in positions identical in the radial direction of the ring.

Figure 6A:
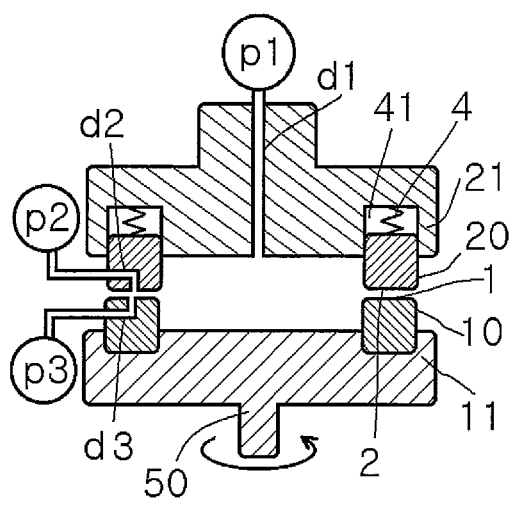
[FIG. 6]
FIG. 6(A) to FIG. 6(D) each show a schematic vertical sectional view showing the concept of still another embodiment of the apparatus shown in FIG. 1.

As shown in FIG. 6(A), in the apparatus shown in FIG. 1(A), the third introduction part d3 can be arranged in the first ring 10, and the opening of the third introduction part d3 can be arranged in the first processing surface 1. In this case, both the openings of the second and third introduction parts d2 and d3 are arranged in positions identical in the radial direction of the ring. However, both the openings may be arranged in positions different in the radial direction of the ring.

Figure 6B:
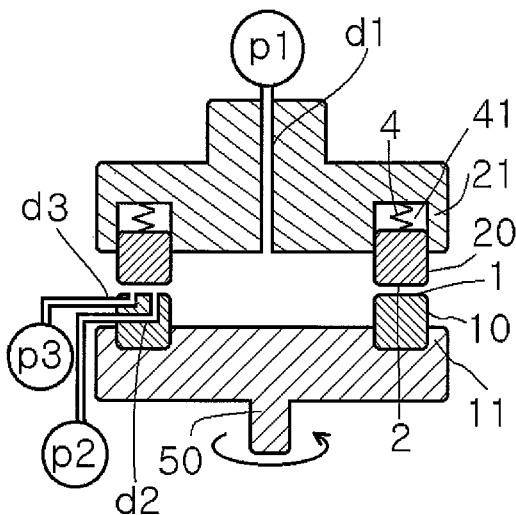

In the apparatus shown in FIG. 5(C), the openings are arranged in positions identical in the radial direction of the first ring 10 and simultaneously arranged in positions different in the circumferential direction (that is, rotation direction) of the first ring 10, but in this apparatus, as shown in FIG. 6(B), both the openings of the second and third introduction parts d2 and d3 can be arranged in positions different in the radical direction of the first ring 10. In this case, as shown in FIG. 6(B), a gap can be arranged between both the openings of the second and third introduction parts d2 and d3 in the radial direction of the first ring 10, or without arranging the gap, the second and third processed fluids may immediately join together (not shown).

Figure 6C:
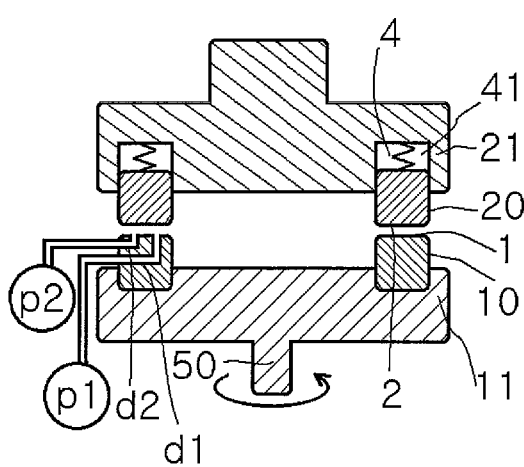

As shown in FIG. 6(C), the first introduction part d1 together with the second introduction part d2 can be arranged in the first ring 10 instead of arranging the first introduction part d1 in the second holder 21. In this case, in the first processing surface 1, the opening of the first introduction part d1 is arranged upstream (inside the radial direction of the first ring 10) from the opening of the second introduction part d2. A gap is arranged between the opening of the first introduction part d1 and the opening of the second introduction part d2 in the radial direction of the first ring 10. Alternatively, such gap may not be arranged (not shown).

Figure 6D:
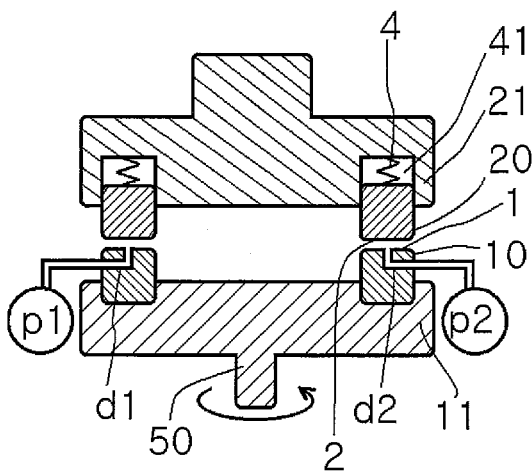

As shown in FIG. 6(D), both the openings of the first introduction part d1 and the second introduction part d2 can be arranged in positions different in the circumferential direction of the first ring 10 in the first processing surface 1 in the apparatus shown in FIG. 6(C).

In the embodiment shown in FIG. 6(C) and FIG. 6(D), three or more introduction parts may be arranged in the first ring 10, and in the second processing surface 2, so the respective openings may be arranged in positions different in the circumferential direction or in positions different in the radial direction of the ring (not shown). For example, the arrangement of openings in the second processing surface 2, shown in FIG. 3(B) to FIG. 3(F), can also be used in the first processing surface 1.

Figure 7A:
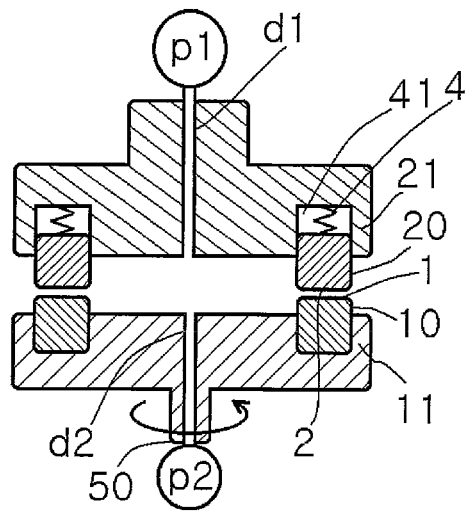
[FIG. 7]
FIG. 7(A) to FIG. 7(D) each show a schematic vertical sectional view showing the concept of still another embodiment of the apparatus shown in FIG. 1.

As shown in FIG. 7(A), in the apparatus shown in FIG. 1(A), the second introduction part d2 can be arranged in the first holder 11 instead of arranging the part d2 in the second ring 20. In this case, the opening of the second introduction part d2 is arranged preferably in the center of the central shaft of rotation of the first ring 10, in the site surrounded with the first ring 10 on the upper surface of the first holder 11.

Figure 7B:
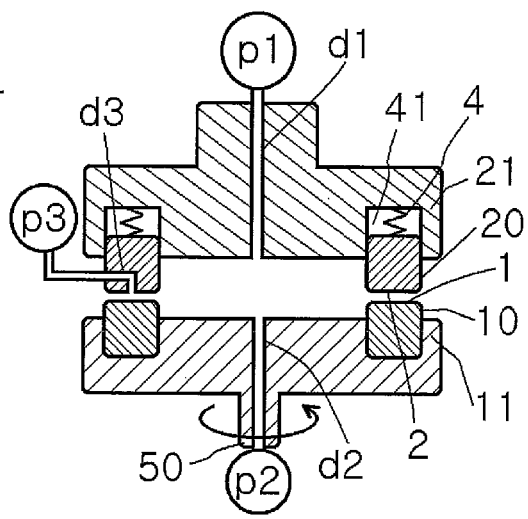

As shown in FIG. 7(B), in the embodiment shown in FIG. 7(A), the third introduction part d3 can be arranged in the second ring 20, and the opening of the third introduction part d3 can be arranged in the second processing surface 2.

Figure 7C:
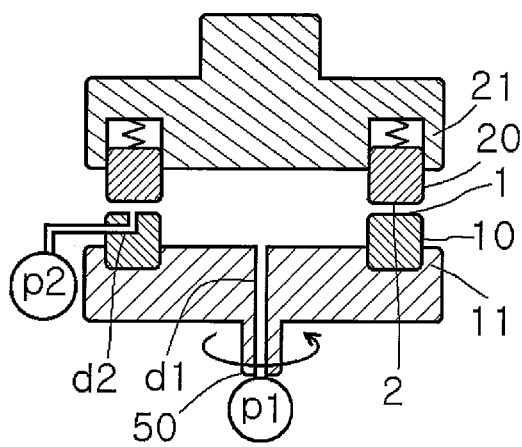

As shown in FIG. 7(C), the first introduction part d1 can be arranged in the first holder 11 instead of arranging the part d1 in the second holder 21. In this case, the opening of the first introduction part d1 is arranged preferably in the central shaft of rotation of the first ring 10, in the site surrounded with the first ring 10 on the upper surface of the first holder 11. In this case, as shown in the figure, the second introduction part d2 can be arranged in the first ring 10, and its opening can be arranged in the first processing surface 1. In this case, the second introduction part d2 can be arranged in the second ring 20, and its opening can be arranged in the second processing surface 2 (not shown).

Figure 7D:
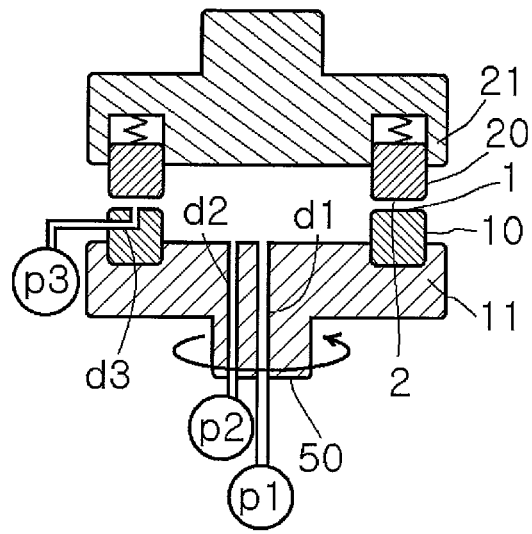

As shown in FIG. 7(D), the second introduction part d2 shown in FIG. 7(C) together with the first introduction part d1 can be arranged in the first holder 11. In this case, the opening of the second introduction part d2 is arranged in the site surrounded with the first ring 10 on the upper surface of the first holder 11. In this case, the second introduction part d2 arranged in the second ring 20 may serve as the third introduction part d3 in FIG. 7(C).

Figure 8A:
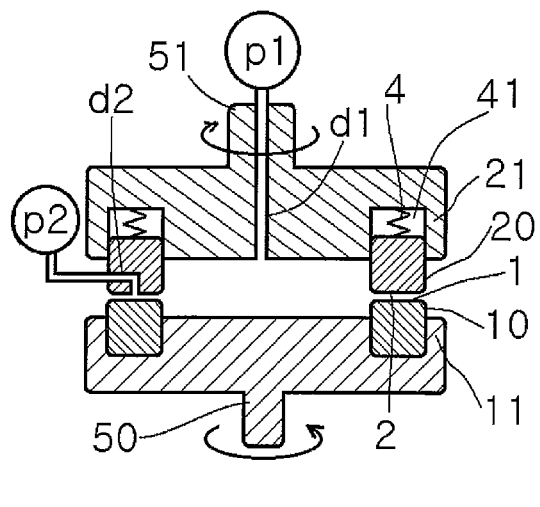
[FIG. 8]
FIG. 8(A) to FIG. 8(D) each show a schematic vertical sectional view showing the concept of still another embodiment of the apparatus shown in FIG. 1.

In the embodiments shown in FIG. 1 to FIG. 7, the first holder 11 and the first ring 10 are rotated relative to the second holder 21 and the second ring 20, respectively. As shown in FIG. 8(A), in the apparatus shown in FIG. 1(A), the second holder 2 may be provided with a rotary shaft 51 rotating with the turning force from the rotation drive member, to rotate the second holder 21 in a direction opposite to the first holder 11. The rotation drive member may be arranged separately from the one for rotating the rotary shaft 50 of the first holder 11 or may receive power from the drive part for rotating the rotary shaft 50 of the first holder 11 by a power transmission means such as a gear. In this case, the second holder 2 is formed separately from the case, and shall, similarly to the first holder 11, be rotatably accepted in the case.

Figure 8B:
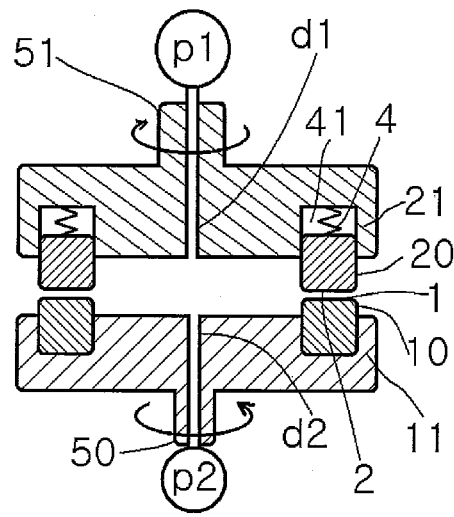

As shown in FIG. 8(B), in the apparatus shown in FIG. 8(A), the second introduction part d2 can be, similarly in the apparatus in FIG. 7(B), arranged in the first holder 11 in place of the second ring 20.

Figure 8C:
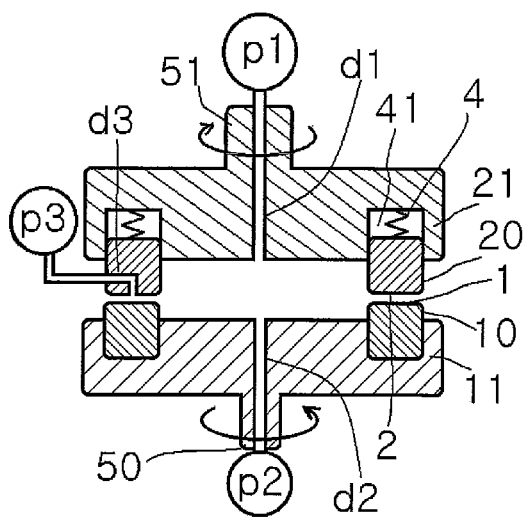

In the apparatus shown in FIG. 8(B), the second introduction part d2 can be arranged in the second holder 21 in place of the first holder 11 (not shown). In this case, the second introduction part d2 is the same as one in the apparatus in FIG. 7(A). As shown in FIG. 8(C), in the apparatus shown in FIG. 8(B), the third introduction part d3 can be arranged in the second ring 20, and the opening of the third introduction part d3 can be arranged in the second processing surface 2.

Figure 8D:
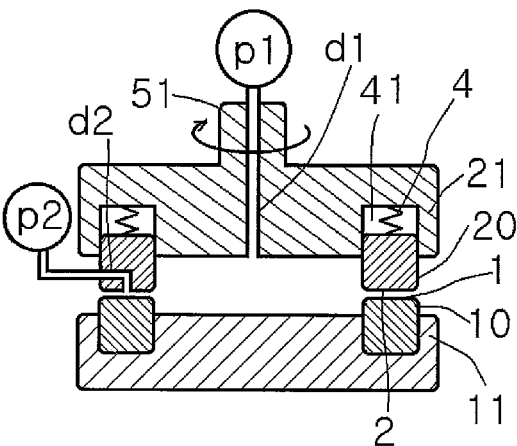

As shown in FIG. 8(D), the second holder 21 only can be rotated without rotating the first holder 11. Even in the apparatuses shown in FIG. 1(B) to FIG. 7, the second holder 21 together with the first holder 11, or the second holder 21 alone, can be rotated (not shown).

Figure 9A:
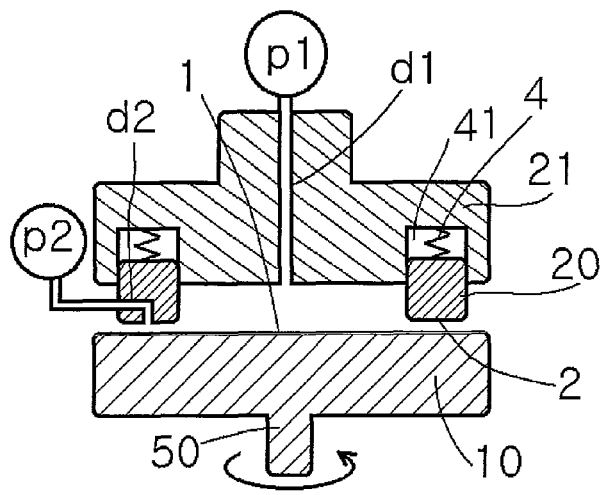
[FIG. 9]
FIG. 9(A) to FIG. 9(C) each show a schematic vertical sectional view showing the concept of still another embodiment of the apparatus shown in FIG. 1.

As shown in FIG. 9(A), the second processing member 20 is a ring, while the first processing member 10 is not a ring and can be a rotating member provided directly with a rotary shaft 50 similar to that of the first holder 11 in other embodiments. In this case, the upper surface of the first processing member 10 serves as the first processing surface 1, and the processing surface is an evenly flat surface which is not circular (that is, hollow-free). In the apparatus shown in FIG. 9(A), similarly in the apparatus in FIG. 1(A), the second introduction part d2 is arranged in the second ring 20, and its opening is arranged in the second processing surface 2.

Figure 9B:
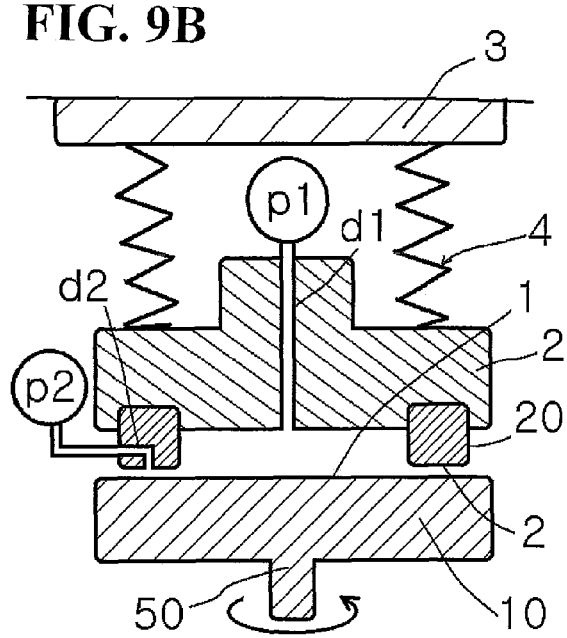
Figure 9C:
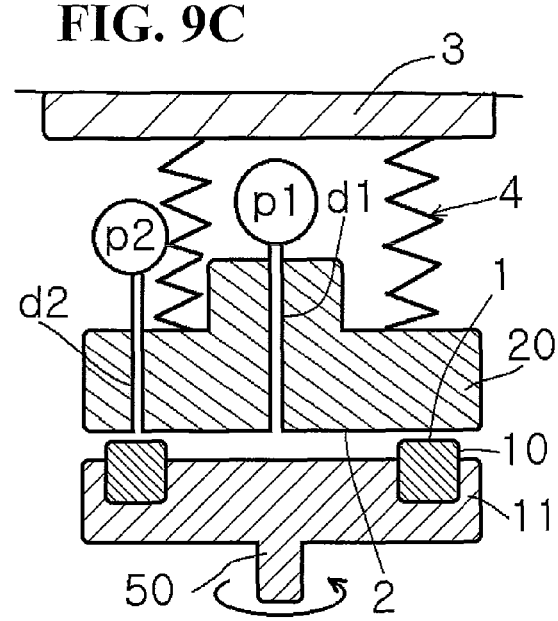
Figure 10A:
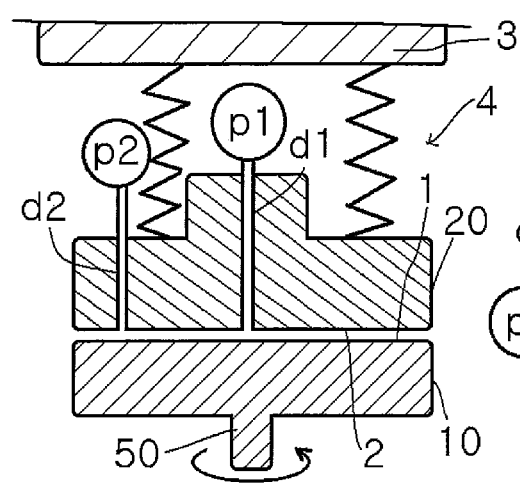
[FIG. 10]
FIG. 10(A) to FIG. 10(D) each show a schematic vertical sectional view showing the concept of still another embodiment of the apparatus shown in FIG. 1.

As shown in FIG. 9(B), in the apparatus shown in FIG. 9(A), the second holder 21 is independent of the case 3, and a surface-approaching pressure imparting mechanism 4 such as an elastic body for approaching to and separating from the first processing member 10 provided with the second ring 20 can be provided between the case 3 and the second holder 21. In this case, as shown in FIG. 9(C), the second processing member 20 is not a ring, but is a member corresponding to the second holder 21, and the lower surface of the member can serve as the second processing surface 2. As shown in FIG. 10(A), in the apparatus shown in FIG. 9(C), the first processing member 10 is not a ring either, and in other embodiments similarly in the apparatus shown in FIG. 9(A) and FIG. 9(B), the site corresponding to the first holder 11 can serve as the first processing member 10, and its upper surface can serve as the first processing surface 1.

In the embodiments described above, at least the first fluid is supplied from the first processing member 10 and the second processing member 20, that is, from the central part of the first ring 10 and the second ring 20, and after processing (mixing and reaction) of the other fluids, the processed fluid is discharged to the outside in the radial direction.

Figure 10B:
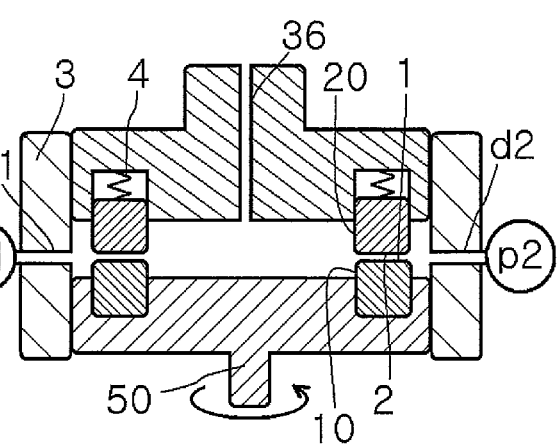

Alternatively, as shown in FIG. 10(B), the first fluid can be supplied in the direction from the outside to the inside of the first ring 10 and the second ring 20. In this case, the outside of the first holder 11 and the second holder 21 is sealed with the case 3, the first introduction part d1 is arranged directly in the case 3, and the opening of the introduction part is arranged in a site inside the case and corresponding to the abutting position of the rings 10 and 20, as shown in the figure. In the apparatus in FIG. 1(A), a discharge part 36 is arranged in the position in which the first introduction part d1 is arranged, that is, in the central position of the ring 1 of the first holder 11. The opening of the second introduction part d2 is arranged in the opposite side of the opening of the case behind the central shaft of rotation of the holder. However, the opening of the second introduction part d may be, similar to the opening of the first introduction part d1, arranged in a site inside the case and corresponding to the abutting position of the rings 10 and 20. As described above, the embodiment is not limited to the one where the opening of the second introduction part d2 is formed to the opposite side of the opening of the first introduction part d1.

A discharge part 36 for the product after processing is arranged. In this case, the outside of the diameter of both rings 10 and 20 is on the upstream side, and the inside of both the rings 10 and 20 is on the downstream side.

Figure 10C:
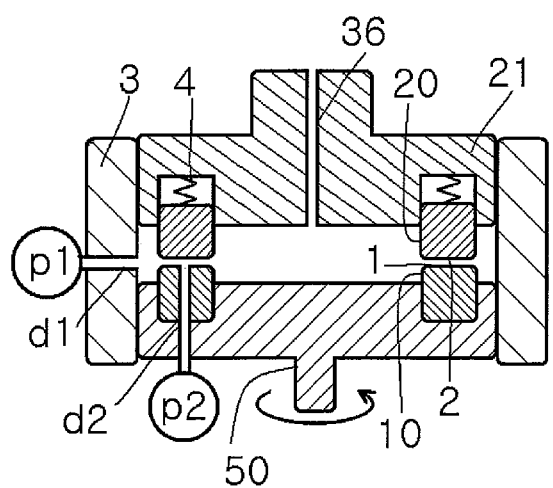
Figure 10D:
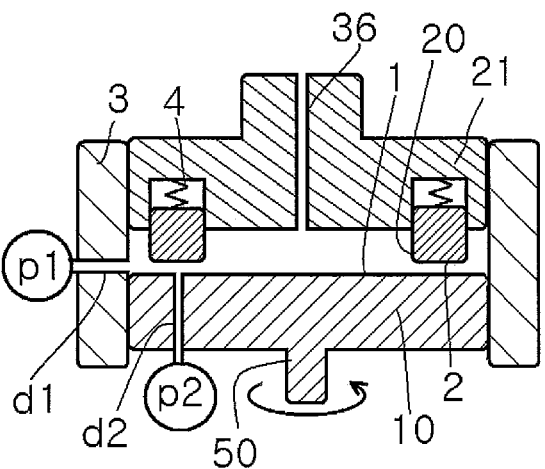

As shown in FIG. 10(C), in the apparatus shown in FIG. 10(B), the second introduction part d2, which is arranged in the side of the case 3, can be arranged in the first ring 10 in space of the mentioned position, and its opening can be arranged in the first processing surface 1. In this case, as shown in FIG. 10(D), the first processing member 10 is not formed as a ring. Similarly in the apparatuses shown in FIG. 9(B), FIG. 9(C) and FIG. 10(A), in other embodiments, the site corresponding to the first holder 11 is the first processing member 10, its upper surface being the first processing surface 1, the second introduction part d2 being arranged in the first processing member 10, and its opening may be arranged in the first processing surface 1.

Figure 11A:
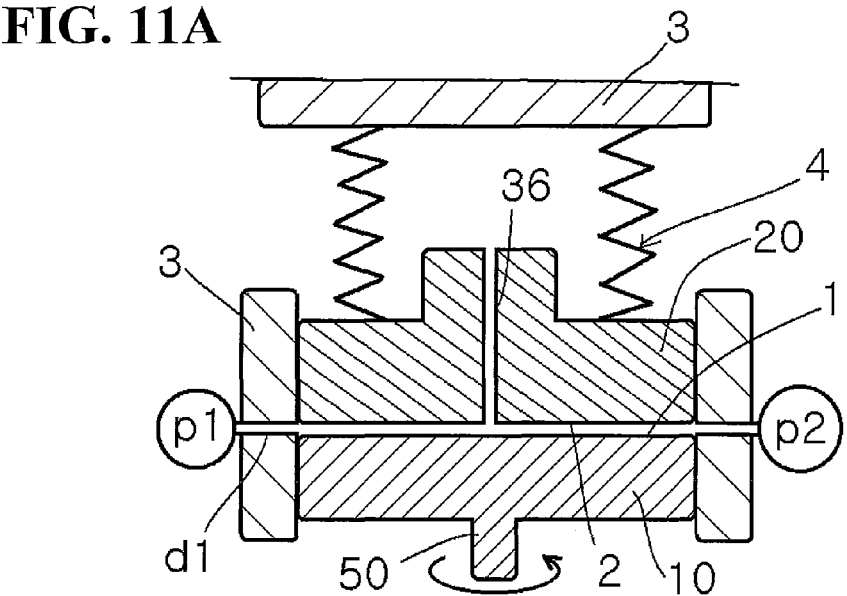
[FIG. 11]
FIG. 11(A) and FIG. 11(B) each show a schematic vertical sectional view showing the concept of still another embodiment of the apparatus shown in FIG. 1.
FIG. 11(C) is a schematic bottom view showing an important part of the apparatus shown in FIG. 1(A).

As shown in FIG. 11(A), in the apparatus shown in FIG. 10(D), the second processing member 20 is not formed as a ring, and in other embodiments, the member corresponding to the second holder 21 serves as the second processing member 2, and its lower surface serves as the second processing surface 2. Then, the second processing member 20 is a member independent of the case 3, and the same surface-approaching pressure imparting mechanism 4 as one in the apparatuses shown in FIG. 9(C), FIG. 9 (D) and FIG. 10(A) can be arranged between the case 3 and the second processing member 20.

Figure 11B:
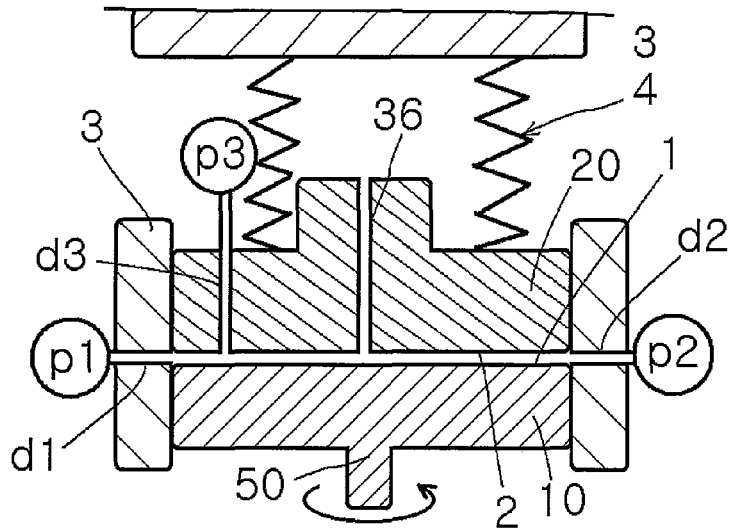
Figure 11C:
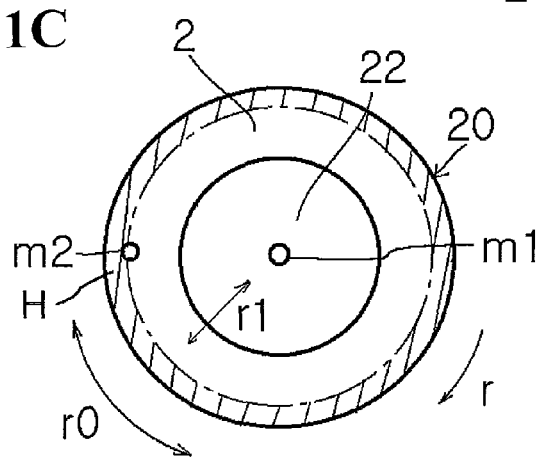

As shown in FIG. 11(B), the second introduction part d2 in the apparatus shown in FIG. 11(A) serves as the third introduction part d3, and separately the second introduction part d2 can be arranged. In this case, the opening of the second introduction part d2 is arranged upstream from the opening of the third introduction part d3 in the second processing surface 2.

In the apparatuses shown in FIG. 4 and the apparatuses shown in FIG. 5(A), FIG. 7(A), FIG. 7(B), FIG. 7(D), FIG. 8(B), and FIG. 8(C), other processed fluids flow into the first processed fluid before reaching the processing surfaces 1 and 2, and these apparatuses are not suitable for the fluid which is rapidly crystallized or separated. However, these apparatuses can be used for the fluid having a low reaction speed.

The processing apparatus suitable for carrying out the method according to the present invention is summarized as follows.

As described above, the processing apparatus comprises a fluid pressure imparting mechanism that imparts predetermined pressure to a processed fluid, at least two processing members, that is, a first processing member 10 arranged in a sealed fluid flow path through which a processed fluid at the predetermined pressure flows and a second processing member 20 capable of approaching to and separating from the first processing member 10, at least two processing surfaces of a first processing surface 1 and a second processing surface 2 arranged in a position in which they are faced with each other in the processing members 10 and 20, and a rotation drive mechanism that relatively rotates the first processing member 10 and the second processing member 20, wherein at least two processed fluids are mixed and reacted between the processing surfaces 1 and 2. Of the first processing member 10 and the second processing member 20, at least the second processing member 20 has a pressure-receiving surface, at least a part of the pressure-receiving surface is comprised of the second processing surface 2, and the pressure-receiving surface receives pressure applied by the fluid pressure imparting mechanism to at least one of the fluids to generate a force to move in the direction of separating the second processing surface 2 from the first processing surface 1. In this apparatus, the processed fluid that has received said pressure passes through the space between the first processing surface 1 and the second processing surface 2 capable of approaching to and separating from each other, thereby generating a desired reaction between the processed fluids with the processed fluids being passed between the processing surfaces 1 and 2 and forming a fluid film of a predetermined thickness.

In this processing apparatus, at least one of the first processing surface 1 and the second processing surface 2 is preferably provided with a buffer mechanism for regulation of micro-vibration and alignment.

In this processing apparatus, one of or both the first processing surface 1 and the second processing surface 2 is preferably provided with a displacement regulating mechanism capable of regulating the displacement in the axial direction caused by abrasion or the like thereby maintaining the thickness of a fluid film between the processing surfaces 1 and 2.

In this processing apparatus, a pressure device such as a compressor for applying predetermined feeding pressure to a fluid can be used as the fluid pressure imparting mechanism.

As the pressure device, a device capable of regulating an increase and decrease in feeding pressure is used. This is because the pressure device should be able to keep established pressure constant and should be able to regulate an increase and decrease in feeding pressure as a parameter to regulate the distance between the processing surfaces.

The processing apparatus can be provided with a separation preventing part for defining the maximum distance between the first processing surface 1 and the second processing surface 2 and preventing the processing surfaces 1 and 2 from separating from each other by the maximum distance or more.

The processing apparatus can be provided with an approach preventing part for defining the minimum distance between the first processing surface 1 and the second processing surface 2 and preventing the processing surfaces 1 and 2 from approaching to each other by the minimum distance or less.

The processing apparatus can be one wherein both the first processing surface 1 and the second processing surface 2 are rotated in opposite directions.

The processing apparatus can be provided with a temperature-regulating jacket for regulating the temperature of either or both of the first processing surface 1 and the second processing surface 2.

The processing apparatus is preferably one wherein at least a part of either or both of the first processing surface 1 and the second processing surface 2 is mirror-polished.

The processing apparatus can be one wherein one of or both the first processing surface 1 and the second processing surface 2 is provided with depressions.

The processing apparatus preferably includes, as a means for feeding one processed fluid to be reacted with another processed fluid, a separate introduction path independent of a path for another processed fluid, at least one of the first processing surface and the second processing surface is provided with an opening leading to the separate introduction path, and another processed fluid sent through the separate introduction path is introduced into the processed fluid.

The processing apparatus for carrying out the present invention comprises a fluid pressure imparting mechanism that imparts predetermined pressure to a fluid, at least two processing surfaces of a first processing surface 1 and a second processing surface 2 capable of approaching to and separating from each other which are connected to a sealed fluid flow path through which the processed fluid at the predetermined pressure is passed, a surface-approaching pressure imparting mechanism that imparts surface-approaching pressure to the space between the processing surfaces 1 and 2, and a rotation drive mechanism that relatively rotates the first processing surface 1 and the second processing surface 2, whereby at least two processed fluids are reacted between the processing surfaces 1 and 2, at least one processed fluid pressurized with the fluid pressure imparting mechanism is passed through the space between the first processing surface 1 and the second processing surface 2 rotating to each other and supplied with surface-approaching pressure, and another processed fluid is passed, so that the processed fluid pressurized with the fluid pressure imparting mechanism, while being passed between the processing surfaces and forming a fluid film of a predetermined thickness, is mixed with another processed fluid, whereby a desired reaction is caused between the processed fluids.

The surface-approaching pressure imparting mechanism can constitute a buffer mechanism of regulating micro-vibration and alignment and a displacement regulation mechanism in the apparatus described above.

The processing apparatus for carrying out the present invention comprises a first introduction part that introduces, into the apparatus, at least one of two processed fluids to be reacted, a fluid pressure imparting mechanism p that is connected to the first introduction part and imparts pressure to the processed fluid, a second introduction part that introduces at least the other fluid of the two processed fluids to be reacted, at least two processing members, that is, a first processing member 10 arranged in a sealed fluid flow path through which the other processed fluid is passed and a second processing member 20 capable of relatively approaching to and separating from the first processing member 10, at least two processing surfaces, that is, a first processing surface 1 and a second processing surface 2 arranged so as to be opposite to each other in the processing members 10 and 20, a holder 21 that accepts the second processing member 20 so as to expose the second processing surface 2, a rotation drive mechanism that relatively rotates the first processing member 10 and the second processing member 20, and a surface-approaching pressure imparting mechanism 4 that presses the second processing member 20 against the first processing surface 1 such that the second processing surface 2 is contacted against or made close to the first processing surface 1, wherein the processed fluids are reacted between the processing surfaces 1 and 2, the holder 21 is provided with an opening of the first introduction part and is not movable so as to influence the space between the processing surfaces 1 and 2, at least one of the first processing member 10 and the second introduction part 20 is provided with an opening of the second introduction part, the second processing member 20 is circular, the second processing surface 2 slides along the holder 21 and approaches to and separates from the first processing surface 1, the second processing member 20 includes a pressure-receiving surface, the pressure-receiving surface receives pressure applied by the fluid pressure imparting mechanism p to the processed fluid to generate a force to move in the direction of separating the second processing surface 2 from the first processing surface 1, at least a part of the pressure-receiving surface is comprised of the second processing surface 2, one of the processed fluids to which pressure was applied is passed through the space between the first processing surface 1 and the second processing surface 2 rotating to each other and capable of approaching to and separating from each other, and the other processed fluid is supplied to the space between the processing surfaces 1 and 2, whereby both the processed fluids form a fluid film of a predetermined thickness and pass through the space between both the processing surfaces 1 and 2, the passing processed fluid are mixed thereby promoting a desired reaction between the processed fluids, and the minimum distance for generating the fluid film of a predetermined thickness is kept between the processing surfaces 1 and 2 by the balance between the surface-approaching pressure by the surface-approaching pressure imparting mechanism 4 and the force of separating the processing surfaces 1 and 2 from each other by the fluid pressure imparted by the fluid pressure imparting mechanism p.

In this processing apparatus, the second introduction part can be, similarly being connected to the first introduction part, arranged to be connected to a separate fluid pressure imparting mechanism and to be pressurized. The processed fluid introduced from the second introduction part is not pressurized by the separate fluid pressure imparting mechanism, but is sucked and supplied into the space between the processing surfaces 1 and 2 by negative pressure generated in the second introduction part by the fluid pressure of the processed fluid introduced into the first introduction part. Alternatively, the other processed fluid flows downward by its weight in the second introduction part and can be supplied into the space between the processing surfaces 1 and 2.

As described above, the apparatus is not limited to the one wherein the opening of the first introduction part as an inlet for feeding the other processed fluid into the apparatus is arranged in the second holder, and the opening of the first introduction part may be arranged in the first holder. The opening of the first introduction part may be formed with at least one of the processing surfaces. However, when the processed fluid to be previously introduced into the space between the processing surfaces 1 and 2 should, depending on the reaction, be supplied from the first introduction part, the opening of the second introduction part as an inlet for feeding the other processed fluid into the apparatus should be arranged downstream from the opening of the first introduction part in any of the processing surfaces.

As the processing apparatus for carrying out the present invention, the following apparatus can be used.

This processing apparatus comprises a plurality of introduction parts that separately introduce two or more processed fluids to be reacted, a fluid pressure imparting mechanism p that imparts pressure to at least one of the two or more processed fluids, at least two processing members, that is, a first processing member 10 arranged in a sealed fluid flow path through which the processed fluid is passed and a second processing member 20 capable of approaching to and separating from the first processing member 10, at least two processing surfaces 1 and 2, that is, a first processing surface 1 and a second processing surface 2 arranged in a position in which they are faced with each other in the processing members 10 and 20, and a rotation drive mechanism that relatively rotates the first processing member 10 and the second processing member 20, wherein the processed fluids are reacted between the processing surfaces 1 and 2, at least the second processing member 20 of the first processing member 10 and the second processing member 20 includes a pressure-receiving surface, at least a part of the pressure-receiving surface is comprised of the second processing surface 2, the pressure-receiving surface receives pressure applied by the fluid pressure imparting mechanism to the processed fluid to generate a force to move in the direction of separating the second processing surface 2 from the first processing surface 1, the second processing member 20 includes an approach regulating surface 24 that is directed to the opposite side of the second processing surface 2, the approach regulating surface 24 receives predetermined pressure applied to the processed fluid to generate a force to move in the direction of approaching the second processing surface 2 to the first processing surface 1, a force to move in the direction of separating the second processing surface 2 from the first processing surface 1 as a resultant force of total pressure received from the processed fluid is determined by the area ratio of the projected area of the approach regulating surface 24 in the approaching and separating direction to the projected area of the pressure-receiving surface in the approaching and separating direction, the processed fluid to which pressure was applied is passed through the space between the first processing surface 1 and the second processing surface 2 that rotate relative to each other and capable of approaching to and separating from each other, the other processed fluid to be reacted with the processed fluid is mixed in the space between the processing surfaces, and the mixed processed fluid forms a fluid film of predetermined thickness and simultaneously passes through the space between the processing surfaces 1 and 2, thereby giving a desired reaction product while passing through the space between the processing surfaces.

The processing method according to the present invention is summarized as follows. The processing method comprises applying predetermined pressure to a first fluid, connecting at least two processing surfaces, that is, a first processing surface 1 and a second processing surface 2, which are capable of approaching to and separating from each other, to a sealed fluid flow path through which the processed fluid that has received the predetermined pressure is passed, applying a surface-approaching pressure of approaching the first processing surface 1 and the second processing surface 2 each other, rotating the first processing surface 1 and the second processing surface 2 relative to each other, and introducing the processed fluid into the space between the processing surfaces 1 and 2, wherein the second processed fluid to be reacted with the processed fluid is introduced through a separate flow path into the space between the processing surfaces 1 and 2 thereby reacting both the processed fluids, the predetermined pressure applied to at least the first processed fluid functions as a separating force for separating the processing surfaces 1 and 2 from each other, and the separating force and the surface-approaching pressure are balanced via the processed fluid between the processing surfaces 1 and 2, whereby the distance between the processing surfaces 1 and 2 is kept in a predetermined minute space, the processed fluid is passed as a fluid film of predetermined thickness through the space between the processing surfaces 1 and 2, and when both the processed fluids are uniformly reacted with each other while passing and accompanied by separation, a desired reaction product is crystallized or separated.

Figure 25:
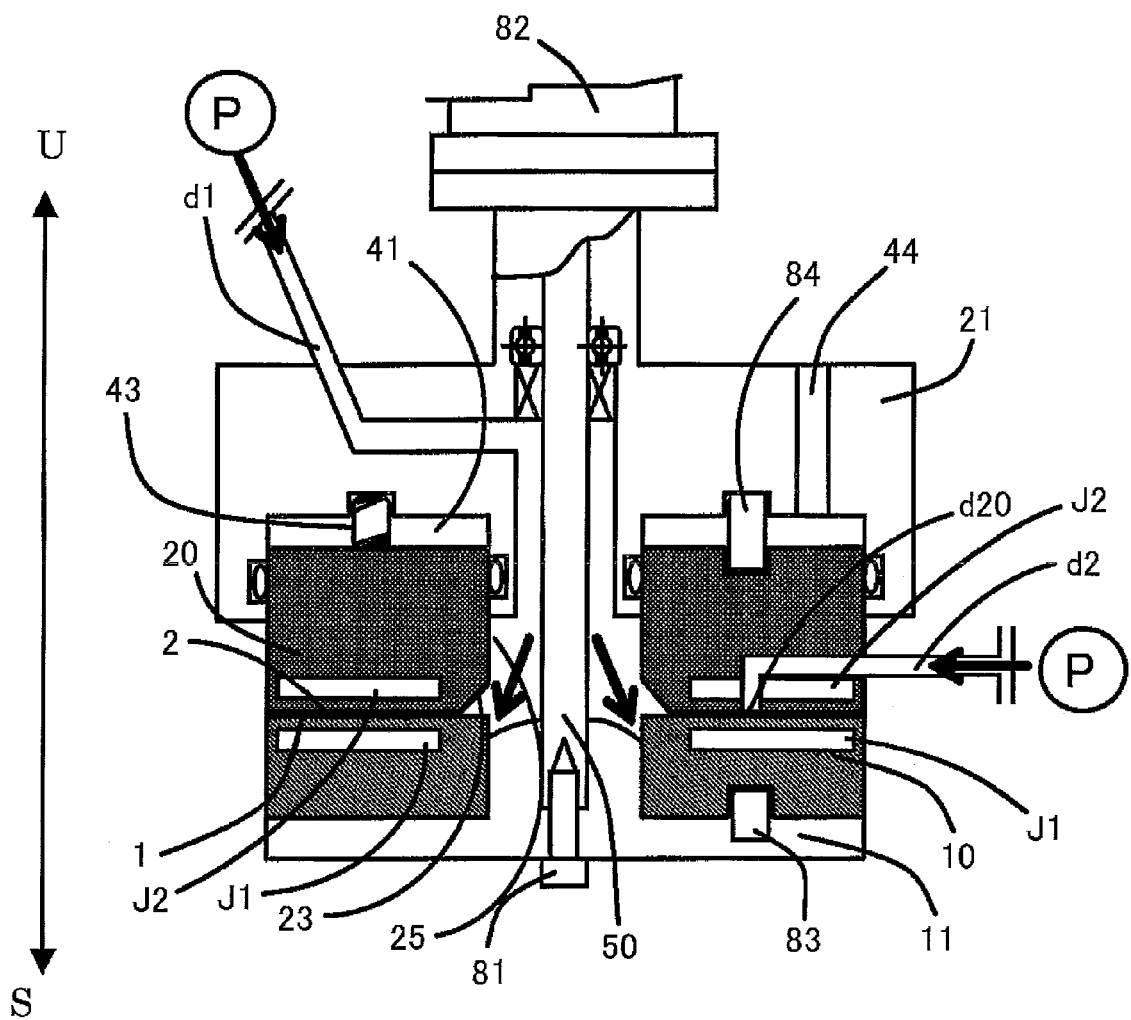
[FIG. 25]
Figure 26A:
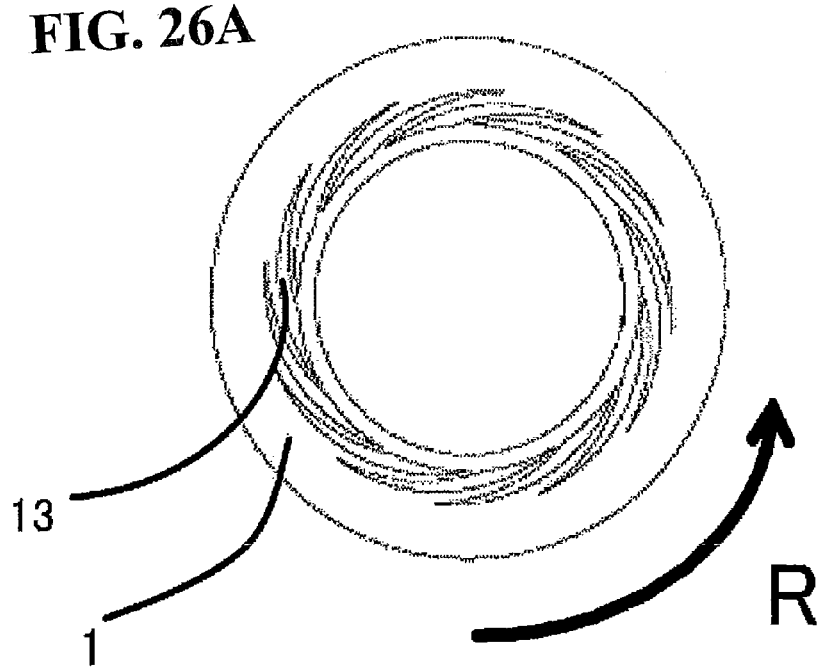
FIG. 26(A) is a schematic plane view of the first processing surface in the apparatus shown in FIG. 25, and FIG. 26 (B) is an enlarged view showing an important part of the first processing surface in the apparatus shown in FIG. 25.
Figure 26B:
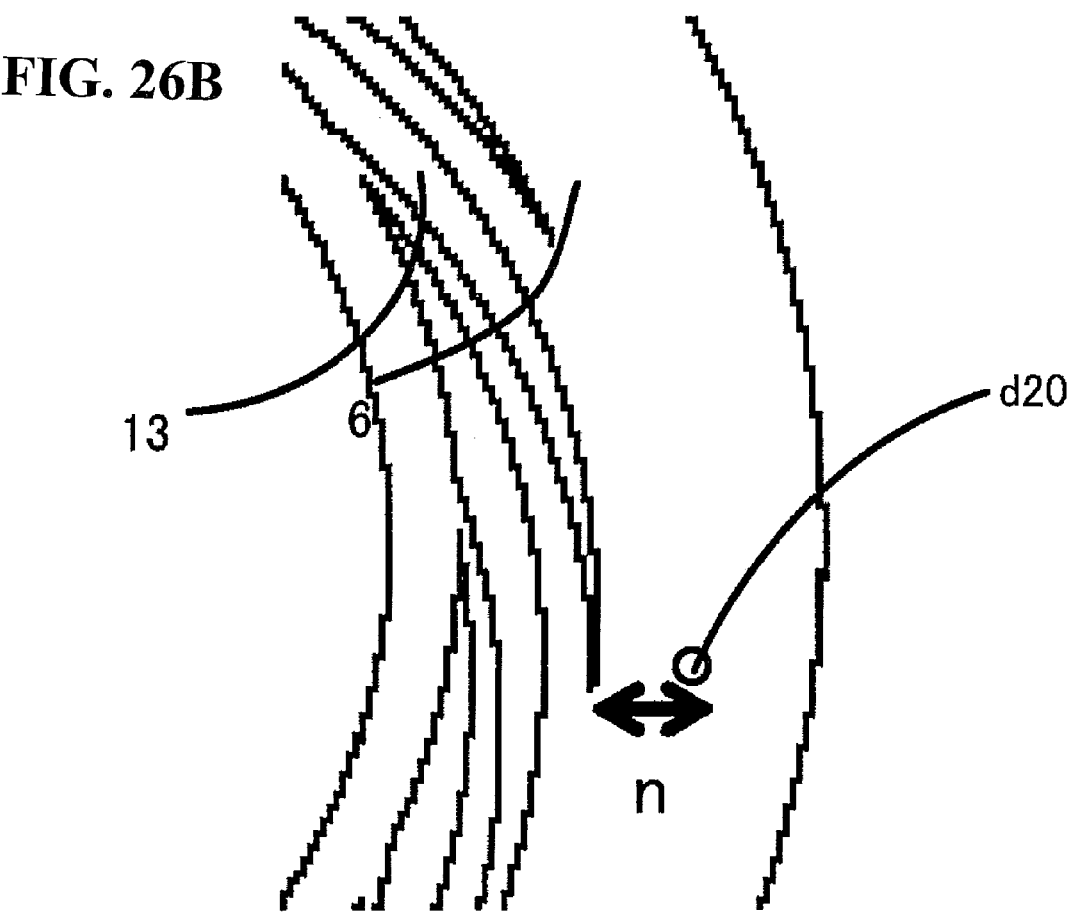
[FIG. 26]
Figure 27A:
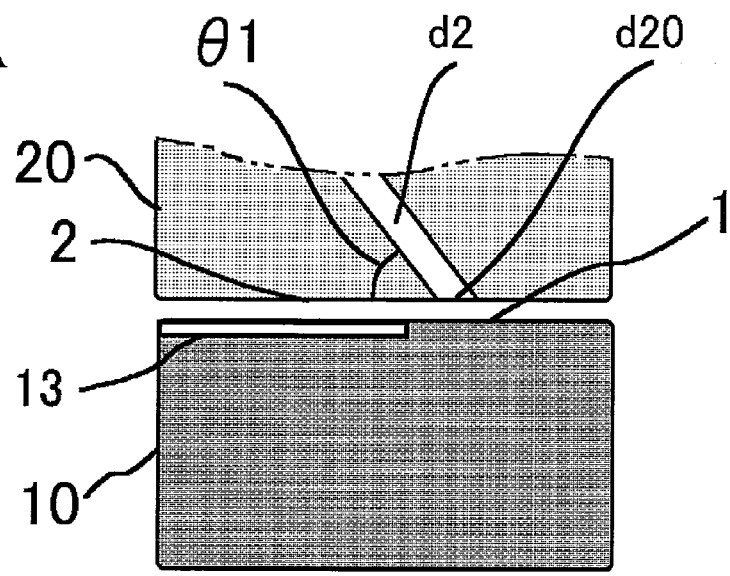
FIG. 27(A) is a sectional view of the second introduction path.

Hereinafter, other embodiments of the present invention are described in detail. FIG. 25 is a schematic sectional view of a reaction apparatus wherein reactants are reacted between processing surfaces, at least one of which rotates relative to the other, and which are capable of approaching to and separating from each other. FIG. 26(A) is a schematic plane view of the first processing surface in the apparatus shown in FIG. 25, and FIG. 26(B) is an enlarged view of an important part of the processing surface in the apparatus shown in FIG. 25. FIG. 27(A) is a sectional view of the second introduction path, and FIG. 27(B) is an enlarged view of an important part for explaining the second introduction path.

In FIG. 25, arrows U and S show upward and downward directions respectively.

Figure 27B:
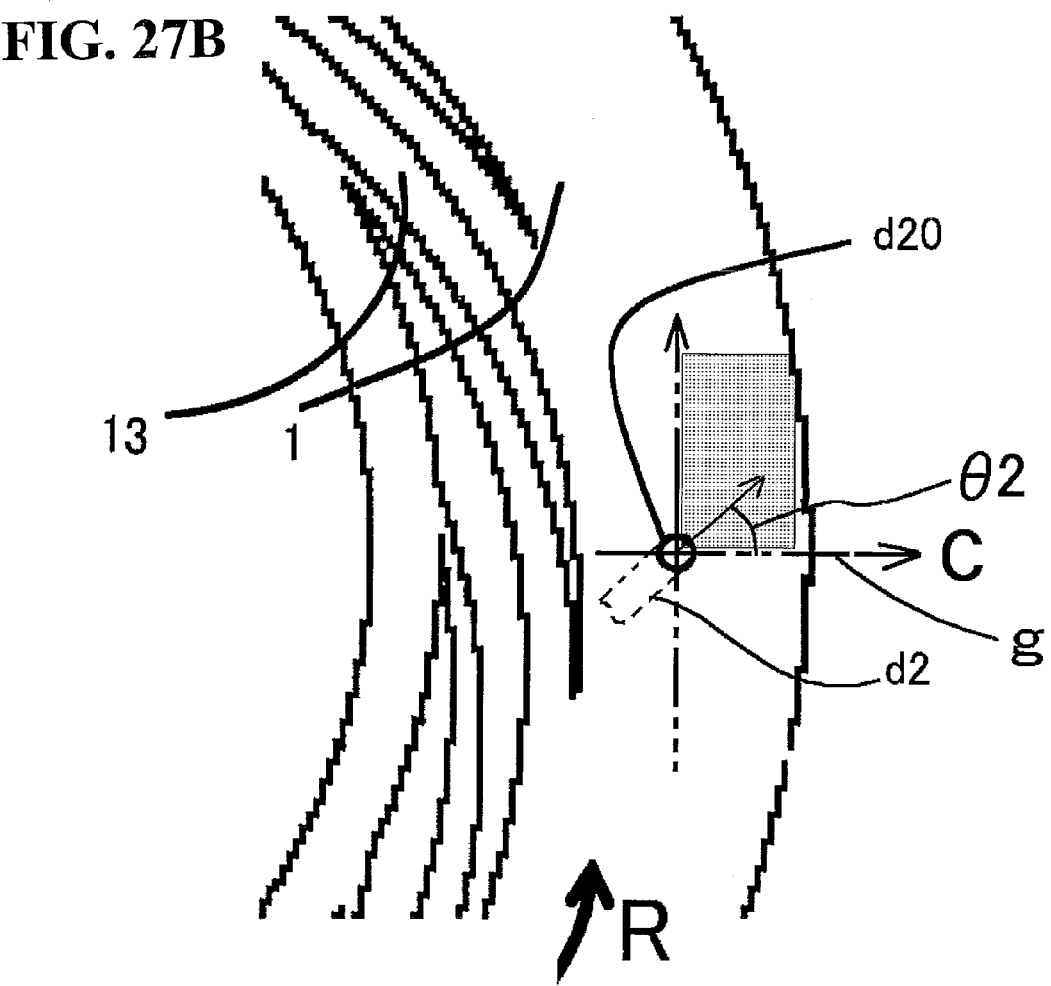
FIG. 27(B) is an enlarged view showing an important part of the processing surface for explaining the second introduction path.

In FIG. 26(A) and FIG. 27(B), arrow R shows the direction of rotation.

In FIG. 27(B), arrow C shows the direction of centrifugal force (radial direction).

This apparatus uses at least two fluids, at least one of which contains at least one kind of reactant, and the fluids join together in the space between the processing surfaces arranged to be opposite so as to be able to approach to and separate from each other, at least one of which rotates relative to the other, thereby forming a thin film fluid, and the reactants are reacted in the thin film fluid.

As shown in FIG. 25, this apparatus includes a first holder 11, a second holder 21 arranged over the first holder 11, a fluid pressure imparting mechanism P and a surface-approaching pressure imparting mechanism. The surface-approaching pressure imparting mechanism is comprised of a spring 43 and an air introduction part 44.

The first holder 11 is provided with a first processing member 10 and a rotary shaft 50. The first processing member 10 is a circular body called a mating ring and provided with a mirror-polished first processing surface 1. The rotary shaft 50 is fixed to the center of the first holder 11 with a fixing device 81 such as a bolt and is connected at its rear end to a rotation drive device 82 (rotation drive mechanism) such as a motor, and the drive power of the rotation drive device 82 is transmitted to the first holder 1 thereby rotating the first holder 11. The first processing member 10 is integrated with the first holder 11 and rotated.

A receiving part capable of receiving the first processing member 10 is arranged on the upper part of the first holder 11, wherein the first processing member 10 has been fixed to the first holder 11 by insertion to the receiving part. The first processing member 10 has been fixed with a rotation-preventing pin 83 so as not to be rotated relative to the first holder 11. However, a method such as fitting by burning may be used for fixing in place of the rotation-preventing pin 83 in order to prevent rotation.

The first processing surface 1 is exposed from the first holder 11 and faced with the second holder 21. The material for the first processing surface includes ceramics, sintered metal, abrasion-resistant steel, other hardened metals, and rigid materials subjected to lining, coating or plating.

The second holder 21 is provided with a second processing member 20, a first introduction part d1 for introducing a fluid from the inside of the processing member, a spring 43 as a surface-approaching pressure imparting mechanism, and an air introduction part 44.

The second processing member 20 is a circular member called a compression ring and includes a second processing surface 2 subjected to mirror polishing and a pressure-receiving surface 23 (referred to hereinafter as a separation regulating surface 23) which is located inside the second processing surface 2 and adjacent to the second processing surface 2. As shown in the figure, the separation regulating surface 23 is an inclined surface. The method of the mirror polishing to which the second processing surface 2 was subjected is the same as that to the first processing surface 1. The material for the second processing member 20 may be the same as one for the first processing member 10. The separation regulating surface 23 is adjacent to the inner periphery 25 of the circular second processing member 20.

A ring-accepting part 41 is formed in the bottom (lower part) of the second holder 21, and the second processing member 20 together with an O-ring is accepted in the ring-accepting part 41. The second processing member 20 is accepted with a rotation preventive 84 so as not to be rotated relative to the second holder 21. The second processing surface 2 is exposed from the second holder 21. In this state, the second processing surface 2 is faced with the first processing surface 1 of the first processing member 10.

The ring-accepting part 41 arranged in the second holder 21 is a depression for mainly accepting that side of the second ring 20 which is opposite to the processing surface 2 and is a groove formed in a circular form when viewed in a plane.

The ring-accepting part 41 is formed in a larger size than the second ring 20 and accepts the second ring 20 with sufficient clearance between itself and the second ring 20.

By this clearance, the second processing member 20 is accepted in the ring-accepting part 41 such that it can be displaced not only in the axial direction of the accepting part 41 but also in a direction perpendicular to the axial direction. The second processing member 20 is accepted in the ring-accepting part 41 such that the central line (axial direction) of the second processing member 20 can be displaced so as not to be parallel to the axial direction of the ring-accepting part 41.

The spring 43 is arranged as a processing member-biasing part in at least the ring-accepting part 41 of the second holder 21. The spring 43 biases the second processing member 20 toward the first processing member 10. As another bias method, air pressure such as one in the air introduction part 44 or another pressurization means for applying fluid pressure may be used to bias the second processing member 20 held by the second holder 21 in the direction of approaching the second processing member 20 to the first processing member 10.

The surface-approaching pressure imparting mechanism such as the spring 43 or the air introduction part 44 biases each position (each position in the processing surface) in the circumferential direction of the second processing member 20 evenly toward the first processing member 10. The first introduction part d1 is arranged on the center of the second holder 21, and the fluid which is pressure-fed from the first introduction part d1 to the outer periphery of the processing member is first introduced into the space surrounded with the second processing member 20 held by the second holder 21, the first processing member 10, and the first holder 11 that holds the first processing member 10. Then, the feeding pressure (supply pressure) of the fluid by the fluid pressure imparting mechanism P is applied to the pressure-receiving surface 23 arranged in the second processing member 20, in the direction of separating the second processing member 20 from the first processing member 10 against the bias of the biasing part.

Figure 29A:
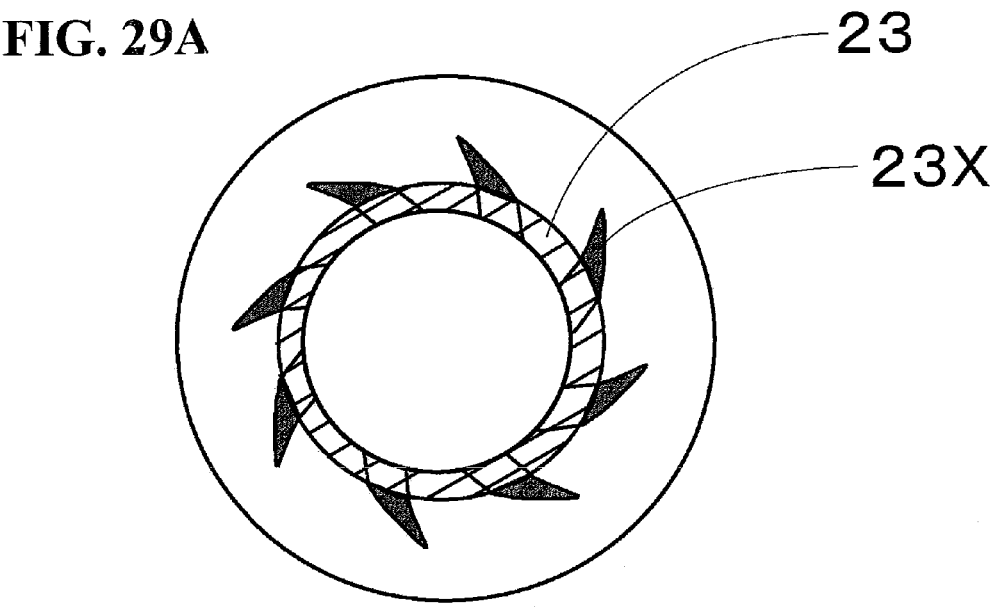
FIG. 29(A) is a bottom view of the second processing member.
Figure 29B:
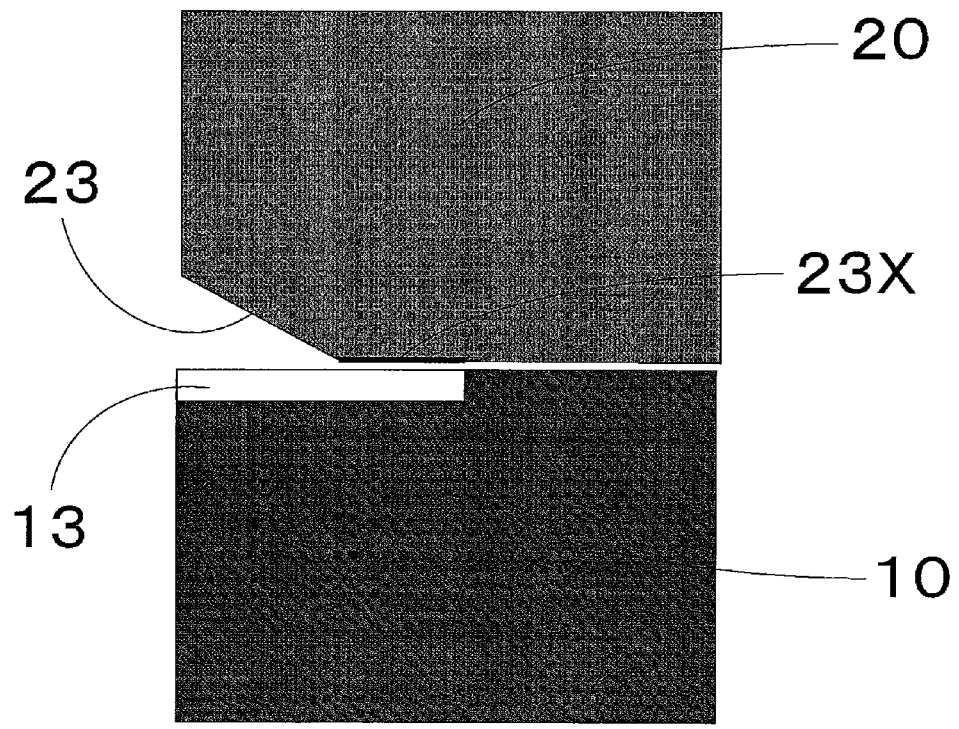
FIG. 29(B) is an enlarged sectional view showing an important part thereof.

For simplifying the description of other components, only the pressure-receiving surface 23 is described, and as shown in FIG. 29(A) and FIG. 29(B), properly speaking, together with the pressure-receiving surface 23, a part 23X not provided with the pressure-receiving surface 23, out of the projected area in the axial direction relative to the second processing member 20 in a grooved depression 13 described later, serves as a pressure-receiving surface and receives the feeding pressure (supply pressure) of the fluid by the fluid pressure imparting mechanism P.

The apparatus may not be provided with the pressure-receiving surface 23. In this case, as shown in FIG. 26(A), the effect (micro-pump effect) of introduction of the processed fluid into the space between the processing surfaces formed by rotation of the first processing surface 1 provided with the grooved depression 13 formed to function the surface-approaching pressure imparting mechanism may be used. The micro-pump effect is an effect by which the fluid in the depression advances with speed toward the end in the circumferential direction by rotation of the first processing surface 1 and then the fluid sent to the end of the depression 13 further receives pressure in the direction of inner periphery of the depression 13 thereby finally receiving pressure in the direction of separating the processing surface and simultaneously introducing the fluid into the space between the processing surfaces. Even if the first processing surface 1 is not rotated, the pressure applied to the fluid in the depression 13 arranged in the first processing surface 1 finally acts on the second processing surface 2 to be separated as a pressure-receiving surface.

For the depression 13 arranged on the processing surface, its total area in the horizontal direction relative to the processing surface, and the depth, number, and shape of depressions, can be established depending on the physical properties of a fluid containing reactants and reaction products.

The pressure-receiving surface 23 and the depression 13 may be arranged in the same apparatus.

The depression 13 is a depression having a depth of 1 μm to 50 μm, preferably 3 μm to 20 μm, which is arranged on the processing surface, the total area thereof in the horizontal direction is 5% to 50%, preferably 15% to 25%, based on the whole of the processing surface, the number of depressions is 3 to 50, preferably 8 to 24, and the depression extends in a curved or spiral form on the processing surface or bends at a right angle, having depth changing continuously, so that fluids with high to low viscosity, even containing solids, can be introduced into the space between the processing surfaces stably by the micro-pump effect. The depressions arranged on the processing surface may be connected to one another or separated from one another in the side of introduction, that is, inside the processing surface.

As described above, the pressure-receiving surface 23 is inclined. This inclined surface (pressure-receiving surface 23) is formed such that the distance in the axial direction between the upstream end in the direction of flow of the processed fluid and the processing surface of the processing member provided with the depression 13 is longer than the distance between the downstream end and the aforesaid processing surface. The downstream end of this inclined surface in the direction of flow of the processed fluid is arranged preferably on the projected area in the axial direction of the depression 13.

Figure 28A:
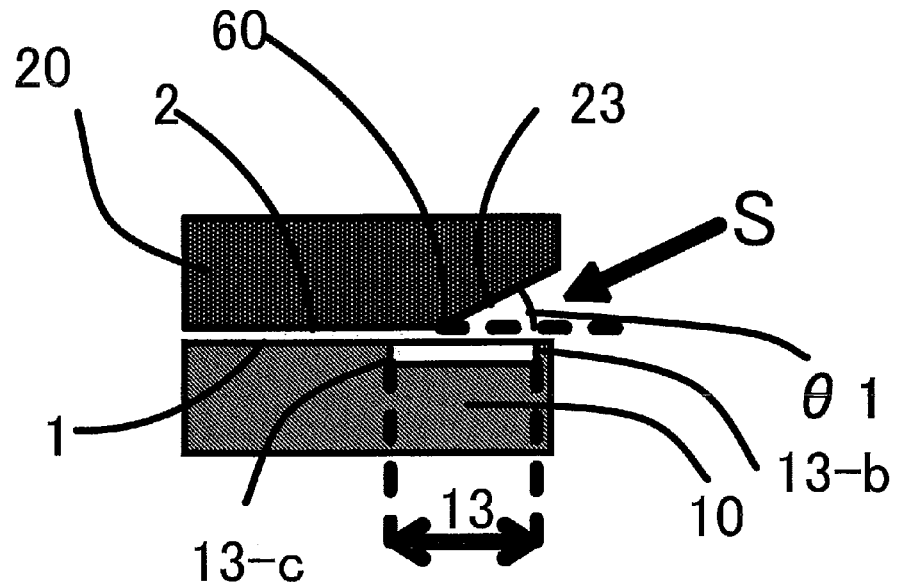
FIG. 28(A) and FIG. 28(B) are each an enlarged sectional view of an important part for explaining an inclined surface arranged in the processing member.
Figure 28B:
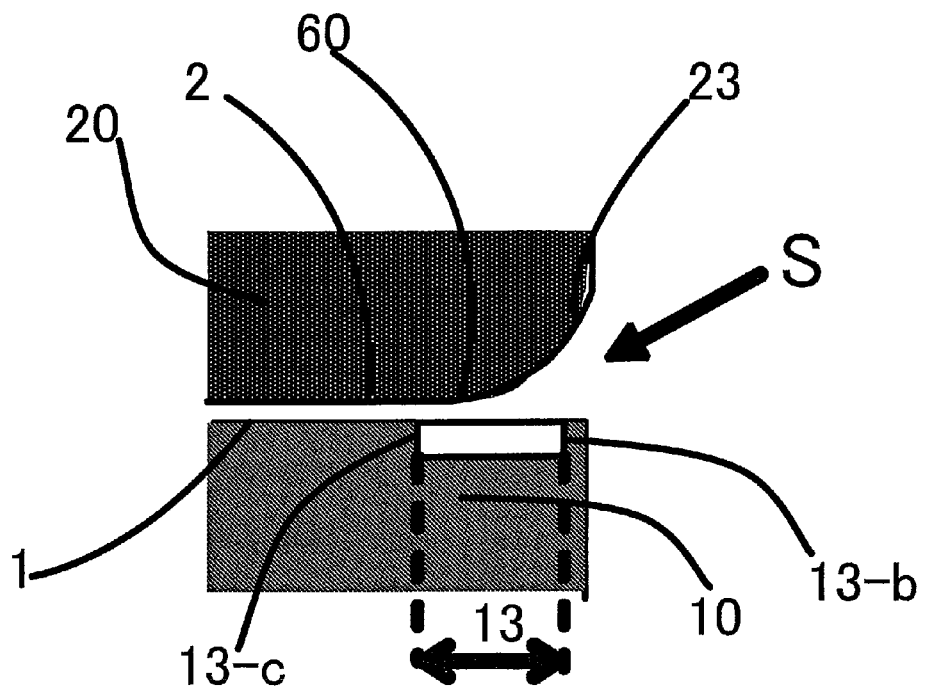

Specifically, as shown in FIG. 28(A), a downstream end 60 of the inclined surface (pressure-receiving surface 23) is arranged on the projected area in the axial direction of the depression 13. The angle $\theta 1$ of the inclined surface to the second processing surface 2 is preferably in the range of 0.1° to 85°, more preferably in the range of 10° to 55°, still more preferably in the range of 15° to 45°. The angle $\theta 1$ can vary depending on properties of the processed product before processing. The downstream end 60 of the inclined surface is arranged in the region extending from the position apart downstream by 0.01 mm from an upstream end 13-$b$ to the position apart upstream by 0.5 mm from a downstream end 13-$c$ in the depression 13 arranged in the first processing surface 1. The downstream end 60 of the inclined surface is arranged more preferably in the region extending from the position apart downstream by 0.05 mm from an upstream end 13-$b$ to the position apart upstream by 1.0 mm from a downstream end 13-$c$. Like the angle of the inclined surface, the position of the downstream end 60 can vary depending on properties of a material to be processed. As shown in FIG. 28(B), the inclined surface (pressure-receiving surface 23) can be a curved surface. The material to be processed can thereby be introduced more uniformly.

The depressions 13 may be connected to one another or separated from one another as described above. When the depressions 13 are separated, the upstream end at the innermost peripheral side of the first processing surface 1 is 13-$b$, and the upstream end at the outermost peripheral side of the first processing surface 1 is 13-$c$.

In the foregoing description, the depression 13 was formed on the first processing surface 1 and the pressure-receiving surface 23 was formed on the second processing surface 2. On the contrary, the depression 13 may be formed on the second processing surface 2, and the pressure-receiving surface 23 may be formed on the first processing surface 1.

Alternatively, the depression 13 is formed both on the first processing surface 1 and the second processing surface 2, and the depression 13 and the pressure-receiving surface 23 are alternately arranged in the circumferential direction of each of the respective processing surfaces 1 and 2, whereby the depression 13 formed on the first processing surface 1 and the pressure-receiving surface 23 formed on the second processing surface 2 are faced with each other and simultaneously the pressure-receiving surface 23 formed on the first processing surface 1 and the depression 13 formed on the second processing surface 2 are faced with each other.

A groove different from the depression 13 can be formed on the processing surface. Specifically, as shown in FIG. 16(F) and FIG. 16(G), a radially extending novel depression 14 instead of the depression 13 can be formed outward in the radial direction (FIG. 16(F)) or inward in the radial direction (FIG. 16(G)). This is advantageous for prolongation of retention time between the processing surfaces or for processing a highly viscous fluid.

The groove different from the depression 13 is not particularly limited with respect to the shape, area, number of depressions, and depth. The groove can be formed depending on the object.

The second introduction part d2 independent of the fluid flow path introduced into the processing surface and provided with the opening d20 leading to the space between the processing surfaces is formed on the second processing member 20.

Specifically, as shown in FIG. 27(A), the direction of introduction of the second introduction part d2 from the opening d20 of the second processing surface 2 is inclined at a predetermined elevation angle ($\theta 1$) relative to the second processing surface 2. The elevation angle ($\theta 1$) is arranged at more than 0° and less than 90°, and when the reaction speed is high, the angle (θ1) is preferably arranged at 1° to 45°.

As shown in FIG. 27(B), the direction of introduction of the second processing surface 2 from the opening d20 has directionality in a plane along the second processing surface 2. The direction of introduction of the second fluid is in the direction in which a component on the processing surface is made apart in the radial direction and in the direction in which the component is forwarded in the rotation direction of the fluid between the rotating processing surfaces. In other words, a predetermined angle (θ2) exists facing the rotation direction R from a reference line g in the outward direction and in the radial direction passing through the opening d20.

The elevation angle (θ1) is arranged at more than 0° and less than 90°, and when the reaction speed is high, the angle (θ1) is preferably arranged at 1° to 45°.

The angle (θ2) is also arranged at more than 0° and less than 90° at which the fluid is discharged from the opening d20 in the shaded region in FIG. 27(B). When the reaction speed is high, the angle (θ2) may be small, and when the reaction speed is low, the angle (θ2) is preferably arranged larger. This angle can vary depending on various conditions such as the type of fluid, the reaction speed, viscosity, and the rotation speed of the processing surface.

The bore diameter of the opening d20 is preferably 0.2 μm to 3000 more preferably 10 μm to 1000 μm. Even if the bore diameter of the opening d20 is relatively large, the diameter of the second introduction part d2 shall be 0.2 μm to 3000 μm, more preferably 10 μm to 1000 μm, and when the diameter of the opening d20 does not substantially influence the flow of a fluid, the diameter of the second introduction part d2 may be established in this range. Depending on whether the fluid is intended to be transferred straight or dispersed, the shape of the opening d20 is preferably changed and can be changed depending on various conditions such as the type of fluid, reaction speed, viscosity, and rotation speed of the processing surface.

The opening d20 in the separate flow path may be arranged at a position nearer to the outer diameter than a position where the direction of flow upon introduction by the micro-pump effect from the depression arranged in the first processing surface 1 is converted into the direction of flow of a spiral laminar flow formed between the processing surfaces. That is, in FIG. 26(B), the distance n from the outermost side in the radial direction of the processing surface of the depression arranged in the first processing surface 1 to the outside in the radial direction is preferably 0.5 mm or more. When a plurality of openings are arranged for the same fluid, the openings are arranged preferably concentrically. When a plurality of openings are arranged for different fluids, the openings are arranged preferably concentrically in positions different in radius. This is effective for the reactions such as cases (1) A+B→C and (2) C+D→E should occur in due order, but other case, i.e., A+B+C→F should not occur, or for circumventing a problem that an intended reaction does not occur due to insufficient contact among reactants.

The processing members are dipped in a fluid, and a fluid obtained by reaction between the processing surfaces can be directly introduced into a liquid outside the processing members or into a gas other than air.

Further, ultrasonic energy can be applied to the processed material just after being discharged from the space between the processing surfaces or from the processing surface.

Then, the case where temperature regulating mechanisms J1 and J2 are arranged in at least one of the first processing member 10 and the second processing member 20 for generating a temperature difference between the first processing surface 1 and the second processing surface 2 is described.

The temperature regulating mechanism is not particularly limited. A cooling part is arranged in the processing members 10 and 20 when cooling is intended. Specifically, a piping for passing ice water and various cooling media or a cooling element such as a Peltier device capable of electric or chemical cooling is attached to the processing members 10 and 20.

When heating is intended, a heating part is arranged in the processing members 10 and 20. Specifically, steam as a temperature regulating medium, a piping for passing various hot media, and a heating element such as an electric heater capable of electric or chemical heating is attached to the processing members 10 and 20.

An accepting part for a new temperature regulating medium capable of directly contacting with the processing members may be arranged in the ring-accepting part. The temperature of the processing surfaces can be regulated by heat conduction of the processing members. Alternatively, a cooling or heating element may be embedded in the processing members 10 and 20 and electrified, or a path for passing a cooling medium may be embedded, and a temperature regulating medium (cooling medium) is passed through the path, whereby the temperature of the processing surfaces can be regulated from the inside. By way of example, the temperature regulating mechanisms J1 and J2 which are pipes (jackets) arranged inside the processing members 10 and 20 are shown in FIG. 25.

By utilizing the temperature regulating mechanisms J1 and J2, the temperature of one of the processing surfaces is made higher than that of the other, to generate a temperature difference between the processing surfaces. For example, the first processing member 10 is heated to 60° C. by any of the methods, and the second processing member 20 is set at 15° C. by any of the methods. In this case, the temperature of the fluid introduced between the processing surfaces is changed from 60° C. to 15° C. in the direction from the first processing surface 1 to the second processing surface 2. That is, the fluid between the processing surfaces has a temperature gradient. The fluid between the processing surfaces initiates convection due to the temperature gradient, and a flow in a direction perpendicular to the processing surface is generated. The "flow in a direction perpendicular to the processing surface" refers to a flow in which components flowing in a direction perpendicular to at least the processing surface are contained in flowing components.

Even when the first processing surface 1 or the second processing surface 2 rotates, the flow in a direction perpendicular to the processing surface is continued, and thus the flow in a direction perpendicular to the processing surface can be added to the spiral laminar flow between the processing surfaces caused by rotation of the processing surfaces. The temperature difference between the processing surfaces is 1° C. to 400° C., preferably 5° C. to 100° C.

The rotary shaft 50 in this apparatus is not limited to a vertically arranged shaft. For example, the rotary shaft may be arranged at a slant. This is because the influence of gravity can be substantially eliminated by the a thin fluid film formed between the processing surfaces 1 and 2 during processing. As shown in FIG. 25, the first introduction part d1 coincides with the shaft center of the second ring 20 in the second holder 21 and extends vertically. However, the first introduction part d1 is not limited to the one coinciding with the shaft center of the second ring 20, and as far as it can supply the first processing fluid to the space surrounded with the rings 10 and 20, the part d1 may be arranged at a position outside the shaft center in the central part 22 of the second holder 21 and may extend obliquely as well as vertically. Regardless of the angle at which the part d1 is arranged, a flow perpendicular to the processing surface can be generated by the temperature gradient between the processing surfaces.

When the temperature gradient of the fluid between the processing surfaces is low, heat conduction merely occurs in the fluid, but when the temperature gradient exceeds a certain border value, a phenomenon called Benard convection is generated in the fluid. This phenomenon is governed by Rayleigh number Ra, a dimensionless number, defined by the following equation:

$$Ra = L^3 \cdot g \cdot \beta \cdot \Delta T / (\alpha \cdot \nu)$$

wherein L is the distance between processing surfaces; g is gravitational acceleration; β is coefficient of volumetric thermal expansion of fluid; ν is dynamic viscosity of fluid; α is heat diffusivity of fluid; and ΔT is temperature difference between processing surfaces. The critical Rayleigh number at which Benard convection is initiated to occur, although varying depending on the properties of a boundary phase between the processing surface and the processed fluid, is regarded as about 1700. At a value higher than this value, Benard convection occurs. Under the condition where the Rayleigh number Ra is a large value of about $10^{10}$ or more, the fluid becomes a turbulent flow. That is, the temperature difference ΔT between the processing surfaces or the distance L between the processing surfaces in this apparatus are regulated such that the Rayleigh number Ra becomes 1700 or more, whereby a flow perpendicular to the processing surface can be generated between the processing surfaces, and the reaction procedures described above can be carried out.

However, the Benard convection hardly occurs when the distance between the processing surfaces is about 1 μm to 10 μm. Strictly, when the Rayleigh number is applied to a fluid between the processing surfaces having a distance of 10 μm or less therebetween to examine the conditions under which Benard convection is generated, the temperature difference should be several thousands of degrees or more in the case of water, which is practically difficult. Benard convection is one related to density difference in temperature gradient of a fluid, that is, to gravity. When the distance between the processing surfaces is 10 μm or less, there is high possibility of minute gravity field, and in such a place, buoyancy convection is suppressed. That is, it is the case where the distance between the processing surfaces is 10 μm or more that Benard convection actually occurs.

When the distance between the processing surfaces is about 1 μm to 10 μm, convection is generated not due to density difference but due to surface tension difference of a fluid resulting from temperature gradient. Such convection is Marangoni convection. This phenomenon is governed by Marangoni number Ma, a dimensionless number, defined by the following equation:

$$Ma = \sigma \cdot \Delta T \cdot L / (\rho \cdot \nu \cdot \alpha)$$

wherein L is the distance between processing surfaces; ν is dynamic viscosity of fluid; α is heat diffusivity of fluid; ΔT is temperature difference between processing surfaces; ρ is density of fluid; and σ is temperature coefficient of surface tension (temperature gradient of surface tension). The critical Marangoni number at which Marangoni convection is initiated to occur is about 80, and under the conditions where the Marangoni number is higher than this value, Marangoni convection occurs. That is, the temperature difference ΔT between the processing surfaces or the distance L between the processing surfaces in this apparatus is regulated such that the Marangoni number Ma becomes 80 or more, whereby a flow perpendicular to the processing surface can be generated between the processing surfaces even if the distance therebetween is as small as 10 μm or less, and the reaction procedures described above can be carried out.

For calculation of Rayleigh number, the following equations were used.

$$Ra = \frac{L^3 \cdot \beta \cdot g}{\nu \cdot \alpha} \Delta T \quad \text{[Equation 1]}$$

$$\Delta T = (T_1 - T_0)$$

$$\alpha = \frac{k}{\rho \cdot C_p}$$

L is the distance (m) between processing surfaces; β is coefficient of volumetric thermal expansion (1/K); g is gravitational acceleration (m/s²); ν is dynamic viscosity (m²/s); α is heat diffusivity (m²/s); ΔT is temperature difference (K) between processing surfaces; ρ is density (kg/m³); Cp is isobaric specific heat (J/kg·K); k is heat conductivity (W/m·K); $T_1$ is temperature (K) at high temperature side in processing surface; and $T_0$ is temperature (K) at low temperature side in processing surface.

When the Rayleigh number at which Benard convection is initiated to occur is the critical Rayleigh number $Ra_C$, the temperature difference $\Delta T_{C1}$ is determined as follows:

$$\Delta T_{C1} = \frac{Ra_C \cdot \nu \cdot \alpha}{L^3 \cdot \beta \cdot g} \quad \text{[Equation 2]}$$

For calculation of Marangoni number, the following equations were used.

$$Ma = \frac{\sigma_t \cdot L}{\rho \cdot \nu \cdot \alpha} \Delta T \quad \text{[Equation 3]}$$

$$\Delta T = (T_1 - T_0)$$

$$\alpha = \frac{k}{\rho \cdot C_p}$$

L is the distance (m) between processing surfaces; ν is dynamic viscosity (m²/s); α is heat diffusivity (m²/s); ΔT is temperature difference (K) between processing surfaces; ρ is density (kg/m³); Cp is isobaric specific heat (J/kg·K); k is heat conductivity (W/m·K); $\sigma_t$ is surface tension temperature coefficient (N/m·k); $T_1$ is temperature (K) of a high-temperature surface out of processing surface; and $T_0$ is temperature (K) of a low-temperature surface out of processing surface.

When the Marangoni number at which Marangoni convection is initiated to occur is the critical Marangoni number $Ma_C$, the temperature difference $\Delta T_{C2}$ determined as follows:

$$\Delta T_{C2} = \frac{Ma_C \cdot \rho \cdot \nu \cdot \alpha}{\sigma_t \cdot L} \quad \text{[Equation 4]}$$

The materials for the processing surfaces 1 and 2 arranged to be opposite to each other so as to be able to approach to and separate from each other, at least one of which rotates relative to the other, are not particularly limited, and the processing surfaces 1 and 2 can be prepared from ceramics, sintered metals, abrasion-resistant steels, other metals, metals subjected to hardening treatment, or rigid materials subjected to lining, coating or plating. In the present invention, the distance between the processing surfaces 1 and 2 arranged to be opposite to each other so as to be able to approach to and separate from each other, at least one of which rotates relative to the other, is 0.1 µm to 100 µm, particularly preferably 1 µm to 10 µm.

As shown in FIG. 1(A), the reaction such as separation, precipitation or crystallization occurs by forced uniform mixing between the processing surfaces 1 and 2 arranged to be opposite to each other so as to be able to approach to and separate from each other, at least one of which rotates relative to the other. The particle size, monodispersity or crystal form of the pigment nanoparticles can be regulated by changing the revolution number and flow rate in the processing members 10 and 20, the distance between the processing surfaces, and the concentration of raw materials.

Hereinafter, the reaction of production of pigment nanoparticles by the forced ultrathin film rotary reaction method will be described in more detail.

(Acid pasting method)

When the forced ultrathin film rotary reaction method is used in the acid pasting method, water or an alkaline solution as a first fluid is introduced through one flow path, that is, the first introduction part d1 into the space between the processing surfaces 1 and 2 arranged to be opposite to each other so as to be able to approach to and separate from each other, at least one of which rotates relative to the other, thereby forming a first fluid film between the processing surfaces.

Then, a fluid having an acid including a reactant pigment substance dissolved therein (pigment acidic solution) is introduced as a second fluid directly through another flow path, that is, the second introduction part d2 into the first fluid film produced between the processing surfaces 1 and 2.

As described above, the first and second fluids are instantly mixed in an ultrathin film state kept between the processing surfaces 1 and 2, the distance of which is fixed by the pressure balance between the supply pressure of the fluid and the pressure exerted between the rotating processing surfaces, thereby effecting the reaction of forming pigment particles.

To effect the reaction between the processing surfaces 1 and 2, the second fluid may be introduced through the first introduction part d1 and the first fluid through the second introduction part d2, as opposed to the above description. That is, the expression "first" or "second" for each solvent has a meaning for merely discriminating an $n^{th}$ solvent among a plurality of solvents present, and third or more solvents can also be present.

As described above, the first fluid is water or a solution including an alkaline solution. The water is preferably purified water such as ion-exchange water, pure water or distilled water. The alkaline solution includes, for example, ammonia water, an aqueous solution of sodium hydroxide, and an aqueous solution of potassium hydroxide.

The strong acid used in the second fluid is not particularly limited and is not problematic as long as it shows solubility for pigments. In the case of an acidic aqueous solution, for example, sulfuric acid, hydrochloric acid, nitric acid or trifluoroacetic acid can be used. Preferably, a strong acid, particularly 95% or more concentrated sulfuric acid can be used.

For the purpose of control of the crystal form of the pigment and the quality control of the pigment, an organic solvent may be mixed in the first or second fluid. The organic solvent may be known one. Besides the organic solvent, a dispersant such as a block copolymer, a high-molecular polymer or a surfactant may be contained.

(Re-precipitation Method)

Then, when the forced ultrathin film rotary reaction method is used in a re-precipitation method, a solvent which as the first solvent, becomes a poor solvent for the pigment but is compatible with a solvent described below, is introduced through one flow path, that is, the first introduction part d1, into the space between the processing surfaces 1 and 2 arranged to be opposite to each other so as to be able to approach to and separate from each other, at least one of which rotates relative to the other, thereby forming a first fluid film between the processing surfaces 1 and 2.

Then, a fluid containing an organic solvent having a pigment dissolved therein is introduced as a second fluid directly through another flow path, that is, the second introduction part d2 into the first fluid film produced between the processing surfaces 1 and 2.

As described above, the first and second fluids are instantly mixed in an ultrathin film state kept between the processing surfaces 1 and 2, the distance of which is fixed by the pressure balance between the supply pressure of the fluid and the pressure exerted between the processing surfaces 1 and 2, thereby effecting the reaction of forming pigment particles.

To effect the reaction between the processing surfaces 1 and 2, the second fluid may be introduced through the first introduction part d1 and the first fluid through the second introduction part d2, as opposed to the above description. That is, the expression "first" or "second" for each solvent has a meaning for merely discriminating an $n^{th}$ solvent among a plurality of solvents present, and third or more solvents can also be present.

As described above, the first fluid is not particularly limited as long as it is a poor solvent for pigments and is compatible with a solvent dissolving the pigment forming the second fluid. The first fluid is preferably selected from water, alcohol solvents, ketone solvents, ether solvents, aromatic solvents, carbon disulfide, aliphatic solvents, nitrile solvents, sulfoxide solvents, halogen solvents, ester solvents, ionic solutions, and mixed solvents of two or more thereof.

The organic solvent used in the second fluid is not particularly limited and is not problematic as long as it shows solubility for pigments. Preferable examples of the organic solvent include amide solvents such as 1-methyl-2-pyrrolidinone, 1,3-dimethyl-2-imidazolidinone, 2-pyrrolidinone, ε-caprolactam, formamide, N-methylformamide, N,N-dimethylformamide, acetamide, N-methylacetamide, N,N-dimethylacetamide, N-methylpropanamide, and hexamethyl phosphoric triamide.

Further, a dispersant such as a block copolymer, a high-molecular polymer or a surfactant may be contained in the first or second fluid.

(pH Adjustment Method)

Then, when the forced ultrathin film rotary reaction method is used in a pH changing method, a pigment-separating solution that changes pH is introduced as a first fluid through one flow path, that is the first introduction part d1 into the space between the rotating processing surfaces 1 and 2 to form a first fluid film between the processing surfaces.

Then, a pigment solution prepared by dissolving at least one kind of pigment in an acidic or alkaline pH adjusting solution or in a mixed solution of the pH adjusting solution and an organic solvent is introduced as a second fluid directly into the first fluid film produced between the processing surfaces 1 and 2.

As described above, the first and second fluids are instantly mixed in an ultrathin film state kept between the processing surfaces 1 and 2, the distance of which is fixed by the pressure balance between the supply pressure of the fluid and the pressure exerted between the rotating processing surfaces 1 and 2, thereby effecting the reaction of forming pigment particles.

Specifically, an organic pigment hardly soluble in a certain organic solvent, for example, is added to and dissolved in an alkaline solution prepared by adding an alkaline substance to the organic solvent, thereby forming an organic pigment solution (second fluid), and this organic pigment solution is added to a pigment-separating solution (first fluid) using water, another organic solvent, an organic solvent free from the alkali substance, or an acid-containing solvent, whereby the pH of the organic pigment solution is changed and the reaction of separating pigments can be carried out between the processing surfaces 1 and 2. In this case, the acid and alkali added for dissolving or separating pigments may be selected depending on the type of pigment.

To effect the reaction between the processing surfaces 1 and 2, the second fluid may be introduced through the first introduction part d1 and the first fluid through the second introduction part d2, as opposed to the above description. That is, the expression "first" or "second" for each fluid has a meaning for merely discriminating an $n^{th}$ fluid among a plurality of fluids present, and third or more fluids can also be present.

As described above, the pigment-separating solution as a first fluid is a solution capable of changing the pH of the pigment solution and is not particularly limited as long as it does not show solubility for pigment that is intended to be separated, or has lower solubility for the pigment than that of the solvent contained in the pigment solution as a second fluid. The pigment-separating solution contains water, an organic solvent or a mixture thereof. The water is preferably purified water such as ion-exchange water, pure water or distilled water. The organic solvent includes, but is not limited to, monohydric alcohol solvents represented by methanol, ethanol, isopropanol and t-butanol, polyhydric alcohol solvents represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin and trimethylol propane, amide solvents such as 1-methyl-2-pyrrolidinone, 1,3-dimethyl-2-imidazolidinone, 2-pyrrolidinone, ε-caprolactam, formamide, N-methylformamide, N,N-dimethylformamide, acetamide, N-methylacetamide, N,N-dimethylacetamide, N-methylpropanamide, hexamethyl phosphoric triamide, urea and tetramethyl urea, polyhydric alcohol lower monoalkyl ether solvents such as ethylene glycol monomethyl (or ethyl)ether, diethylene glycol monomethyl (or ethyl) ether and triethylene glycol monoethyl (or butyl)ether, polyether solvents such as ethylene glycol dimethyl ether (monoglyme), diethylene glycol dimethyl ether (diglyme) and triethylene glycol dimethyl ether (triglyme), sulfur-containing solvents such as sulfolane, dimethylsulfoxide and 3-sulfolene, multifunctional solvents such as diacetone alcohol and diethanolamine, carboxylic acid solvents such as acetic acid, maleic acid, docosahexaenoic acid, trichloroacetic acid and trifluoroacetic acid, sulfonic acid solvents such as methanesulfonic acid and trifluorosulfonic acid, and benzene solvents such as benzene, toluene and xylene.

An acidic or alkaline pH adjusting solution prepared by adding an acidic or alkaline pH adjusting substance to a solvent may also be used. The pH adjusting substance in this case is not particularly limited. Alkaline pH adjusting substances include inorganic bases such as lithium hydroxide, sodium hydroxide, potassium hydroxide, calcium hydroxide and barium hydroxide, and organic alkalis such as trialkylamine, diazabicycloundecene, and metal alkoxides. Acidic pH adjusting substances include inorganic acids such as formic acid, nitric acid, sulfuric acid, hydrochloric acid and phosphoric acid, organic acids such as acetic acid, trifluoroacetic acid, oxalic acid, methanesulfonic acid and trifluoromethanesulfonic acid. These may be added in a solid state or may be added as an aqueous solution or an organic solvent solution.

The solvent used in the pigment solution as a second fluid may be the same solvent as one in the first fluid. However, a solvent having higher solubility for the pigment than that of the solvent contained in the first fluid is preferably selected. The same pH adjusting substance as one in the first fluid may be added to the solvent. The pH adjusting substance is preferably selected so that the second fluid shows higher solubility for the pigment than that of the solvent contained in the first fluid.

The solvent contained in the first and second fluids, and the mixed solution of the pH adjusting substance (pH adjusting solution), can be used in a solution state in which all substances are completely dissolved and in a suspended state.

For the purpose of control of the crystal form of the pigment and the quality control of the pigment, an organic solvent may be mixed in the first or second fluid. The organic solvent may be known one. Besides the organic solvent, a dispersant such as a high-molecular polymer or a block copolymer and a surfactant may be contained.

The pigment used in each of the methods described above includes, but is not limited to, known organic pigments such as polycyclic quinone pigments, perylene pigments, azoic pigments, indigo pigments, quinacridone pigments and phthalocyanine pigments.

The pigment includes pigments in the form of granular solids, dye compounds, and the like. Examples of the pigment include inorganic achromatic pigments, and organic and inorganic chromatic pigments. Colorless or light-colored pigments, metal-lustered pigments and the like may also be used. Newly synthesized pigments may also be used in the present invention. Specific examples of the pigments are shown below.

Examples of the black pigment include Raven 1060, Raven 1080, Raven 1170, Raven 1200, Raven 1250, Raven 1255, Raven 1500, Raven 2000, Raven 3500, Raven 5250, Raven 5750, Raven 7000, Raven 5000 ULTRA II, and Raven 1190 ULTRA II (manufactured by Colombian Chemicals Company). Other examples include Black Pearls L, Mogul-L, Regal 400R, Regal 660R, Regal 330R, Monarch 800, Monarch 880, Monarch 900, Monarch 1000, Monarch 1300, and Monarch 1400 (manufactured by Cabot Corporation). Further examples include Color Black FW1, Color Black FW2, Color Black FW200, Color Black 18, Color Black S160, Color Black S170, Special Black 4, Special Black 4A, Special Black 6, Printex 35, Printex U, Printex 140U, Printex V, and Printex 140V (manufactured by DeGussa Corporation). Still other examples include No. 25, No. 33, No. 40, No. 47, No. 52, No. 900, No. 2300, MCF-88, MA600, MA7, MA8, and MA100 (manufactured by Mitsubishi Chemical Corporation). However, the black pigment is not limited thereto.

Cyan pigments include C.I. Pigment Blue-1, C.I. Pigment Blue-2, and C.I. Pigment Blue-3. Other examples include C.I. Pigment Blue-15, C.I. Pigment Blue-15:2, C.I. Pigment Blue-15:3, and C.I. Pigment Blue-15:4. Still other examples include C.I. Pigment Blue-16, C.I. Pigment Blue-22, C.I. Pigment Blue-60, and the like.

Magenta pigments include C.I. Pigment Red-5, C.I. Pigment Red-7, and C.I. Pigment Red-12. Other examples include C.I. Pigment Red-48, C.I. Pigment Red-48:1, C.I. Pigment Red-57, and C.I. Pigment Red-112. Still other examples include C.I. Pigment Red-122, C.I. Pigment Red-123, C.I. Pigment Red-146, and C.I. Pigment Red-168. Further examples include C.I. Pigment Red-184, C.I. Pigment Red-202, C.I. Pigment Red-207, and the like.

Yellow pigments include C.I. Pigment Yellow-12, C.I. Pigment Yellow-13, C.I. Pigment Yellow-14, and C.I. Pigment Yellow-16. Other examples include C.I. Pigment Yellow-17, C.I. Pigment Yellow-74, C.I. Pigment Yellow-83, and C.I. Pigment Yellow-93. Still other examples include C.I. Pigment Yellow-95, C.I. Pigment Yellow-97, C.I. Pigment Yellow-98, and C.I. Pigment Yellow-114. Further examples include C.I. Pigment Yellow-128, C.I. Pigment Yellow-129, C.I. Pigment Yellow-151, C.I. Pigment Yellow-154, and the like.

Depending on the objective color, various pigments can be used in addition to the black, cyan, magenta and yellow pigments described above. Typical examples include violet pigments such as Pigment Violet-23, green pigments such as Pigment Green-7, and orange pigments such as Pigment Orange-43, and those that express colors as pigments can be used.

In the present invention, dyes can be used similarly to the pigments. Examples of such dyes include C.I. Solvent Blue, -33, -38, -42, -45, -53, -65, -67, -70, -104, -114, -115, and -135. Other examples include C.I. Solvent Red, -25, -31, -86, -92, -97, -118, -132, -160, -186, -187, and -219. Still other examples include C.I. Solvent Yellow, -1, -49, -62, -74, -79, -82, -83, -89, -90, -120, -121, -151, -153, -154, and the like.

Water-soluble dyes can also be used. Examples include direct dyes such as C.I. Direct Black, -17, -19, -22, -32, -38, -51, -62, -71, -108, -146, -154; C.I. Direct Yellow, -12, -24, -26, -44, -86, -87, -98, -100, -130, -142; C.I. Direct Red, -1, -4, -13, -17, -23, -28, -31, -62, -79, -81, -83, -89, -227, -240, -242, -243; C.I. Direct Blue, -6, -22, -25, -71, -78, -86, -90, -106, -199; C.I. Direct Orange, -34, -39, -44, -46, -60; C.I. Direct Violet, -47, -48; C.I. Direct Brown, -109; C.I. Direct Green, -59, and the like; acid dyes such as C.I. Acid Black, -2, -7, -24, -26, -31, -52, -63, -112, -118, -168, -172, -208; C.I. Acid Yellow, -11, -17, -23, -25, -29, -42, -49, -61, -71; C.I. Acid Red, -1, -6, -8, -32, -37, -51, -52, -80, -85, -87, -92, -94, -115, -180, -254, -256, -289, -315, -317; C.I. Acid Blue, -9, -22, -40, -59, -93, -102, -104, -113, -117, -120, -167, -229, -234, -254; C.I. Acid Orange, -7, -19; C.I. Acid Violet, -49, and the like; reactive dyes such as C.I. Reactive Black, -1, -5, -8, -13, -14, -23, -31, -34, -39; C.I. Reactive Yellow, -2, -3, -13, -15, -17, -18, -23, -24, -37, -42, -57, -58, -64, -75, -76, -77, -79, -81, -84, -85, -87, -88, -91, -92, -93, -95, -102, -111, -115, -116, -130, -131, -132, -133, -135, -137, -139, -140, -142, -143, -144, -145, -146, -147, -148, -151, -162, -163; C.I. Reactive Red, -3, -13, -16, -21, -22, -23, -24, -29, -31, -33, -35, -45, -49, -55, -63, -85, -106, -109, -111, -112, -113, -114, -118, -126, -128, -130, -131, -141, -151, -170, -171, -174, -176, -177, -183, -184, -186, -187, -188, -190, -193, -194, -195, -196, -200, -201, -202, -204, -206, -218, -221; C.I. Reactive Blue, -2, -3, -5, -8, -10, -13, -14, -15, -18, -19, -21, -25, -27, -28, -38, -39, -40, -41, -49, -52, -63, -71, -72, -74, -75, -77, -78, -79, -89, -100, -101, -104, -105, -119, -122, -147, -158, -160, -162, -166, -169, -170, -171, -172, -173, -174, -176, -179, -184, -190, -191, -194, -195, -198, -204, -211, -216, -217; C.I. Reactive Orange, -5, -7, -11, -12, -13, -15, -16, -35, -45, -46, -56, -62, -70, -72, -74, -82, -84, -87, -91, -92, -93, -95, -97, -99; C.I. Reactive Violet, -1, -4, -5, -6, -22, -24, -33, -36, -38; C.I. Reactive Green, -5, -8, -12, -15, -19, -23; C.I. Reactive Brown, -2, -7, -8, -9, -11, -16, -17, -18, -21, -24, -26, -31, -32, -33, and the like; C.I. Basic Black, -2; C.I. Basic Red, -1, -2, -9, -12, -13, -14, -27; C.I. Basic Blue, -1, -3, -5, -7, -9, -24, -25, -26, -28, -29; C.I. Basic Violet, -7, -14, -27; C.I. Food Black, -1, -2, and the like.

The dyes that can be used may be known or novel ones. For example, direct dyes, acid dyes, basic dyes, reactive dyes, water-soluble dyes of food colorant, fat-soluble (oil-soluble) dyes, or insoluble colorants of disperse dyes as described later can be used. These may be used in a solidified state. In this respect, oil-soluble dyes, for example, can be preferably used.

The oil-soluble dyes used herein refer to those dyes dissolved in an organic solvent and are also called fat-soluble dyes.

As surfactants and dispersants, various commercial products for use in dispersing pigments can be used. The surfactants and dispersants include, but are not limited to, those based on dodecylbenzenesulfonic acid such as Neogen R-K (Dai-ichi Kogyo Seiyaku Co., Ltd.), Solsperse 20000, Solsperse 24000, Solsperse 26000, Solsperse 27000, Solsperse 28000, and Solsperse 41090 (manufactured by Avecia Corporation), Disperbyk-160, Disperbyk-161, Disperbyk-162, Disperbyk-163, Disperbyk-166, Disperbyk-170, Disperbyk-180, Disperbyk-181, Disperbyk-182, Disperbyk-183, Disperbyk-184, Disperbyk-190, Disperbyk-191, Disperbyk-192, Disperbyk-2000, and Disperbyk-2001 (manufactured by BYK-Chemie), Polymer 100, Polymer 120, Polymer 150, Polymer 400, Polymer 401, Polymer 402, Polymer 403, Polymer 450, Polymer 451, Polymer 452, Polymer 453, EFKA-46, EFKA-47, EFKA-48, EFKA-49, EFKA-1501, EFKA-1502, EFKA-4540, and EFKA-4550 (manufactured by EFKA Chemical Corp.), Flowlen DOPA-158, Flowlen DOPA-22, Flowlen DOPA-17, Flowlen G-700, Flowlen TG-720W, Flowlen-730W, Flowlen-740W, and Flowlen 745W (manufactured by Kyoeisha Chemical Co., Ltd.), Ajisper PA-111, Ajisper PB-711, Ajisper PB-811, Ajisper PB-821, and Ajisper PW-911 (manufactured by Ajinomoto Co. Inc.), and Johncryl 678, Johncryl 679, and Johncryl 62 (manufactured by Johnson Polymer B.V.). These products may be used alone or in combination of two or more thereof.

In the present invention, specific examples of the block copolymer include acrylic or methacrylic block copolymers, block copolymers of polystyrene and other addition polymerization or condensation polymerization, and block copolymers having blocks such as polyoxyethylene and polyoxyalkylene. Conventionally known block copolymers can also be used. The block copolymers used in the present invention are preferably amphiphilic. Specific preferable forms include diblock copolymers having a hydrophobic segment and a hydrophilic segment having an organic acid or ionic base unit. Triblock copolymers having a hydrophobic segment, a hydrophilic segment having an organic acid or its ionic base unit, and another segment are preferably used. Triblock copolymers are used preferably in the form having a hydrophobic segment, a nonionic hydrophilic segment, and a hydrophilic segment having an organic acid or its ionic base unit, which are also preferably used for stabilization of their inclusion state. For example, when the triblock copolymer described above is used to prepare a dispersion using a pigment material and water as a solvent, the pigment can be included in micelles formed by the triblock copolymer, and a pigment-included ink composition can also be formed in this manner. Further, the particle size of particles in the dispersion composition can be very even and uniform. The dispersion composition including its dispersed state can be made highly stable. When these processes are conducted by the forced ultrathin film rotary reaction method, the particle size of particles in the pigment material dispersion is made highly even to further improve uniformity.

Besides the respective methods described above, a method for producing pigment nanoparticles by the forced ultrathin film rotary reaction method can be used to synthesize a pigment directly in the forced thin film. For example, in the case of an example of synthesis of a copper phthalocyanine pigment, the pigment can be directly synthesized by various reactions, represented by a method of obtaining a copper phthalocyanine pigment by reacting phthalic anhydride or its derivatives, copper or its compound, urea or its derivative, and a catalyst in or without an organic solvent. A step of pulverizing coarse pigment particles formed by a synthesis process is necessary in the previous methods but can be eliminated by the above method, and even if the pulverizing step is necessary, the pulverizing step can be achieved by giving shearing to the thin film, depending on operational conditions.

In the present invention, the mixing of fluids in the mixed flow path can be performed under the control of a laminar flow or under the control of a turbulent flow.

Further, the space between the processing surfaces may be heated or cooled, or may be irradiated with microwaves. The space between the processing surfaces may also be irradiated with ultraviolet rays (UV) or may be supplied with ultrasonic energy. Particularly, when a temperature difference is set between the first processing surface 1 and the second processing surface 2, there is an advantage that the reaction can be promoted, since convection can be generated in a thin film fluid.

Specifically for heating or cooling, at least one of or both the processing member 10 and the processing member 20 can be provided, for example, with a heater or a jacket for passing a heat medium or a cooling medium, to heat or cool the thin film fluid. Alternatively, at least one of or both the processing member 10 and the processing member 20 can be provided with a microwave generator such as a magnetron for irradiation with microwave, thereby heating the processed fluid to promote the reaction. For irradiation with ultraviolet rays (UV), at least one of or both the processing member 10 and the processing member 20 may be provided, for example, with an element such as a UV lamp to irradiate the thin film fluid with ultraviolet rays (UV) from the corresponding processing surface. For supplying with ultrasonic energy, at least one of or both the processing member 10 and the processing member 20 can be provided, for example, with an ultrasonic wave oscillator. Alternatively, the mixing and reaction of fluids between the processing surfaces may be conducted in an ultrasonic wave atmosphere in a container.

The separation is conducted in a container capable of securing a depressurized or vacuum state, and at least a secondary side at which the fluid after processing is discharged can be depressurized or made vacuous to remove a gas generated during the separating reaction, to remove a gas contained in the fluid, or to remove the solvent of the fluid. Even when the separation of pigment nanoparticles and removal of the solvent are simultaneously conducted, the fluid containing pigment nanoparticles separated between the processing surfaces can thereby be discharged in an atomized state from the processing surfaces, so that the surface area of the fluid is increased and the efficiency of removal of the solvent is very high. Accordingly, processing of preparing pigment nanoparticles and removal of the solvent can be effected in substantially one step more easily than before.

As described above, the processing apparatus can be provided with a third introduction part d3 in addition to the first introduction part d1 and the second introduction part d2. In this case, for example, in the acid pasting method described above, water or an alkaline solution, a fluid containing an acid in which a pigment was dissolved, and an organic solvent for regulation of the crystal form of the pigment and for quality control of the pigment can be introduced separately through the respective introduction parts into the processing apparatus. For pH adjustment, a pigment-separating solution for changing pH, a fluid containing a pigment solution, and an organic solvent for regulation of the crystal form of the pigment and for quality control of the pigment can be introduced separately through the respective introduction parts into the processing apparatus. By doing so, the concentration and pressure of each solution can be controlled separately, and the reaction of forming pigment nanoparticles can be regulated more accurately. When the processing apparatus is provided with four or more introduction parts, the foregoing applies and fluids to be introduced into the processing apparatus can be subdivided in this manner.

The forced ultrathin film rotary reaction method in the present invention can freely change the Reynolds number of its minute flow path and can thus form pigment nanoparticles which are monodisperse and excellent in re-dispersibility, having an objective particle size, particle shape and crystal form. By their self-dischargeability, there is no clogging with products even in a reaction accompanied by separation, and a large pressure is not necessary. Accordingly, the method in the present invention is superior in safety, hardly mixed in with impurities, excellent in washing performance, thus can stably produce pigment nanoparticles. In addition, the method can be scaled up depending on the intended amount of production, thus can provide a highly productive method for producing pigment nanoparticles.

EXAMPLES

Hereinafter, the present invention will be described in more detail with reference to the examples, but the invention is not limited to these examples.

In the following examples, the term "from the center" means "through the first introduction part d1" in the processing apparatus shown in FIG. 1(A), the first fluid refers to the first processed fluid, and the second fluid refers to the second processed fluid introduced "through the second introduction part d2" in the processing apparatus shown in FIG. 1(A).

A paste solution having copper phthalocyanine dissolved in conc. sulfuric acid and an aqueous solution containing a dispersant are allowed to join together in a thin film formed between the processing surfaces 1 and 2 arranged to be opposite to each other so as to be able to approach to and separate from each other, at least one of which rotates relative to the other, in the uniformly mixing and stirring reaction apparatus enabling the forced ultrathin film rotary reaction method as shown in FIG. 1(A), thereby separating pigment nanoparticles under uniform mixing in the thin film.

Example 1

While an aqueous solution of Disperbyk-184 (manufactured by BYK-Chemie) was sent as a first fluid from the center at a supply pressure/back pressure of 0.02 MPa/0.01 MPa, at a revolution number of 1000 rpm and at a solution sending temperature of 20° C., an aqueous solution of 3% copper phthalocyanine pigment/98% conc. sulfuric acid was introduced at a rate of 10 ml/min. as a second fluid into the space between the processing surfaces 1 and 2. A pigment nanoparticle dispersion was discharged from the processing surfaces. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the volume-average particle size was 14 nm and the CV value of its particle size distribution was 13%. The pigment nanoparticle dispersion was dialyzed with a dialysis tube against pure water for 24 hours and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the volume-average particle size was 14 nm, which was the same as that of the pigment nanoparticle dispersion just after being obtained by the forced ultrathin film rotary processing reaction method.

Example 2

While an aqueous solution of Disperbyk-184 (manufactured by BYK-Chemie) was sent as a first fluid front, the center at a supply pressure/back pressure of 0.02 MPa/0.01 MPa, at a revolution number of 1000 rpm and at a solution sending temperature of 20° C., an aqueous solution of 3% quinacridone pigment/98% conc. sulfuric acid was introduced at a rate of 10 ml/min. as a second fluid into the space between the processing surfaces 1 and 2. A pigment nanoparticle dispersion was discharged from the processing surfaces. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the volume-average particle size was 15 nm and the CV value of its particle size distribution was 14%. The pigment nanoparticle dispersion was dialyzed with a dialysis tube against pure water for 24 hours and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the volume-average particle size was 15 nm, which was the same as that of the pigment nanoparticle dispersion just after being obtained by the forced ultrathin film rotary processing reaction method.

Comparative Example 1

While 20 g of an aqueous solution of Disperbyk-184 (manufactured by BYK-Chemie) was stirred at a solution temperature of 20° C. at 300 rpm in a beaker, 20 g of aqueous solution of 3% copper phthalocyanine pigment/98% conc. sulfuric acid was introduced. An aqueous copper phthalocyanine pigment dispersion was obtained. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the volume-average particle size was 1345 nm. The pigment nanoparticle dispersion was dialyzed with a dialysis tube against pure water for 24 hours and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the volume-average particle size was 2882 nm, which was larger than that of the pigment nanoparticle dispersion obtained by the forced ultrathin film rotary processing reaction method.

Comparative Example 2

While 20 g of an aqueous solution of Disperbyk-184 (manufactured by BYK-Chemie) was stirred at a solution temperature of 20° C. at 300 rpm in a beaker, 20 g of an aqueous solution of 3% quinacridone pigment/98% conc. sulfuric acid was introduced. An aqueous quinacridone pigment dispersion was obtained. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the volume-average particle size was 1833 nm. The pigment nanoparticle dispersion was dialyzed with a dialysis tube against pure water for 24 hours and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the volume-average particle size was 3345 nm, which was larger than that of the pigment nanoparticle dispersion obtained by the forced ultrathin film rotary processing reaction method.

Example 3

While ion-exchange water was sent as a first fluid from the center at a supply pressure/back pressure of 0.01 MPa/0.01 MPa, at a revolution number of 1000 rpm and at a solution sending temperature of 25° C., a solution of 0.5% unsubstituted linear quinacridone pigment/1-methyl-2-pyrrolidone (NMP) was introduced at a rate of 10 ml/min. as a second fluid into the space between the processing surfaces 1 and 2. A pigment nanoparticle dispersion was discharged from the processing surfaces. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the volume-average particle size was 18 nm and the CV value of its particle size distribution was 17%. The pigment nanoparticle dispersion was dialyzed with a dialysis tube against pure water for 24 hours and then dried to give pigment nanoparticle powders. As a result of powder X-ray diffraction, it was considered that the resulting quinacridone pigment was γ-type. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the volume-average particle size was 18 nm, which was the same as that of the pigment nanoparticle dispersion just after being obtained by the forced ultrathin film rotary processing reaction method.

Example 4

While methanol was sent as a first fluid from the center at a supply pressure/back pressure of 0.01 MPa/0.01 MPa, at a revolution number of 1000 rpm and at a solution sending temperature of 25° C., a solution of 0.5% unsubstituted linear quinacridone pigment/1-methyl-2-pyrrolidone (NMP) was introduced at a rate of 10 ml/min. as a second fluid into the space between the processing surfaces 1 and 2. A pigment nanoparticle dispersion was discharged from the processing surfaces. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the volume-average particle size was 20 nm and the CV value of its particle size distribution was 17%. The pigment nanoparticle dispersion was dialyzed with a dialysis tube against pure water for 24 hours and then dried to give pigment nanoparticle powders. As a result of powder X-ray diffraction, it was considered that the resulting quinacridone pigment was α-type. When the powders were introduced again into ion-exchange water and then stirred with a high-speed stirring dispersing machine (trade name: CLEARMIX, manufactured by N Technique Co., Ltd.), a pigment nanoparticle dispersion was obtained again, and the volume-average particle size was 20 nm, which was the same as that of the pigment nanoparticle dispersion just after being obtained by the forced ultrathin film rotary processing reaction method.

Comparative Example 3

While 20 g of ion-exchange water was stirred at a solution temperature of 25° C. at 300 rpm in a beaker, 20 g of a solution of 0.5% unsubstituted linear quinacridone pigment/1-methyl-2-pyrrolidone (NMP) was introduced. An aqueous quinacridone pigment dispersion was obtained. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the volume-average particle size was 2243 nm. The pigment nanoparticle dispersion was dialyzed with a dialysis tube against pure water for 24 hours and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the volume-average particle size was 2882 nm, which was larger than that of the pigment nanoparticle dispersion obtained by the forced ultrathin film rotary processing reaction method.

Comparative Example 4

While 20 g of methanol was stirred at a solution temperature of 25° C. at 300 rpm in a beaker, 20 g of a solution of 0.5% unsubstituted linear quinacridone pigment/1-methyl-2-pyrrolidone (NMP) was introduced. An aqueous quinacridone pigment dispersion was obtained. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the volume-average particle size was 3321 nm. The pigment nanoparticle dispersion was dialyzed with a dialysis tube against pure water for 24 hours and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the volume-average particle size was 4211 nm, which was larger than that of the pigment nanoparticle dispersion obtained by the forced ultrathin film rotary processing reaction method.

The results are shown in Table 1.

TABLE 1

| Examples | First Fluid | Second Fluid | Number of Revolutions [rpm] | Supply Pressure [MPaG] | Back Pressure [MPaG] | Temperature [° C.] | Average Particle Size [nm] | CV Value [%] | Re-dispersibility [%] | Crystal Form |
|---|---|---|---|---|---|---|---|---|---|---|
| Example 1 | Disperbyk-184 aqueous solution | 3% copper phthalocyanine/ 98% conc. sulfuric acid aqueous solution | 1000 | 0.02 | 0.01 | 20 | 14 | 13 | ⊙ | — |
| Example 2 | | 3% quinacridone/98% conc. sulfuric acid aqueous solution | 1000 | 0.02 | 0.01 | 20 | 15 | 14 | ⊙ | — |
| Comparative Example 1 | | 3% copper phthalocyanine/ 98% conc. sulfuric acid aqueous solution | Beaker test | | | 20 | 1345 | — | x | — |
| Comparative Example 2 | | 3% quinacridone/98% conc. sulfuric acid aqueous solution | | | | 20 | 1833 | — | x | — |
| Example 3 | Ion-exchange water | 0.5% quinacridone/NMP | 1000 | 0.01 | 0.01 | 25 | 18 | 17 | ⊙ | γ |
| Example 4 | Methanol | 0.5% quinacridone/NMP | 1000 | 0.01 | 0.01 | 25 | 20 | 17 | ⊙ | α |
| Comparative Example 3 | Ion-exchange water | 0.5% quinacridone/NMP | Beaker test | | | 25 | 2243 | — | x | — |
| Comparative Example 4 | Methanol | 0.5% quinacridone/NMP | | | | 25 | 3321 | — | x | — |

The pigment nanoparticles obtained in Example 1 were used to prepare an inkjet ink with the following composition.
Pigment obtained in Example 1: 5%
Low-molecular dispersant (Disperse Ayd W-28 manufactured by San Nopco Limited): 1%
0.75% antifoaming agent (Aqualen 1435 manufactured by Kyoeisha Chemical Co., Ltd.): 0.75%
Ion-exchange water: 89.25%
Polymer dispersant (Disperbyk-184 manufactured by BYK-Chemie): 4%

When the storage stability of the ink was evaluated by accelerating sedimentation of the pigment by centrifugal sedimentation, the pigment was hardly sedimented even after two years. With respect to head clogging, a certain amount of letters were printed, and then the ink was left for 30 minutes without capping, and when printing was initiated again, letters can be normally printed from the start. When bleeding and blurring of letters were visually evaluated for printing qualities, printing was clear without defects. With respect to weatherability, a weather meter test under conditions corresponding to sunlight irradiation for one year was conducted. As a result, the color change after the test was within 5%.

As is evident from the foregoing, the ink of the present invention is excellent in storage stability and does not cause head clogging, because its pigment is dispersed in the form of very microscopic particles, and is excellent in weatherability as an inkjet ink.

A solution containing Pigment Red 254 (structural name: diketopyrrolopyrrole, referred to hereinafter as PR-254) and an aqueous solution of a surfactant were joined together in a thin film fluid formed between the processing surfaces 1 and 2 arranged to be opposite to each other so as to be able to approach to and separate from each other, at least one of which rotates relative to the other, in the uniformly mixing and stirring reaction apparatus shown in FIG. 1(A), thereby uniformly mixing them in the thin film to separate pigment nanoparticles.

Example 5

While an aqueous solution of dodecyl sodium sulfate was sent as a first fluid from the center at a supply pressure/back pressure of 0.02 MPa/0.01 MPa, at a revolution number of 1000 rpm and at a solution sending temperature of 20° C., a mixed suspended solution of 1.71 w/w % PR-254/82.32 w/w % dimethylsulfoxide (DMSO)/15.97 w/w % 8 N aqueous potassium hydroxide solution was introduced at a rate of. 1 ml/min. as a second fluid into the space between the processing surfaces 1 and 2. The pH of a pigment nanoparticle dispersion discharged from the processing surfaces was 11.6. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the average particle size was 13 nm. The pigment nanoparticle dispersion was dialyzed with a dialysis tube against pure water for 24 hours to remove dodecyl sodium sulfate, DMSO and the like and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the average particle size was 13 nm, which was the same as that of the pigment nanoparticle dispersion just after being discharged from the processing surfaces.

Example 6

While an aqueous solution of dodecyl sodium sulfate was sent as a first fluid from the center at a supply pressure/back pressure of 0.02 MPa/0.01 MPa, at a revolution number of 500 rpm and at a solution sending temperature of 20° C., a mixed solution of 1.71 w/w % PR-254/96.70 w/w % dimethylsulfoxide (DMSO)/1.59 w/w % 8 N aqueous potassium hydroxide solution was introduced at a rate of 1 ml/min. as a second fluid into the space between the processing surfaces 1 and 2. The pH of a pigment nanoparticle dispersion discharged from the processing surfaces was 11.1. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the average particle size was 12 nm. The pigment nanoparticle dispersion was dialyzed with a dialysis tube against pure water for 24 hours to remove dodecyl sodium sulfate, DMSO and the like and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the average particle size was 12 nm, which was the same as that of the pigment nanoparticle dispersion just after being discharged from the processing surfaces.

Example 7

While a solution of propylene glycol monomethyl ether acetate (PGMEA) with Disperbyk-190 (manufactured by BYK-Chemie) in propylene glycol monomethyl ether acetate (PGMEA) was sent as a first fluid from the center at a supply pressure/back pressure of 0.05 MPa/0.01 MPa, at a revolution number of 1000 rpm and at a solution sending temperature of 20° C., a mixed solution of 2.55 w/w % PR-254/76.55 w/w % tetrahydrofuran (THF)/0.77 w/w % sodium ethoxide/20.13 w/w % ethanol was introduced at a rate of 1 ml/min. as a second fluid into the space between the processing surfaces 1 and 2. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the average particle size was 17 nm. After sodium ethoxide, THF and the like were removed from the pigment nanoparticle dispersion, the dispersion was dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the average particle size was 17 nm, which was the same as that of the pigment nanoparticle dispersion just after being discharged from the processing surfaces.

Comparative Example 5

While 100 g of an aqueous solution of dodecyl sodium sulfate was stirred at a solution temperature of 20° C. at 300 rpm in a beaker, 20 g of a mixed suspended solution of 1.71 w/w % PR-254/82.32 w/w % dimethylsulfoxide (DMSO)/ 15.97 w/w % 8 N aqueous potassium hydroxide solution was introduced. A pigment nanoparticle dispersion was obtained. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the average particle size was 542 nm. The pigment nanoparticle dispersion was dialyzed with a dialysis tube against pure water for 24 hours to remove dodecyl sodium sulfate, DMSO and the like and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the average particle size was 995 nm, which was larger than that of the pigment nanoparticle dispersion just after being obtained in the beaker.

Comparative Example 6

While 100 g of an aqueous solution of dodecyl sodium sulfate was stirred at a solution temperature of 20° C. at 300 rpm in a beaker, 20 g of a mixed solution of 1.71 w/w % PR-254/96.70 w/w % dimethylsulfoxide (DMSO)/1.59 w/w % 8 N aqueous potassium hydroxide solution was introduced.

A pigment nanoparticle dispersion was obtained. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the average particle size was 489 nm. The pigment nanoparticle dispersion was dialyzed with a dialysis tube against pure water for 24 hours to remove dodecyl sodium sulfate, DMSO and the like and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the average particle size was 985 nm, which was larger than that of the pigment nanoparticle dispersion just after being obtained in the beaker.

Comparative Example 7

While 100 g of a solution of propylene glycol monomethyl ether acetate (PGMEA) with Disperbyk-190 (manufactured by BYK-Chemie) was stirred at a solution temperature of 20° C. at 300 rpm in a beaker, 20 g of a mixed solution of 2.55 w/w % PR-254/76.55 w/w % tetrahydrofuran (THF)/0.77 w/w % sodium ethoxide/20.13 w/w % ethanol was introduced. A pigment nanoparticle dispersion was obtained. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the average particle size was 791 nm. After the PGMEA, THF and the like were removed from the pigment nanoparticle dispersion, the dispersion was dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the average particle size was 1185 nm, which was larger than that of the pigment nanoparticle dispersion just after being obtained in the beaker.

From the forgoing, it was revealed that pigment nanoparticles formed in a thin film fluid formed between the processing surfaces arranged to be opposite to each other so as to be able to approach to and separate from each other, at least one of which rotates relative to the other, in use of a uniformly stirring and mixing reaction apparatus, are excellent in re-dispersibility even though they are microparticles of nano size.

Example 8

A solution containing Pigment Red 177 (structural name: anthraquinone, referred to hereinafter as PR-177) used in color filter or the like and an aqueous solution of a surfactant were allowed to join together in a thin film fluid formed between the processing surfaces 1 and 2 arranged to be opposite to each other so as to be able to approach to and separate from each other, at least one of which rotates relative to the other, in use of a uniformly stirring and mixing reaction apparatus shown in FIG. 1(A), thereby uniformly mixing them in the thin film to separate pigment nanoparticles.

While an aqueous solution of Aqualon KH-10 (manufactured by Dai-ichi Kogyo Seiyaku Co., Ltd.) was sent as a first fluid from the center at a supply pressure/back pressure of 0.02 MPa/0.01 MPa, at a revolution number of 100 rpm and at a solution sending temperature of 20° C., 3.0 w/w % PR-177/97.0 w/w % conc. sulfuric acid solution was introduced at a rate of 1 ml/min. as a second fluid into the space between the processing surfaces 1 and 2. A pigment nanoparticle dispersion was discharged from the processing surfaces. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the average particle size was 17 nm. The pigment nanoparticle dispersion was dialyzed with a dialysis tube for 24 hours to remove Aqualon KH-10, sulfuric acid and the like and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the average particle size was 17 nm, which was the same as that of the pigment nanoparticle dispersion just after being discharged from the processing surfaces.

Figure 31:
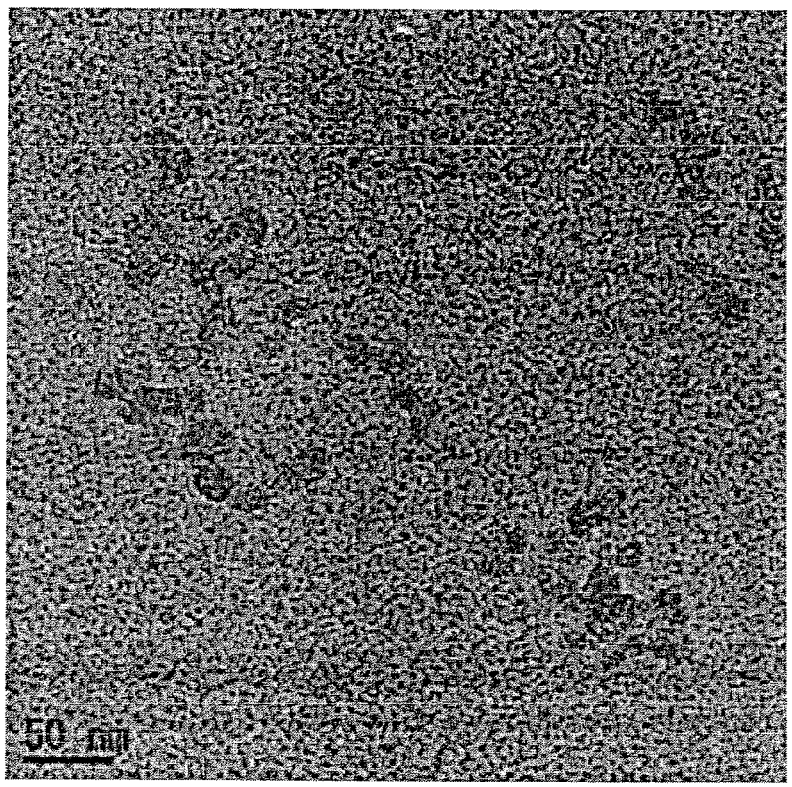
[FIG. 31]

A TEM photograph of the obtained pigment nanoparticles is shown in FIG. 31.

Example 9

Then, a solution containing Pigment Green 7 (referred to hereinafter as PG-7) used in color filter or the like, and an aqueous surfactant solution, were allowed to join together in a thin film and mixed uniformly in the thin film to separate pigment nanoparticles.

While an aqueous solution of Aqualon KH-10 (manufactured by Dai-ichi Kogyo Seiyaku Co., Ltd.) was sent as a first fluid from the center at a supply pressure/back pressure of 0.02 MPa/0.01 MPa, at a revolution number of 500 rpm and at a solution sending temperature of 20° C., 0.2 w/w % PG-7/99.8 w/w % conc. sulfuric acid solution was introduced at a rate of 5 ml/min. as a second fluid into the space between the processing surfaces 1 and 2. A pigment nanoparticle dispersion was discharged from the processing surfaces. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the average particle size was 12 nm. The pigment nanoparticle dispersion was dialyzed with a dialysis tube for 24 hours to remove Aqualon KH-10, sulfuric acid and the like and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the average particle size was 12 nm, which was the same as that of the pigment nanoparticle dispersion just after being discharged from the processing surfaces.

Example 10

Then, a solution containing Pigment Yellow 128 (referred to hereinafter as PY-128) used in inkjet ink or the like, and an aqueous surfactant solution, were allowed to join together in a thin film and mixed uniformly in the thin film to separate pigment nanoparticles.

Figure 32:
[FIG. 32]

While an aqueous solution of dodecyl sodium sulfate was sent as a first fluid from the center at a supply pressure/back pressure of 0.05 MPa/0.01 MPa, at a revolution number of 1000 rpm and at a solution sending temperature of 20° C., a mixed solution of 1.22 w/w % PY-128/5.8 w/w % 8 N KOH aqueous solution/87.8 w/w % dimethylsulfoxide (DMSO)/ 5.1 w/w % ion-exchange water was introduced at a rate of 1 ml/min. as a second fluid into the space between the processing surfaces 1 and 2. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the average particle size was 13 nm. The pigment nanoparticle dispersion was dialyzed with a dialysis tube for 24 hours to remove the KOH, DMSO and the like and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the average particle size was 13 nm, which was the same as that of the pigment nanoparticle dispersion just after being discharged from the processing surfaces. A TEM photograph of the obtained pigment nanoparticles is shown in FIG. 32.

Example 11

Then, a solution containing Pigment Red 170 (referred to hereinafter as PR-170) used in inkjet ink or the like, and an aqueous surfactant solution, were allowed to join together in a thin film and mixed uniformly in the thin film to separate pigment nanoparticles.

While an aqueous solution of dodecyl sodium sulfate was sent as a first fluid from the center at a supply pressure/back pressure of 0.05 MPa/0.01 MPa, at a revolution number of 1000 rpm and at a solution sending temperature of 20° C., a mixed solution of 1.59 w/w % PR-170/1.70 w/w % 8 N KOH aqueous solution/75.7 w/w % dimethylsulfoxide (DMSO)/ 21.6 w/w % ion-exchange water was introduced at a rate of 1 ml/min. as a second fluid into the space between the processing surfaces 1 and 2. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the average particle size was 14 nm. The pigment nanoparticle dispersion was dialyzed with a dialysis tube for 24 hours to remove the KOH, DMSO and the like and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the average particle size was 14 nm, which was the same as that of the pigment nanoparticle dispersion just after being discharged from the processing surfaces.

Comparative Example 8

While 100 g of an aqueous solution of Aqualon KH-10 (manufactured by Dai-ichi Kogyo Seiyaku Co., Ltd.) was stirred at a solution temperature of 20° C. at 300 rpm in a beaker, 20 g of 3.0 w/w % PR-177/97.0 w/w % conc. sulfuric acid solution was introduced. A pigment nanoparticle dispersion was obtained. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the average particle size was 442 nm. The pigment nanoparticle dispersion was dialyzed with a dialysis tube for 24 hours to remove Aqualon KH-10, sulfuric acid and the like and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the average particle size was 992 nm, which was larger than that of the pigment nanoparticle dispersion obtained in the beaker.

Comparative Example 9

While 100 g of an aqueous solution of Aqualon KH-10 (manufactured by Dai-ichi Kogyo Seiyaku Co., Ltd.) was stirred at a solution temperature of 20° C. at 300 rpm in a beaker, 20 g of 0.2 w/w % PG-7/99.8 w/w % conc. sulfuric acid solution was introduced. A pigment nanoparticle dispersion was obtained. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the average particle size was 551 nm. The pigment nanoparticle dispersion was dialyzed with a dialysis tube for 24 hours to remove Aqualon KH-10, sulfuric acid and the like and then dried to give pigment nanoparticle powders. When the powders were introduced again into ion-exchange water and then stirred with a high-speed stirring dispersing machine (trade name: CLEARMIX, manufactured by M Technique Co. Ltd.), a pigment nanoparticle dispersion was obtained again, and the average particle size was 972 nm, which was larger than that of the pigment nanoparticle dispersion obtained in the beaker.

Comparative Example 10

While 100 g of an aqueous solution of dodecyl sodium sulfate was stirred at a solution temperature of 20° C. at 300 rpm in a beaker, 20 g of a mixed solution of 1.22 w/w % PY-128/5.8 w/w % 8 N KOH aqueous solution/87.8 w/w % dimethylsulfoxide (DMSO)/5.1 w/w % ion-exchange water was introduced. A pigment nanoparticle dispersion was obtained. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the average particle size was 641 nm. The pigment nanoparticle dispersion was dialyzed with a dialysis tube for 24 hours to remove dodecyl sodium sulfate, DMSO and the like and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the average particle size was 1122 nm, which was larger than that of the pigment nanoparticle dispersion obtained in the beaker.

Comparative Example 11

While 100 g of an aqueous solution of dodecyl sodium sulfate was stirred at a solution temperature of 20° C. at 300 rpm in a beaker, 20 g of a mixed solution (pH>16) of 1.59 w/w % PR 170 w/w % 8 N KOH aqueous solution/75.7 w/w % dimethylsulfoxide (DMSO)/21.6 w/w % ion-exchange water was introduced. A pigment nanoparticle dispersion was obtained. When the particle size distribution of the obtained pigment nanoparticle dispersion was measured with a particle size distribution measuring instrument utilizing a laser Doppler method (trade name: Microtrac UPA150, manufactured by Nikkiso Co., Ltd.), the average particle size was 448 nm. The pigment nanoparticle dispersion was dialyzed with a dialysis tube for 24 hours to remove dodecyl sodium sulfate, DMSO and the like and then dried to give pigment nanoparticle powders. When the powders were introduced again into ion-exchange water and then stirred with a high-speed stirring dispersing machine (trade name: CLEARMIX, manufactured by M Technique Co., Ltd.), a pigment nanoparticle dispersion was obtained again, and the average particle size was 968 nm, which was larger than that of the pigment nanoparticle dispersion obtained in the beaker.

From the forgoing, it was revealed that pigment nanoparticles formed in a thin film fluid formed between the processing surfaces arranged to be opposite to each other so as to be able to approach to and separate from each other, at least one of which rotates relative to the other, in use of a uniformly stirring and mixing reaction apparatus, are excellent in re-dispersibility even though they are microparticles of nano size.

The invention claimed is:

1. A method for producing pigment nanoparticles comprising the step of separating pigment substances in use of a forced thin film rotary reaction method, wherein the forced thin film rotary reaction method comprises the steps of:
providing a fluid pressure imparting mechanism for imparting pressure to a fluid to be processed;
providing at least two processing members of a first processing member and a second processing member, the second processing member being capable of approaching to and separating from the first processing member;
providing a rotation drive mechanism for rotating the first processing member and the second processing member relative to each other,
wherein the first processing member comprises a first processing surface, and the second processing member comprises a second processing surface, the first and second processing surfaces positioned facing each other,
wherein each of the processing surfaces constitutes part of a sealed flow path through which the fluid under the pressure is passed,
wherein two or more fluids to be processed, at least one of which contains a reactant, are uniformly mixed and positively reacted between the processing surfaces,
wherein, of the first and second processing members, at least the second processing member is provided with a pressure-receiving surface, and at least part of the pressure-receiving surface is comprised of the second processing surface,
wherein the pressure-receiving surface receives pressure applied to the fluid by the fluid pressure imparting mechanism thereby generating a force to move in the direction of separating the second processing surface from the first processing surface,
wherein the fluid under the pressure is passed between the first and second processing surfaces being capable of approaching to and separating from each other and rotating relative to each other, whereby the fluid under the pressure forms a thin film fluid in a minute space of 1 μm to 1 mm formed between both the processing surfaces;
providing another introduction path independent of the flow path through which the fluid to be processed under the pressure is passed; and
providing at least one opening leading to the introduction path and being arranged in at least either the first processing surface or the second processing surface,
wherein at least one fluid to be processed sent from the introduction path is introduced into between the processing surfaces, whereby the fluid under the pressure and the at least one fluid to be processed are mixed in the thin film fluid thereby separating pigment substances,
wherein the first processing surface and the second processing surface are circular, one side of an outer side of the first processing surface and the second processing surface or a center side of the same is an upstream side, and the other side is a downstream side, and at least one of the first processing surface and the second processing surface is formed with a groove-shaped depression extending from the upstream side to the downstream side, the groove-shaped depression being formed in the processing surface which rotates, an upstream end of the groove-shaped depression reaching an periphery surface of one of the outer side and the center side, which defines the upstream side, of the rotating processing surface, and an downstream end of the groove-shaped depression being spaced from an periphery surface of the other of the outer side and the center side, which defines the downstream side, of the rotating processing surface,
wherein the fluid to be processed under the pressure is introduced between the first processing surface and the second processing surface by a micro-pump effect by rotation of the processing surface provided with the groove-shaped depression, and
wherein the opening is positioned downstream at a point where a direction of flow of the fluid under the pressure is changed to a direction of flow of the spiral laminar flow formed between the both of processing surfaces.

2. The method for producing pigment nanoparticles according to claim 1, wherein the reaction used in the forced thin film rotary reaction method is a pH regulating method in which a pigment solution having at least one kind of pigment substance dissolved either in an acidic or alkaline pH regulating solution or in a mixed solution of the pH regulating solution and an organic solvent is mixed with a pigment-separating solution which changes the pH of the pigment solution and which does not show solubility for the pigment contained in the pigment solution or has lower solubility for the pigment than that of the solvent contained in the pigment solution thereby separating pigment particles.

3. The method for producing pigment nanoparticles according to claim 1, wherein at least one of the reactant-containing fluids to be processed comprises a dispersant and or a block copolymer.

4. The method for producing pigment nanoparticles according to claim 1, wherein the space between the processing surfaces is cooled or heated to attain desired reaction conditions.

5. The method for producing pigment nanoparticles according to claim 1, wherein the forced thin film rotary reaction method is conducted in a container capable of securing a depressurized or vacuum state, to form a depressurized or vacuum state of the secondary side at which the fluid after processing is discharged thereby removing a solvent or a gas generated during the reaction and a gas discharged from the processing members.

6. The method for producing pigment nanoparticles according to claim 1, wherein the volume-average particle size, in particle size distribution, of the obtained pigment nanoparticles is 1 nm to 200 nm.

7. The method for producing pigment nanoparticles according to claim 1, wherein the reaction used in the forced thin film rotary reaction method is an acid pasting method in which a pigment acidic solution prepared by dissolving pigment substances in a strong acid is mixed with a water-containing solution thereby giving pigment particles.

8. The method for producing pigment nanoparticles according to claim 1, wherein the reaction used in the forced thin film rotary reaction method is a re-precipitation method in which a pigment solution prepared by dissolving pigment substances in an organic solvent is introduced into a poor solvent which is poor to the pigment but is compatible with the organic solvent used in preparation of the solution thereby separating pigment particles.

9. The method for producing pigment nanoparticles according to claim 1,
wherein the minute space is a range of 1 μm to 10 μm.

10. The method for producing pigment nanoparticles according to claim 1,
wherein the fluid to be processed is fed between the first processing surface and the second processing surface, and
a distance between the processing surfaces is maintained to be the minute space by the balance in pressure between a force in the approaching direction and a force in the separating direction including a supply pressure of the fluid and a pressure exerted between the processing surfaces rotating relative to each other.

11. The method for producing pigment nanoparticles according to claim 9, wherein the reaction used in the forced thin film rotary reaction method is an acid pasting method in which a pigment acidic solution prepared by dissolving pigment substances in a strong acid is mixed with a water-containing solution thereby giving pigment particles.

12. The method for producing pigment nanoparticles according to claim 9, wherein the reaction used in the forced thin film rotary reaction method is a re-precipitation method in which a pigment solution prepared by dissolving pigment substances in an organic solvent is introduced into a poor solvent which is poor to the pigment but is compatible with the organic solvent used in preparation of the solution thereby separating pigment particles.

13. The method for producing pigment nanoparticles according to claim 10, wherein the reaction used in the forced thin film rotary reaction method is an acid pasting method in which a pigment acidic solution prepared by dissolving pigment substances in a strong acid is mixed with a water-containing solution thereby giving pigment particles.

14. The method for producing pigment nanoparticles according to claim 10, wherein the reaction used in the forced thin film rotary reaction method is a re-precipitation method in which a pigment solution prepared by dissolving pigment substances in an organic solvent is introduced into a poor solvent which is poor to the pigment but is compatible with the organic solvent used in preparation of the solution thereby separating pigment particles.

15. The method for producing pigment nanoparticles according to claim 1, wherein the another introduction path is inclined with respect to the first processing surface or the second processing surface, at an angle more than 0° and less than 90°.

16. The method for producing pigment nanoparticles according to claim 15, wherein the angle is equal to or more than 1° and equal to or less than 45°.

17. The method for producing pigment nanoparticles according to claim 1, wherein the another introduction path is configured in a manner that the introduction of the fluid to be processed passing through the opening to between both of the processing surfaces goes in an angularly varied direction from the line passing through the center of the rotary shaft of either of the processing surfaces and the opening to the rotation direction of either of the processing surfaces.

18. A method for producing pigment nanoparticles comprising the step of separating pigment substances in use of a forced thin film rotary reaction method, wherein the forced thin film rotary reaction method comprises the steps of:
providing a fluid pressure imparting mechanism for imparting pressure to a fluid to be processed;
providing at least two processing members of a first processing member and a second processing member, the second processing member being capable of approaching to and separating from the first processing member;
providing a rotation drive mechanism for rotating the first processing member and the second processing member relative to each other,
wherein the first processing member comprises a first processing surface, and the second processing member comprises a second processing surface, the first and second processing surfaces positioned facing each other,
wherein each of the processing surfaces constitutes part of a sealed flow path through which the fluid under the pressure is passed,
wherein two or more fluids to be processed, at least one of which contains a reactant, are uniformly mixed and positively reacted between the processing surfaces,
wherein, of the first and second processing members, at least the second processing member is provided with a pressure-receiving surface, and at least part of the pressure-receiving surface is comprised of the second processing surface,
wherein the pressure-receiving surface receives pressure applied to the fluid by the fluid pressure imparting mechanism thereby generating a force to move in the direction of separating the second processing surface from the first processing surface,
wherein the fluid under the pressure is passed between the first and second processing surfaces being capable of approaching to and separating from each other and rotating relative to each other, whereby the fluid under the pressure forms a thin film fluid in a minute space of 1 μm to 1 mm formed between both the processing surfaces;
providing another introduction path independent of the flow path through which the fluid to be processed under the pressure is passed; and
providing at least one opening leading to the introduction path and being arranged in at least either the first processing surface or the second processing surface,
wherein at least one fluid to be processed sent from the introduction path is introduced into between the processing surfaces, whereby the fluid under the pressure and the at least one fluid to be processed and a fluid to be processed other than the fluid under the pressure and the at least one fluid to be processed are mixed in the thin film fluid thereby separating pigment substances,
wherein the first processing surface and the second processing surface are circular, one side of an outer side of the first processing surface and the second processing surface or a center side of the same is an upstream side, and the other side is a downstream side, and at least one of the first processing surface and the second processing surface is formed with a groove-shaped depression extending from the upstream side to the downstream side, the groove-shaped depression being formed in the processing surface which rotates, an upstream end of the groove-shaped depression reaching an periphery surface of one of the outer side and the center side, which defines the upstream side, of the rotating processing surface, and an downstream end of the groove-shaped depression being spaced from an periphery surface of the other of the outer side and the center side, which defines the downstream side, of the rotating processing surface, wherein the fluid to be processed under the pressure is introduced between the first processing surface and the second processing surface by a micro-pump effect by rotation of the processing surface provided with the groove-shaped depression, and wherein the opening is positioned downstream at a point where a direction of flow of the fluid under the pressure is changed to a direction of flow of the spiral laminar flow formed between the both of processing surfaces.

19. The method for producing pigment nanoparticles according to claim 1, wherein the pressure-receiving surface is comprised of an inclined surface formed at the upstream side of at least the second processing surface, and the groove-shaped depression is formed in the first processing surface and faces the inclined surface.

20. The method for producing pigment nanoparticles according to claim 18, wherein the pressure-receiving surface is comprised of an inclined surface formed at the upstream side of at least the second processing surface, and the groove-shaped depression is formed in the first processing surface and faces the inclined surface.

* * * * *